United States Patent
Campana, Jr.

(10) Patent No.: US 6,198,783 B1
(45) Date of Patent: Mar. 6, 2001

(54) SYSTEM FOR WIRELESS SERIAL TRANSMISSION OF ENCODED INFORMATION

(75) Inventor: Thomas J. Campana, Jr., Chicago, IL (US)

(73) Assignee: NTP Incorporated, Annandale, VA (US)

(*) Notice: Subject to any disclaimer, the term of this patent is extended or adjusted under 35 U.S.C. 154(b) by 0 days.

(21) Appl. No.: 09/076,158

(22) Filed: May 12, 1998

Related U.S. Application Data

(63) Continuation-in-part of application No. 08/112,256, filed on Aug. 26, 1993, now Pat. No. 5,446,759, which is a continuation-in-part of application No. 07/850,275, filed on Mar. 12, 1992, now abandoned, which is a continuation-in-part of application No. 07/850,276, filed on Mar. 12, 1992, now abandoned, which is a continuation-in-part of application No. 07/850,487, filed on Mar. 12, 1992, now abandoned.

(51) Int. Cl.[7] .................................................. H03D 1/04
(52) U.S. Cl. ........................ 375/346; 375/219; 375/239; 375/302; 375/238
(58) Field of Search .................................... 375/346, 219, 375/238, 239, 261, 302; 332/103, 106, 109, 112, 144

(56) References Cited

U.S. PATENT DOCUMENTS

| | | | |
|---|---|---|---|
| 5,742,644 | * | 4/1998 | Campana, Jr. ................. 375/316 |
| 5,912,926 | * | 6/1999 | Loenck et al. ................. 375/295 |

* cited by examiner

*Primary Examiner*—Stephen Chin
*Assistant Examiner*—Mohammad Ghayour
(74) *Attorney, Agent, or Firm*—Antonelli, Terry, Stout & Kraus, LLP

(57) ABSTRACT

The present invention provides a method for transmission of serial information over a wireless channel. The method includes modulating bits of information at selected parts of each cycle of a carrier waveform. At the receiving side, the selected parts of each cycle of the modulated waveform are integrated to produce an integrated value and compared with stored value to recover transmitted bits.

9 Claims, 28 Drawing Sheets

FIG. 3
(PRIOR ART)

50 SEVEN DIGIT NUMERIC PAGE - POCSAG TRANSMISSION
(11 TO 18 PAGES PER BATCH.)

1ST BATCH

| | | | | | PAGE TOTAL | ACTUAL DATA TIME | AIR-TIME TOTAL | % EFF. |
|---|---|---|---|---|---|---|---|---|
| 1ST FRAME GROUP | 1 | 3 | 5 | 7 | 4 | 1.8555 | 2.1875 | 84.8 |
| 2ND FRAME GROUP | 2 | 4 | 6 | 8 | 3.5 | .5845 | 1.0625 | 55.0 |
| 3RD FRAME GROUP | 8B | 3 | 5 | 7 | 3.5 | .5845 | 1.0625 | 55.0 |

2ND BATCH

| | | | | | | | | |
|---|---|---|---|---|---|---|---|---|
| 1ST FRAME GROUP | 1 | 4 | 6 | 8 | 3.5 | 1.8375 | 2.1875 | 84.0 |
| 2ND FRAME GROUP | 8B | 3 | 5 | 7 | 3.5 | .5845 | 1.0625 | 55.0 |
| 3RD FRAME GROUP | 2 | 4 | 6 | 8 | 3.5 | .5845 | 1.0625 | 55.0 |
| 4TH FRAME GROUP | 8B | 3 | 5 | 7 | 3.5 | .5845 | 1.0625 | 55.0 |

3RD BATCH

| | | | | | | | | |
|---|---|---|---|---|---|---|---|---|
| 1ST FRAME GROUP | 1 | 3 | 5 | 7 | 4 | 1.8555 | 2.1875 | 84.8 |
| 2ND FRAME GROUP | 2 | 4 | 6 | 8 | 3.5 | .5845 | 1.0625 | 55.0 |
| 3RD FRAME GROUP | 8B | 3 | 5 | 7 | 3.5 | .5845 | 1.0625 | 55.0 |
| 4TH FRAME GROUP | 2 | 4 | 6 | 8 | 3.5 | .5845 | 1.0625 | 55.0 |
| 5TH FRAME GROUP | 8B | 3 | 5 | 7 | 3.5 | .5845 | 1.0625 | 55.0 |

4TH BATCH (REMOVES EXCESS BALANCE OF)

| | | | | | | | | |
|---|---|---|---|---|---|---|---|---|
| 1ST FRAME GROUP | 1 | 4 | | | 2 | 1.5375 | 2.1875 | 70.2 |
| 2ND FRAME GROUP | 2 | | | | 1 | .192 | 1.0625 | 18.0 |
| 3RD FRAME GROUP | 1 | | | | 1 | .192 | 1.0625 | 18.0 |
| 4TH FRAME GROUP | 1 | | | | 1 | .192 | 1.0625 | 18.0 |
| 5TH FRAME GROUP | 1 | | | | 1 | .192 | 1.0625 | 18.0 |
| 6TH FRAME GROUP | 1 | | | | 1 | .192 | 1.0625 | 18.0 |

| | | | | | 50 | 13.306 SEC. | 23.625 SEC. | 56.3% |

NOTE: 8B REPRESENTS THE BALANCE OF THE PAGE SENT TO A PAGER IN FRAME 8 IN THE PREVIOUS FRAME GROUP.

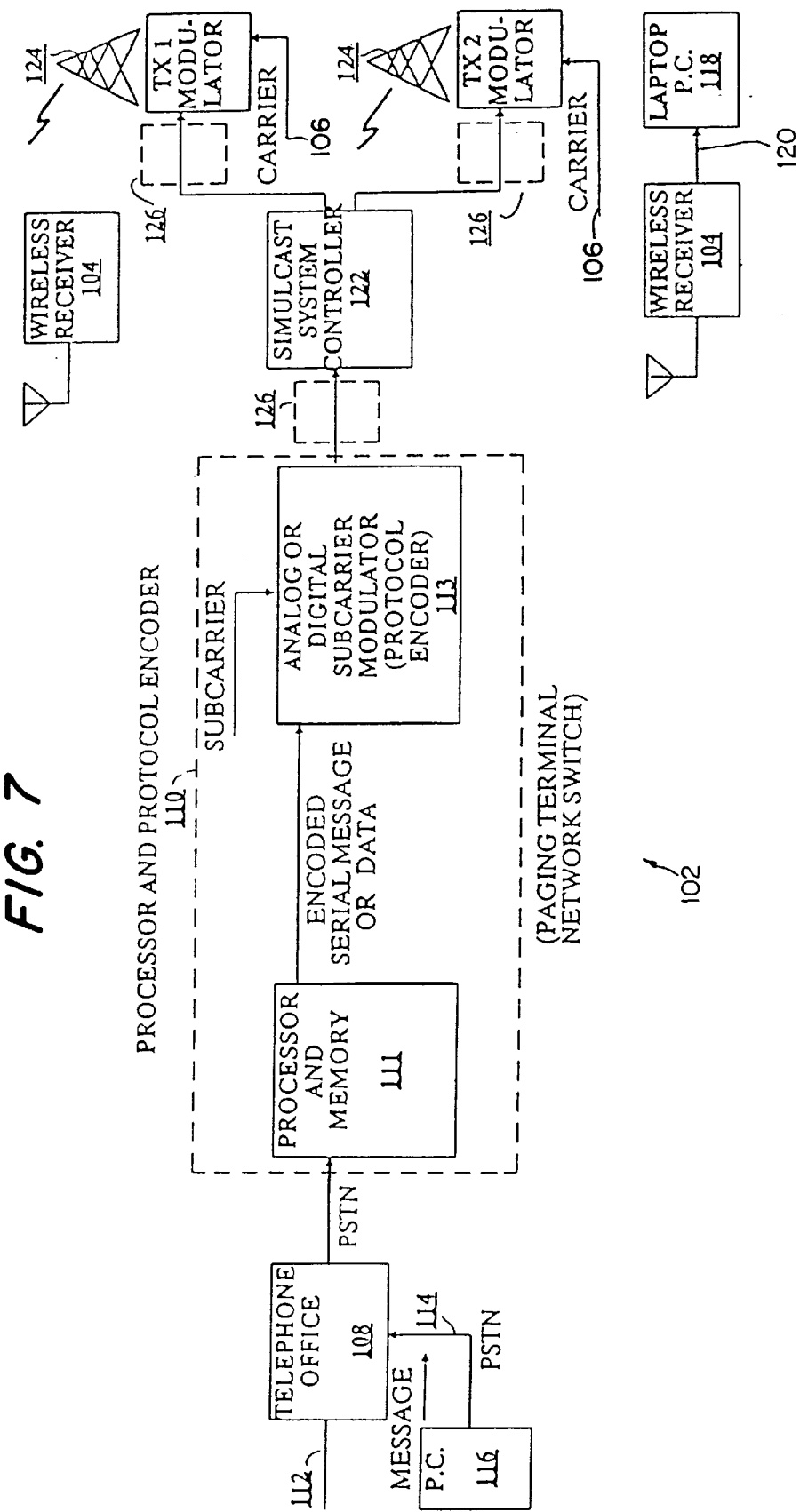

{
1. SYSTEM CONFIG. (ALG. OR DIG.)     DIG.    (ENTRY)
2. SYSTEM DATA RATE (BAUD)           2400    (ENTRY)
3. TRANSMIT KEY-UP DELAY (MS)        1200    (ENTRY)
4. ARBITRATION TYPE (SEE MANUAL)     A7      (ENTRY)
5. ARBITRATION TIME (SECONDS)        300     (ENTRY)

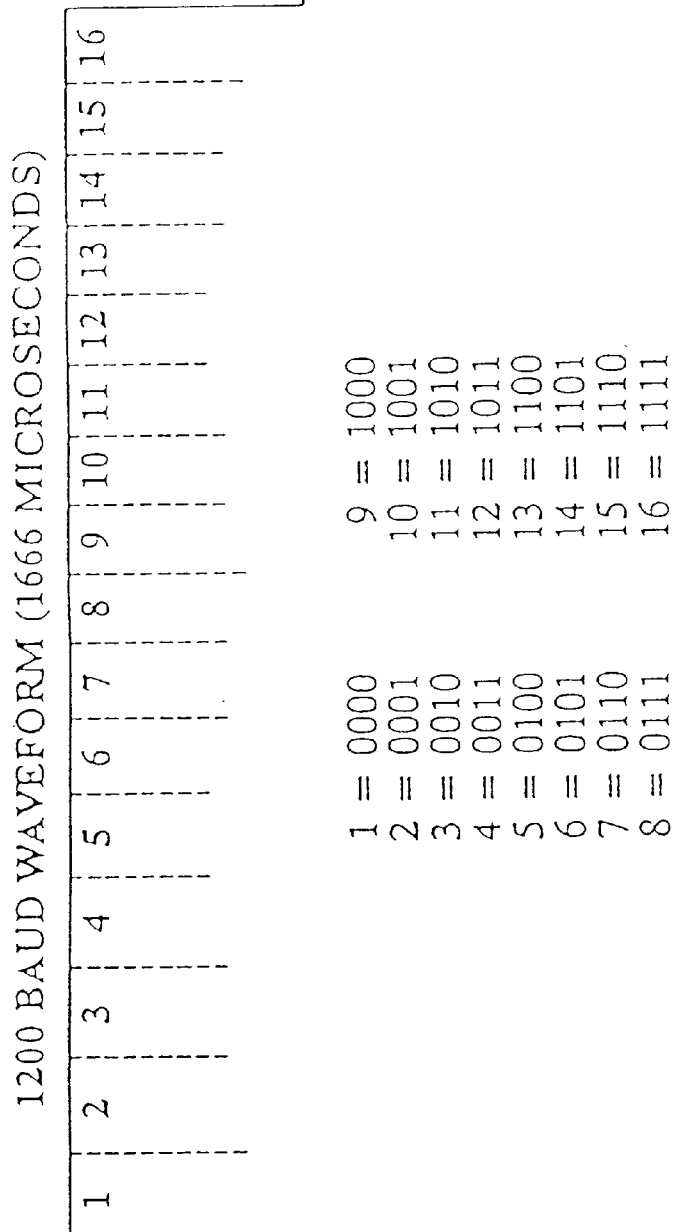

TIME SAMPLES BY DSP BEFORE RECONSTRUCTION

TIME SAMPLES BY DSP AFTER RECONSTRUCTION

FIG. 23

| DATA UNIT 1 | DATA UNIT 8 | DATA UNIT 9 | CRC/BCH ERROR CODE | CRC/BCH ERROR CODE | DATA UNIT 10 |
|---|---|---|---|---|---|
| 1...8 | 1...8 | 1...8 | 1 2 3 4 5 6 7 8 9 10 11 | 1 2 3 4 5 6 7 8 9 10 | 1...8 |
| V V | V V | V V | V V V V V V V V V V E E E E | V V V V V V V V V V V | V V |

FIG. 24

| DATA UNIT 1 | DATA UNIT 8 | DATA UNIT 9 | CRC/BCH ERROR CODE | CRC/BCH ERROR CODE | DATA UNIT 10 |
|---|---|---|---|---|---|
| 1...8 | 1...8 | 1...8 | 1 2 3 4 5 6 7 8 9 10 11 | 1 2 3 4 5 6 7 8 9 10 | 1...8 |
| E V | E V | E V | V V V V V V V V V V V | V V V V V V V V V V | V V |

FIG. 25

| DATA UNIT 1 | DATA UNIT 8 | DATA UNIT 9 | CRC/BCH ERROR CODE | CRC/BCH ERROR CODE | DATA UNIT 10 |
|---|---|---|---|---|---|
| 1...8 | 1...8 | 1...8 | 1 2 3 4 5 6 7 8 9 10 11 | 1 2 3 4 5 6 7 8 9 10 | 1...8 |
| V V | V V | V E | E E E E E E E E E E E | E E E E E E E E E E | V V |

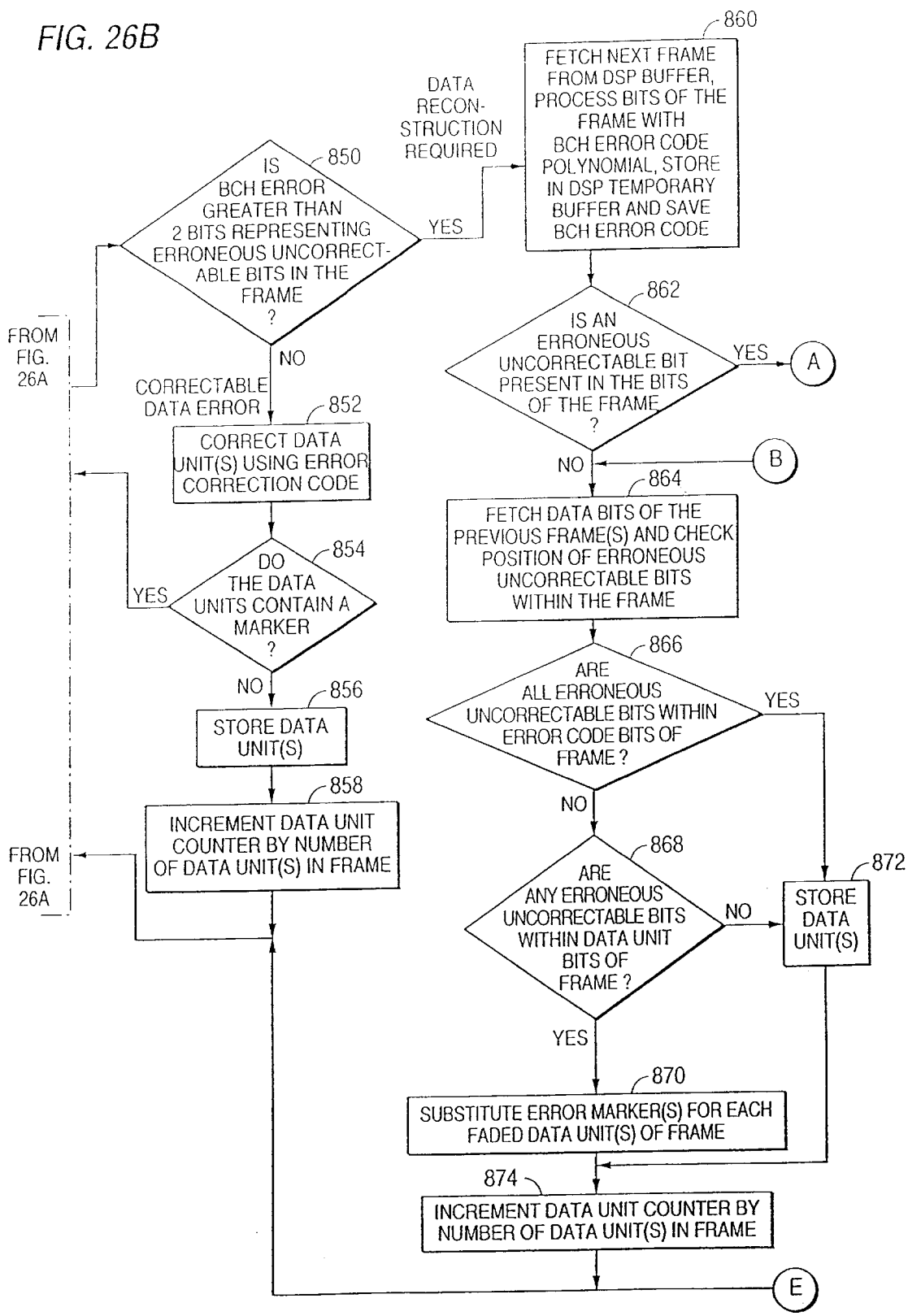

SYSTEM FOR WIRELESS SERIAL TRANSMISSION OF ENCODED INFORMATION

CROSS-REFERENCE TO RELATED APPLICATIONS

This application is a Continuation of U.S. Ser. No. 08/386,060, filed Feb. 7, 1995, now U.S. Pat. No. 5,751,773, which is a Continuation-In-Part of U.S. application Ser. No. 08/112,256 now U.S. Pat. No. 5,446,959, filed Aug. 26, 1993, entitled "Information Transmission System and Method of Operation"; which is a Continuation-In-Part of U.S. application Ser. No. 07/850,275, filed Mar. 12, 1992, entitled "Low Power Information Transmission System Having High Information Transmission and Low Error Rates and Method of Operation" (now abandoned); Ser. No. 07/850,276, filed Mar. 12, 1992, entitled "High Speed, Low Power and Low Error Information Receiver and Method of Operation" (now abandoned); and Ser. No. 07/850,487, filed Mar. 12, 1992, entitled "Low Power Information Transmission and Receiving System Having High Information and Low Error Rates and Method of Operation" (now abandoned), which applications are incorporated herein by reference in their entirety.

Reference is also made to two related applications entitled "Receiving Circuitry for Receiving Serially Transmitted Encoded Information" Ser. No. 08/385,312 and "Transmitting Circuitry for Serial Transmission of Encoded Information" Ser. No. 08/385,143, filed on even date herewith, which applications are incorporated herein by reference in their entirety.

TECHNICAL FIELD

The present invention relates to a method of one and two-way wireless serial information transmission having a high rate of information transmission, a low error rate of transmission and transmission with low radiated power, transmitting circuitry for encoding and transmitting the serial information, receiving circuitry for receiving and decoding the serial information, a receiver and transceiver using the receiving circuitry, a transceiver using the transmitting circuitry, a signal processing system associated with a base station using the transmitting and receiving circuitry, and a system including the transmitting and receiving circuitry having at least one receiver and at least one transceiver and optionally at least one base station.

BACKGROUND ART

A. One-Way Wireless Transmission

There is a movement in the wireless industry towards providing more than simple numeric telephone number messages. These messages are typically originated from personal and office computers and sent to the wireless transmitting system via the telephone network. These messages are received by the messaging system controller (paging terminal) and processed for transmission via the radio transmitting system.

E-mail services have gained tremendous popularity. The average E-mail message is approximately 450 characters in length and 5 to 8 messages are sent each working day.

Personal computers have become far more compact in size permitting them to "move" with the person verses remaining in a fixed location. It is predicted that within the next few years, the majority of the personal computers will be less than 8 pounds in weight making them extremely convenient as a "portable office". This will make wireless communications a media of choice to accommodate portable office computers to receive information services and E-mail messages.

This places an extreme burden on the existing radio infrastructure that is allocated for messaging services. Currently, most metro area paging systems operating in the 150 and 450 MHz radio bands are operating at or near full capacity accommodating current numeric paging subscribers. There is not adequate reserve air time available to accommodate alphanumeric information and E-mail services.

Nine hundred MHz authorizations are currently available for local and regional paging implementation. However, at the current protocol speeds and the projected growth rates, the national channels will undoubtedly reach saturation within the next few years. Currently, one or more of the 900 MHz nationwide paging channels are close to such a saturation. There is a pressing need to increase the air time efficiency of these radio paging systems.

Furthermore, U.S. Pat. Nos. 4,849,750, 4,851,830, 4,853,688, 4,857,915, 4,866,431, 4,868,562, 4,868,558, 4,868,860, 4,870,410, 4,875,039, 4,876,538, 4,878,051, 4,881,073, 4,928,100, 4,935,732, 4,978,944, 5,012,235, 5,039,984, 5,047,764, 5,045,850, 5,052,049, 5,077,834 and 5,121,115 disclose a frequency agile information transmission network and frequency agile data receivers. The above-referenced patents are incorporated herein by reference in their entirety.

U.S. patent application Ser. No. 702,939, now U.S. Pat. No. 5,436,960 filed May 20, 1991, entitled "Electronic Mail System with RF Communications to Mobile Processors"; U.S. Ser. No. 702,319, filed May 20, 1991, entitled "Electronic Mail System With RF Communications to Mobile Processors Originating From Outside of the Electronic Mail System" (now abandoned), U.S. Ser. No. 08/247,466, now U.S. Pat. No. 5,438,611 filed May 23, 1994, entitled "Electronic Mail System With RF Communications to Mobile Processors Originating From Outside of the Electronic Mail System and Method of Operation Thereof"; and U.S. Ser. No. 702,939, now U.S. Pat. No. 5,436,960, filed May 20, 1991, entitled "System for Interconnecting Electronic Mail Systems by RF Communications," disclose a system for linking an electronic mail system to portable computers using one-way wireless transmissions which may use the network and receivers disclosed in the aforementioned patents. These applications are incorporated by reference in their entirety herein.

Collectively, the above improvements utilizing the existing 150 and 450 MHz radio messaging infrastructure will produce a significant reduction in the message delivery cost to the wireless subscriber. The cost to deliver a 450 character message with the system described in the above-referenced patents has been projected to be approximately 65¢ versus $1.50 for a 50 character message the industry is currently offering subscribers. This significant cost reduction would further enhance the growth rate of the wireless information and E-mail service industry.

Furthermore, allocated narrow band spectrum in the 220 MHz radio messaging infrastructure is applicable to local and national data transmission for applications such as electronic mail. However, the narrow bandwidth of the channels in the 220 MHz. radio infrastructure does not support high data throughputs with prior art data protocols.

Adequate reserve radio spectrum is available in the 150 and 450 MHz radio bands in the form of IMTS mobile channels that have been authorized for one- and two-way information transmission to transmit data and E-mail. However, a more reliable one-way messaging protocol is needed to accommodate the need for information and E-mail services. An additional requirement for a more air time efficient (faster) message protocol exists.

The POCSAG protocol was originally authored by the British Post office code Standardization Advisory Group. It was primarily developed for "tone only" or "semi-synchronous paging format". Unlike a synchronous paging format that must be transmitted continually to maintain synchronization of all the paging receivers, the POCSAG protocol is somewhat asynchronous in the respect that it only needs to send a radio signal when messages are about to be delivered. However, a POCSAG protocol transmission is extremely sensitive to atmospheric fades which are discussed below. If a three bit error exists in a transmission of information to a POCSAG protocol receiver, the BCH error correction code embedded therein may be ineffective to prevent the transmission synchronism between the transmitter and receiver clock from being lost which results in a failure to complete the transmission of the information to the receiver and the receiver reverting into a scanning mode to attempt to lock onto a new transmission containing its identification code. A three bit error is produced by a fade in reception level below the detection level of the receiver for a time interval such as 2 to 4 milliseconds for 1200 and 512 baud data rates respectively.

To gain insight as to the POCSAG protocol, reference is made to FIG. 1 for the following explanation. A POCSAG protocol frame set consists of a PREAMBLE, a SYNC signal, and eight frames that are subdivided into two code words each. POCSAG protocol pagers are synchronous in the respect that once they detect the PREAMBLE and synchronize on the SYNC code word, they only then search for a message in their respective frame. If capcode ID numbers are consecutively assigned, the page is automatically assigned to a respective frame. Taking the binary equivalent of the last three digits of the ID of the pager, it is possible to determine in which one of the eight frames a respective pager would be located.

The POCSAG protocol pager is continually sampling the radio channel to look for its PREAMBLE. The PREAMBLE is typically 1.125 to 3 seconds in duration, and consists of an alternating string of ones and zeros sent digitally. When the pager samples the radio channel and determines the PREAMBLE string, it remains on and searches for the SYNC signal. The SYNC signal is actually a 62.5 millisecond code word that transmits a fictitious address to which the pagers respond. It is an unused address, and therefore does not cause falsing (erroneous turn on) of other pagers. Upon receiving the SYNC code word, the pager searches for a message in its respective frame group.

The POCSAG protocol has some inherent inefficiencies in its design. These inefficiencies exist in both 512 and 1200 baud POCSAG protocol pagers and are inherent in the architecture of the POCSAG protocol. In the POCSAG and other digital protocols, the baud rate is also the frequency of the subcarrier (e.g. 512 baud uses a 512 Hz. squarewave subcarrier which is modulated with ones and zeros to encode the parts of a transmission). Referring again to FIG. 1, it should be noted that a frame consists of code word one and code word two. If a POCSAG protocol pager receives a message, the first code word of its frame contains the ID or address information for the pager. It also contains alerting information to indicate to the pager what types of beeps are being issued. Code word two contains the numeric or alphanumeric information. When the pager is in numeric mode, the code word can contain five numeric digits.

However, it should be noted that very few numeric pages are five digits in duration. In fact, in a typical paging system, 98% of the numeric messages are seven digits in duration as illustrated in FIG. 2. Because the numeric message is seven digits in duration, the POCSAG protocol permits a borrowing or an extension into the next frame. The first code word in each frame (which would typically be an address), has a marker bit that indicates whether the code word contains address or numeric information. The remaining two digits of the seven digit example then spill over into the first code word of the next frame of the twenty bits of data (five numeric digits) in the next frame word, only eight would be used rendering the balance of the code word useless. The POCSAG protocol fills the balance of the code word with "filler code". The second code word of the adjacent frame is also back filled with filler code. The adjacent frame is unavailable for use by any other page. In fact, any message awaiting an adjacent frame two pager, must wait until the next frame group is sent in order to receive the message. The architecture of a POCSAG protocol based system requires that a message to a given pager be sent only in its respective frame.

It is obvious that unless great care is utilized in the distribution of receivers to divide the receivers evenly within the frame groups, and that the customer usage in each frame group is equal, severe system air time inefficiencies are obtained. System air time efficiencies can vary between 30 and 60%. A great deal of the air time cannot be fully utilized as it is due to the message length (seven digits) and is caused by the insertion of filler codes. If a per message comparison of paging protocols is made, it does not take into account the inherent system inefficiencies when numerous pages are sent. As mentioned previously, POCSAG protocol efficiencies vary considerably if a great deal of attention is not paid to the proper distribution of ID codes.

To gain some insight as to how the POCSAG protocol tends to reduce the air time efficiency, reference is made to FIG. 3. FIG. 3 shows fifty numeric pages that need to be sent via the paging system. For purposes of this example each page is a seven digit numeric page and the pagers are equally distributed between the eight frame groups.

The first problem is that due to each page being seven digits in duration, only an average of 3.5 pages can be sent per frame group. It should also be noted that a seven digit numeric page destined for the eighth frame group necessitates that a SYNC signal be sent. The message then spills over to the first frame of the next frame set. An "overhead" problem that also becomes obvious is that the receivers must be resynchronized after the transmission of the first eight frames. This resynchronization adds to the length of each message sent within the eight frame group. SYNC is 62.5 MS divided by 3½ pages to apportion overhead. One hundred sixty seven milliseconds of the 267 MS period produces a 62.5% efficiency. Due to the spilling over of messages into their adjacent frames, it is seen that a second problem is precipitated. Assuming that each of the pages arrive in frame group order (e.g. 1234567, 1234567), it is seen that even if the paging terminal can sort to get the maximum 3.5 message per frame group efficiency, that a number of pages destined for the first frame tend to build or stack up. To eliminate this problem, fewer pagers may be issued in the eighth frame group (which spill over into the first frame group). However, the problem is not solved by doing so, and simply a build up of other pages in other frame groups occurs.

The 512 baud POCSAG protocol transmits 2.857 alphanumeric characters per 62.5 MS code word. If an alphanumeric message is transmitted in the first frame, a maximum of forty two characters can be sent before a 62.5 SYNC signal is required.

| Transmitted Frame | Maximum Characters Before Sync |
|---|---|
| 1 | 42.8 |
| 2 | 37.14 |
| 3 | 31.43 |
| 4 | 25.71 |
| 5 | 19.99 |
| 6 | 14.89 |
| 7 | 8.57 |
| 8 | 2.85 |

As the national average length of an alphanumeric message is forty five characters, it is reasonable to add the SYNC overhead to the character time. The average E-mail message is considered to be from 150 to 450 characters, which increases the air-time requirements and increases the probability for a reception error.

Each character would be:

| 21.98 m.s. | Per character |
|---|---|
| 2.73 m.s. | Frame OVHD per character |
| 24.71 m.s. | |

Current digital protocols (POCSAG and Golay) are difficult to speed up due to their respective architectures. Attempts to increase POCSAG protocol speed from 512 to 1200 or 2400 baud (subcarrier frequency) have encountered the following problems.

The 1200 and 2400 baud data transmission rates have shortened the data bit time to approximately 800 and 400 microseconds respectively. This short time per bit produces a marked degradation in message receipt reliability for lengthy alphanumeric messages.

POCSAG protocol receivers have a BCH error correction scheme that can tolerate only one or two bits per frame to be erroneous before the transmitted character is unrecoverable. Man-made noise and Rayleigh fading phenomenon are very prevalent for such short bit times. The net result is that the cumulative effect of the error correction scheme that the current digital protocols utilize in combination with the effects of natural and man-made interferences degrade the message receiver's reliability when attempts are made to accommodate information and E-mail services. A three or more bit error represents a fade below the threshold detection level of the receiver which can cause the receiver clock to loose synchronism with the transmitted information, turn off and search for another transmission of its address. A three bit error represents a true message error which results in the loss of at least some data.

Speed per message is actually a relatively poor method to choose which format (type) of pager to utilize on a system. There are subtle differences in the various alpha signaling schemes that have far more impact on the reliability of the paging system and its ability to deliver message information to pagers. Differences in air time efficiencies and the techniques employed to correct erroneously received data by the pager are very important considerations that should be made.

The POCSAG and Golay protocols have digital formats requiring digital transmitters.

The 512 baud POCSAG protocol utilizes thirty one bit words, utilizing eleven of the bits for error correction. A three bit error in the address, as stated above, causes the message to be missed. This equates to a four millisecond fade or noise burst during the address and a two millisecond fade error during the message. Twelve hundred baud POCSAG protocol pagers have the same error correction format and air time inefficiencies. The fade resistance is reduced to a two millisecond fade during the address and one millisecond during the message. Although the number of pagers on a given channel is doubled, the degradation of message reliability due to the reduced fade resistance becomes noticeable with numeric paging, and markedly poor when long alphanumeric messages are sent.

The Golay protocol utilizes twenty three bit words, utilizing eleven of the bits for error correction. The Golay protocol transmits the ID code at 300 baud to increase the decoding reliability. The message is transmitted at 600 baud. The Golay protocol has an increased reliability for detecting the ID portion of the page due to the slower data rate. However, the overall signalling when the format is analyzed is noticeably slower than 512 baud POCSAG protocol, making it a poor choice to attempt to accommodate alphanumeric information and E-mail services on a radio channel that is currently accommodating tens of thousands of numeric pagers.

In the late 1980's A European consortium of countries formed a committee to develop a Pan-European wide paging network that would meet the requirements for the European traveling paging marketplace. Representatives from each country participated in a committee-like fashion to develop a new paging protocol that would allow the equivalent of an international paging network with common frequencies and a common protocol, permitting all countries to effectively offer Pan-European paging services. The European Radio Message Service (ERMES) committee was formed and developed both a new multi-level FSK paging format and all of the corresponding network architecture to relay messages to the transmitting infrastructure in Europe.

A multi-level FSK modulation technique is used with the ERMES protocol that modulates the transmitter at 3200 baud with each baud or FSK level representing two bits of binary information. The effective data rate of the ERMES protocol is therefore 6400 bits per second. The multiple baud level FSK modulation technique suffers from a reduced signal to noise ratio of six dB consequent from the lower level of the two level modulation being closer to the noise level of discrimination of the receiving circuits. Loss of signal level for a substantial time below the noise level results in loss of synchronism which terminates reception of the remainder of the message resulting in a catastrophic message reception failure.

With a number of years of experience in utilizing the POCSAG protocol, the ERMES committee corrected some of the inherent deficiencies of the POCSAG protocol. By the same token, many parts of the architecture of the POCSAG protocol were utilized in the adoption of the ERMES protocol.

Somewhat later than the development of the ERMES protocol, a movement occurred in the United States to develop a more reliable radio messaging protocol. Although there are some manufacturers that have attempted to give proprietary names to this American protocol, it has typically been called the modified ERMES protocol. This is in part due to the fact that a large percentage of this modified ERMES protocol derived its architecture from the ERMES standards. Unlike the ERMES protocol, which is exclusively synchronous and transmits only at 3200 baud, the modified ERMES protocol has been proposed in three distinct phases. This is in part due to the fact that the American marketplace did not have a new band of frequencies allocated exclusively for national paging use. The modified ERMES protocol has to have the flexibility in its design to permit co-residing on currently operating radio messaging channels that contain POCSAG and Golay protocol pagers.

Phase one of the modified American ERMES protocol will utilize a 1600 baud FSK architecture that permits it to be compatible on existing digital base stations with other digital paging formats. Phase two, although not currently well defined, will transmit at 3200 baud with a 3200 bit per second rate utilizing multiple level FSK transmission. Phase three will utilize 3200 baud multi-level FSK modulation with each FSK level representing two bits of information for a 6400 bps. transmission rate.

The 1600 baud modified ERMES protocol has been designed as a time-slotted, fully synchronous protocol. It derives much of its architecture from three previous signaling technologies. Message interleaving to increase fade resistance and the basic structure of the error correction and data blocks are derived directly from the European ERMES protocol. The time synchronization techniques are similar to previous RDS and MBS synchronous subcarrier systems that were developed in Europe for subcarrier messaging. The basic BCH error correction code and messaging architecture have been derived from the POCSAG protocol.

The 1600 baud modified ERMES protocol consists of 128 frames of information that are sent over a period of four minutes. A frame is composed of 150 MS of synchronization preamble and eleven blocks containing information each being 160 MS in duration.

The 150 MS of synchronization preamble contains three basic components called sync one, frame information, and sync two. The sync one portion permits the receiver to synchronize upon waking up during its respective frame. Frame information is then transmitted that can alert the receiver as to the proposed data rate that would be transmitted during the balance of the frame.

Sync two then permits the receiver to transition to the new baud rate if indeed the baud rate is different than 1600 baud.

The eleven blocks of information that follow the synchronization are typically divided into three categories. Blocks zero and one are typically utilized for addressing of the receivers contained within that frame. Approximately eight addresses can be contained per block permitting as many as sixteen receivers to be addressed in a single frame. Block two typically contains message vectors. A message vector points the receiver that was addressed in block zero or one to a following block to locate its messages. Blocks three thru ten will then contain messaging information for the receivers addressed in blocks zero and one.

The eleven blocks of information that follow the synchronization are typically divided into three categories. Blocks zero and one are typically utilized for addressing of the receivers contained within that frame. Approximately eigth addresses can be contained per block permitting as many as sixteen receivers to be addressed in a single frame. Block two typically contains message vectors. A message vector points the receiver that was addressed in block zero or one to a following block to locate its messages. Blocks three thru ten contain messaging information for the receivers addressed in blocks zero and one.

Like in the POCSAG protocol that has been previously described, a BCH error correction code is utilized with the modified ERMES protocol with thirty-two bits per frame with eleven bits of error correction code to permit the receivers to correct bit errors up to a two bit error. Furthermore, the messages are interleaved so that all of the bits for a particular numeric or alphanumeric character are not transmitted sequentially. The low order bits of each character are transmitted first, followed by ascending order binary bits until the entire message has been sent. This increases the fade resistance of the 1600 baud protocol to approximately ten MS. Each block contains eight thirty-two bit words that then permit each word to contain five numeric digits or 2.85 seven bit alphanumeric characters. This portion of the 1600 baud protocol is identical to that of the POCSAG protocol and its architecture. Each block is therefore capable of containing as many as forty numeric digits of 22.8 seven bit alphanumeric characters.

Like the POCSAG protocol, certain restrictions apply to the 1600 baud modified ERMES protocol. Any portions of a block that are unused by message information must be filled with filler code. This introduces the same type of inefficiencies that are present in the POCSAG protocol.

As the eight words within a block have to contain five numeric digits and the bulk of numeric messaging requires seven digits, a significant percentage of filler code must be utilized to fill in the remainder of the unused words within a block.

A second inefficiency exists in the inherent architecture of the 1600 baud modified ERMES protocol that also exists in the POCSAG protocol. Pagers are selectively assigned to "time slots" and can only receive messages during their respective time slot, therefore great care in the even distribution of time slots (pager ID's) must be exercised. Like the POCSAG protocol, the 1600 baud modified ERMES protocol relies on the randomness of paging events to prevent excessive time delays being caused by multiple messages to pagers within the same time slot occurring at the same time. However, the 1600 baud modified ERMES protocol has a further encumbrance that its overall cycle time can be as long as four minutes. If the receiver's frame is unavailable due to high message traffic, it could wait as long as four, eight, or twelve minutes to receive its message.

This differs considerably from the POCSAG protocol in terms of time latency as POCSAG goes through a complete cycle in slightly over 1 second. If a POCSAG protocol frame for a respective pager is filled with other messages, the next frame will be available for transmission in one second.

To overcome this problem, the 1600 baud modified ERMES protocol has proposed utilization of less than the full one hundred twenty eight frames. However, this tends to have two factors that are detrimental to the paging subscriber. The first is a respective shortening of battery lifespan, and the second is a crowding of receivers into their respective frames. This crowding and clustering of receivers into smaller numbers of frames will tend to extend the waiting period by multiples of time that are dependent upon how quickly the frames cycle.

It has been proposed that in order to allow the 1600 baud modified ERMES protocol to be intermixed with current POCSAG protocol traffic, the frame duration should be shortened to one cluster of frames per minute. This basically introduces a sixty second time delay that, when averaged, would equal at least a thirty second message latency. However, during peak busy hour periods, this latency would be in multiples of not thirty seconds average, but thirty seconds for the first delay plus sixty seconds for each delay cycle thereafter. Simply explained this means that if a pager were to have to wait until the next frame, there would be an average delay of thirty seconds plus sixty seconds, or ninety seconds total. If the delay were to be two frames, it would be thirty seconds average plus sixty seconds average plus sixty seconds or two and one-half minutes.

Like the POCSAG protocol, the air-time latencies degrade the modified ERMES protocol considerably when addressing alphanumeric messaging. The national average for an alphanumeric message is forty characters. The 1600 baud modified ERMES protocol (like POCSAG) can borrow blocks of information to permit the forty character message to be delivered to a receiver. As each block has a maximum capacity of 22.8 characters, two blocks will be needed to transmit the alphanumeric message. If messages of longer duration are desired, the maximum character length for a single frame would be approximately one hundred eighty characters.

Like the POCSAG protocol, the 1600 baud modified ERMES protocol utilizes only seven bit characters. In order to address eight bit characters (as commonly used by computers), it is necessary to send commands that permit the receiver or external device connected to a receiver to permit the equivalent of straight binary information to be transmitted. This places a great deal of overhead on the external devices to receive this binary information and process it into true eight bit characters after decoding the interleaving and BCH error correction codes.

In terms of protocol efficiency, it appears that the 1600 baud modified ERMES protocol has slightly more overhead than the POCSAG protocol. Although the address information is similar to the POCSAG protocol, additional information containing message vectors must also be transmitted to the 1600 baud receiver. As the block architecture and the BCH error correction code are identical, this would tend to lower the effective data throughput rate of the 1600 baud modified ERMES protocol.

A potential for interference exists when POCSAG and modified ERMES protocol pagers are interleaved on a channel. The POCSAG protocol typically transmits at 512 baud. The time per baud is 1953 microseconds. The 1600 baud modified ERMES protocol has a time duration of 625 microseconds per baud. Three bauds would equal 1875 microseconds. A comparison of the 1875 microsecond baud duration and the POCSAG protocol 1953 microsecond duration, yields less than a 5% time differential.

POCSAG protocol pagers, in order to quickly synchronize to the preamble, have a relatively wide synchronization bandwidth. For example, a 512 baud POCSAG protocol pager is capable of synchronizing to any data rate between 400 and 600 baud. This wide bandwidth is necessary to allow the POCSAG protocol pager to synchronize in a minimal amount of time to the POCSAG preamble. Although somewhat of a misnomer, the preamble is actually the portion of the POCSAG protocol signal that time synchronizes the receiver. The sync word that follows the preamble only serves to tell the pagers the correct bit timing order. The sync word is actually an unused ID or capcode that the POCSAG protocol pager searches for to obtain a match. Once a match is found, the POCSAG protocol pager can then establish the bit order or significance and can then begin proper decoding of the binary information that follows. It also uses the sync word to begin counting to permit it to decode a message in its corresponding frame.

As a POCSAG protocol pager detects the 1600 baud data rate transitions, it attempts to search for the synchronization or the sync code word. During the presence of 1600 baud information, the POCSAG protocol pager remains on for as long as several seconds after the completion of 1600 baud data transmission. As will be described later, this causes a severe degradation in the POCSAG protocol receiver's battery life when attempts at intermixing 512 and 1200 baud POCSAG protocol receivers with the 1600 baud modified ERMES protocol are made.

The 1600 baud data transmission of the modified ERMES protocol apparently has another adverse effect on the POCSAG protocol receiver. As a consequence of POCSAG protocol receivers relying on the preamble to determine their bit timing synchronization and having to maintain such synchronization for at least one second, another detrimental effect in the intermixing of the 1600 baud modified ERMES protocol with the POCSAG protocol is experienced. Once POCSAG protocol receivers synchronize to the 1600 bit per second data rate, they are not capable of re-syncing to the true POCSAG data rate if a POCSAG message immediately follows a 1600 baud message. To overcome this problem, one manufacturer has recommended that a POCSAG protocol warm-up be transmitted after a 1600 baud modified ERMES protocol message has terminated. This "POCSAG protocol warm-up" consists of 400 MS of 750 baud data of zeros and ones to be transmitted prior to the transmission of a 512 baud POCSAG protocol message. Although it has been termed a POCSAG protocol warm-up, it is quite to the contrary. Sending 750 baud to a POCSAG protocol pager will not cause the POCSAG protocol receiver to wake-up and attempt to synchronize. However, if the POCSAG protocol pager were on and synchronized to the 1600 baud modified ERMES protocol, the transmission of the POCSAG protocol warm-up will immediately cause the POCSAG protocol pager to return to sample mode. Therefore, it appears that this 750 baud POCSAG protocol warm-up is instead a de-sync signal.

A common misconception in the wireless industry concerns the term "baud rate". It is easy to conceive that a higher baud rate directly controls the number of pagers per channel. This is in part due to the fact that baud rate as pertaining to computers is thought in "wireless" terms when a calculation as to the character speed is determined. Typically, a computer sends eight to eleven bits of information per character, and one simply divides that number into the baud rate to determine how fast information is transmitted. The fact is the baud rate is only a portion of the analysis. Unlike wireline computers that are connected with telephone lines, radio transmission requires additional "overhead" to be added to the signaling protocol due to its "one way" nature. Radio paging or one-way information transmission does not have the wire-line or two-way wireless privilege of requesting a second transmitted message if an error is received. Radio paging is a "one time" transmission that is "one way". Manufacturers of radio paging equipment therefore must encode additional information to permit the pager to correct errors caused by radio transmission problems. Instead of eight to eleven "bits" representing a character, as many as thirty bits may be required. This correction overhead is called "error correction", and in some methods reduces the data transmission rate to the pager by as much as 75%. If half of the 1200 baud data rate is utilized for error correction, the effective data rate is 600 baud. The speed or "baud" rate is further reduced by "overhead" SYNC and "wake-up" preambles that must be sent to prepare the paging receiver prior to the transmission of an actual message.

Error correction code embedded in a frame of data bits is used to serially process the bits of the frame to correct minor bit errors such as one or two bits which occur anywhere in the frame. The serial processing of the bits of a frame which contain data and error correction code is typically implemented with a series of EXCLUSIVE OR gates. When a number of bit errors in a frame exceeds the error correction capacity of the error correction code, the data within the frame is erroneous. The prior art methods of wireless data transmission do not permit the recovery of valid data bits from a frame containing a number of bit errors which exceed the bit error correction capacity of the embedded error code which for most types of data transmission protocols is two bits.

The operating environment has by far the greatest impact on the reliability of the paging system. Geographical terrain, the operating frequency, the presence of man-made structures, and natural and man-made noise all have a collective impact on the operating efficiency of the current state of art in paging systems. If the radio signal cannot reach the paging receiver, the sensitivity of the receiver or the error correction in the protocol has little purpose. The first requirement of a paging system is to therefore provide a good radio paging signal at all the areas of the paging system's service area.

Geographical terrain of the paging service area determines the number of transmitter sites and the antenna patterns required to provide the necessary "Carey" coverage or service area. The less the variation in terrain, the more evenly distributed the RF field is, and the easier it is to obtain reliable service area coverage. Man-made objects (such as buildings) and geographic variations (hills) tend to cause shadows by blocking the "line of sight" paging signal. In a metropolitan radio environment, the receiver is subjected to a very hostile environment. The paging receiver is subject to multi-path interference, impulse noise, simulcast beats, and in many systems with multiple transmitters, non-synchronization of the transmitters. These phenomena are further compounded by building shadow effects and building penetration attenuation of the signal. All of the mentioned phenomena serve to reduce the reliability of the receiver. Higher power transmitters and multiple transmitters can alleviate a portion of the aforementioned problems, and increase other problems (e.g. multi-path, simulcast beats, and non-synchronized transmitters). It is not a simple problem to resolve, as numerous other problems exist which complicate the reliability of radio messaging services in a given area.

Previously, analog pagers utilized forms of active filters to decode the addressing tones. The active filters in the pagers were very sensitive to any form of phase or any other form of distortion that modified the sinusoidal signaling wave forms. Analog pagers required a "perfect" sine wave to properly decode and alert the user. Hence the reason for precise phasing of transmitters and synchronized transmitters (simulcast) systems were necessary to accommodate the active filter decoders in the pagers. Even with synchronization and, proper phasing of the station, the pager often decoded unreliably when located at the midpoint between two transmitters.

The move to digital encoding methods resulted from these former analog problems. In the early 1980's, digital transmitting and paging products were introduced by manufacturers that did not experience the problems associated with analog pagers. It was thought of as the only method to reliably send numeric data to a paging receiver considering that in 1980 analog technology was limited to 300 baud and yet digital technologies could transmit 600 to 1200 baud data, this was correct. It was not an inexpensive move, as literally every piece of equipment in the carrier's system required replacement. Paging terminals, base stations, and modems had to be purchased to replace the existing analog equipment. Digital paging also required that additional base stations be added to provide the increased signal strength necessary for reliable data stream reception by the pager. The deficiencies found in the analog technologies were eliminated by the move. Digital pagers did not share the problematic phase errors found in their analog counterparts. Research for new developments in analog technologies were abandoned by the pager manufacturers for several reasons. Analog technology was not as advanced in the early eighties (digital signal processing of analog signals was not available), and by emphasizing sales of digital systems, communication equipment manufacturers could increase sales of replacement base stations and paging terminals dramatically.

In this decade, advances in analog decoding technology have increased dramatically. Data transmission rates of 19,000 baud on ordinary telephone lines are common (as compared to 300 baud in 1980). Microprocessor assisted digital signal processors are available on a single chip with decoding sensitivities unheard of in 1980.

Even with the increased transmitter maintenance, the cumulative effects of mis-synchronization of the radio transmitters, Rayleigh fading, and man-made noise reduce the reliability of the current digital receivers noticeably. The overall fade tolerance at 2400 baud is less than one millisecond. A gap in the data transmission in excess of one millisecond causes the message receiver to terminate the receiving process.

There is a need in the art for a messaging protocol to be compatible on both analog and digital radio transmitting systems. The above-referenced patents disclose a protocol which is compatible with analog and digital transmitters. The protocol disclosed in these patents is approximately 99% reliable for the transmission of a 450 character message but is slower than the POCSAG protocol by a factor of approximately four. The protocol disclosed in the above-referenced patents like the POCSAG and GOLAY protocols transmits serial data frames with embedded error correction code. This protocol is immune to a fade duration of up to 100 milliseconds. The radiated power required to broadcast this protocol is approximately equal to that required for the POCSAG or Golay protocols.

The majority of the messaging radio transmitting systems (220 MHz. has less) have radio channels allocated that utilize 5 KHz transmitter deviation limits and transmitted audio bandwidths that are limited to 300 to 3000 Hz. The digital transmitters currently in service have modems that may limit the data rate to 1200 baud (1200 Hz. subcarrier). Compatibility with the current transmitter infrastructure with any new protocol is imperative to provide universal compatibility. The 1200 baud limitation is typically a constraint by the current design of the integrated modems which the digital base stations utilize. The bandwidth of current radio transmitters can accept faster data rates if the bandwidth of the digital modems is increased.

As is apparent from the description of the POCSAG protocol above, these are fundamental problems of increasing its data throughput. The problems are caused by the propensity of atmospheric serial information transmission to semi-synchronous receivers to be subject to unpredictable interruptions caused by atmospheric fades which degrade the atmospheric transmission below the noise threshold of the receiver. As has been pointed out above, a three bit error may cause a total loss of synchronism between an information transmission and a POCSAG protocol receiver from which the receiver cannot recover with the remainder of the transmission after the fade being lost with the receiver going into a search mode to look for another transmission of an address of the receiver.

When the probability of a loss of synchronism becomes high, the use of a transmission medium goes down. The POCSAG protocol has a reliability of around 95% for a seven character message which means that a 5% chance exists of losing one or more digits of the transmission. A higher reliability is needed for data transmissions between computers to make one-way serial atmospheric data transmission a widespread methodology.

An analysis of atmospheric transmission using the prior art protocols in accordance with accepted mathematical relationships for evaluating atmospheric radio frequency transmissions follows which reveals that they are poorly suited to data transmissions of more than a few characters in length.

Fading Rate $$F_o = SF/670 \quad (1)$$
$S$ = Speed MPH
$F$ = Frequency in MHz
$F_o$ = Hz Fade Length $$t = \frac{1}{2}rF_o(e^{+.693r^2} - 1) \quad (2)$$
$r = ST/SM$ Threshold/Median The threshold ST is the receiver threshold detection level and the median SM is the median field strength level.

Fade Below Threshold $$F_R = 2re^{-.693r^2}F_o \quad (3)$$

Probability of Message Loss $$P(\text{error}) = 1 - e^{-F_R L P_w} \quad (4)$$
$L$ = Message Time (Length)
$P_w$ = Probability of fade larger than catastrophic failure length
$P_w = 1.5e^{-1.1t/\bar{t}}$ The quantity $\bar{t}$ is the net probability of a fade divided by the mean rate of fading and equals $$\tfrac{1}{2}rF_o(e^{+0.693r^2}-1) \quad (5)$$

The fading rate $F_o$ is the natural frequency at which atmospheric radio frequency transmissions periodically fade as a function of the channel frequency $F_o$ and the speed of the receiver or transceiver if the system is a one-way or two-way wireless system in miles per hour; the fade length t in seconds is the length of fade; the fade below threshold FR is the time duration in seconds that a transmission drops below the detection capability of the receiver; and the probability of message loss $P_{(error)}$ is the probability that a message transmission will not be completed as a result of a lost of synchronism between the data transmission and the receiver. See S. O. Rice; Statistical Properties of a Sine Wave Plus Random Noise; Bell System Technical Journal, January, 1948; T. A. Freeburg; An Accurate Simulation of Multipath Fading; Paper; 1980; Caples, Massad, Minor; UHF Channel Simulator for Digital Mobile Radio; IEEE VT-29; May 1980; and P. Mabey, D. Ball; Application of CCIR Radio Paging Code No. 1; 35th IEEE V.T. Conf.; May 1985 for a discussion of the above-referenced equations.

FIG. 4 illustrates a diagram of a prior art encoding mechanism used to encode prior art paging protocols such as POCSAG, GOLAY, 2 Tone and 5/6 Tone, etc. This encoding mechanism has also been used to encode and decode two-way mobile data formats. This encoding mechanism is a Hi-Cap Multiswitch Model DMF-4000 manufactured by ESA Telecom Systems Group, Inc. of 10345 S. Oxford, Chicago Ridge, Ill. 60415. The encoding contains the necessary microelectronics to encode the protocols and forward them to the transmitter. The encoding mechanism utilizes a distributed processing architecture to permit the receipt of messages from the public switch telephone network (PSTN), provides the necessary subscriber verification and validation, encodes the protocols, and gain access to the radio transmitting system. The higher level processor consists of a central processing unit 30, a read only memory 32 that contains the BIOS, a random access memory 34 that stores in buffers both message and system operational information, a hard and soft disk drive 36 that are utilized to store the main operating program and subscriber file information, a printer/billing port 38 for the logging of system activity and service updates, maintenance port modem 40 for diagnostics in the event of a system malfunction, and a resident keyboard and monitor 42 to allow access to the main processing unit for addition of subscribers and system maintenance.

The main processor, which is comprised of items 30–42, contains the system operating program and control mechanisms that communicate to the peripheral modules 46–56 via the PCM matrix switch and data board buffers 44 and bus 58. The PCM matrix switch 44 contains the digital and audio matrix that permits any of the resident modules 46–50 to send audio and digital information between each other and the main CPU. It is also responsible for buffering data from and to the various peripheral modules 46–56 to permit the system to grow in size to accommodate the messaging traffic as needed. Each of the peripheral cards 46–56 contains one or more board resident processors that further process information and relieve processing overhead from the main CPU. It is with this distributed processing architecture which permits the encoding mechanism to be expanded to accommodate several hundred input ports and numerous radio channels. When the encoding mechanism is connected to a two-way system, dotted line bidirectional arrows are used to identify the two-way communication paths. Additionally, the radio station control may be comprised of multiple modules which each are connected to one or more base stations (not illustrated).

In order to gain a complete understanding of how the encoding mechanism of FIG. 4 functions, it is advantageous to understand how a message is processed from receipt by the encoding mechanism from the PSTN and ultimately delivered to the radio transmitting system connected to the encoding mechanism for transmission to the receiver. To send a message to the receiver, a message originator calls via the public switch telephone network PSTN to one of the encoding mechanisms telephone ports. Three telephone port configurations are described here being direct inward dial trunks 46, direct outward dial trunks 48, and/or mixed frequency trunks 50 which can both answer and originate calls. The three basic trunk configurations are necessary to accommodate the various telephone interfacing requirements that are necessary to interface from the PSTN to the encoding mechanism at its particular location. Details of the trunk configurations are known. The modems function to convert digital formatted information to analog for transmission by telephone lines. The protocol encoder 54 permits multiple protocols to be encoded which is common with paging systems which sequentially broadcast in different protocols. The radio station control interfaces the encoding mechanism with a radio transmitter or radio system control. If the protocol encoder 54 is encoding two-way protocols, one or more radio station controls 56 and/or one or more bidirectional lines are connected to the one or more radio station controls.

Upon receipt of the message recipient's telephone or ID number, the message entry process begins. The main CPU 30 looks up in the customer file the necessary message decoders that must be connected to the previously described telephone trunk modules. Referring to FIG. 4, the main CPU 30 may connect any number of modems individually or simultaneously to permit the decoding of medium to high speed serial data decoders. This is accomplished by connections through the PCM matrix switch 44 to one or more modem modules 52 that are connected to the digital data and PCM bus highways 58. In some cases it may not be known which type of entry modem or entry protocol is being used, and in this situation the resident decoders on the respective telephone trunk modules 46–50 are responsible for decoding DTMF entry protocols and higher speed modem protocols are decoded by the modem modules 52.

The encoding mechanism of FIG. 4 is designed to receive numerous numeric and alphanumeric entry formats from the message originator. They include DTMF (Dual Tone Multiple Frequency) overdial for a numeric message that can be directly encoded from a telephone keypad. An alphanumeric DTMF entry process can be entered by a two button press entry scenario that corresponds to the desired alphanumeric character that is displayed on the keypad. Message originators that are utilizing a PC that have a modem can also enter a similar DTMF alphanumeric format by software packages that reside in the PC that direct the PC's modem to send DTMF tones. All of the aforementioned DTMF message entry formats are decoded by resident DTMF decoders on the respective telephone trunk modules.

Higher speed formats utilizing Bell and CCITT formats permit messages to be sent at 300, 600, 1200 and 2400 baud formats. In the event that the higher speed protocols are utilized, a modem module 52 is connected to the respective telephone trunk module via the digital data and PCM data bus 58. The modem module 52 is capable of auto-adjusting to the desired speed and format of the message originators modem.

Upon completion of receipt of the message, the main processor 30 is alerted to permit a message transfer. In the event of a DTMF message, the message has been temporarily stored on the respective telephone trunk module, or in the event of a higher speed data message it is stored and temporarily buffered on the modem module 52. The message is then transferred to the main CPU 30 for further processing via the data bus buffer module 44. The main CPU 30 then looks up in the customer file the format of the receiver and stores the message in the respective batch buffers for that particular encoding format. The encoding mechanism described is capable of encoding numerous signalling formats that include analog 2-tone, 5/6 tone, POCSAG and Golay protocols.

In order to optimize and obtain the maximum air-time efficiency, messages for receivers with like signalling protocols are buffered and batched and are controlled by two entries that are programmable via the systems menu. The two entries are time and volume related. The number of characters that can be transmitted when the system controller gains access to the radio transmitting system are programmable as well as a predetermined period of time and/or both. In the event of very low traffic periods, it is typically the time entry that will precipitate the transmission of the messages that are stored in the main processor's batching buffers. In the event of high activity, it is the volume or number of characters that trigger the main CPU 30 to initiate accessing the radio transmitting system.

B. Two-Way Wireless Transmission

1. PCS, PCM and Mobile Data Services

There is a movement in the wireless industry towards providing sophisticated two-way data services to address the rapidly growing data marketplace. The Federal Communications Commission has auctioned new frequencies for new data services in frequency bands of 900 MHz. and above. There is also an ongoing re-evaluation of the existing radio 'service providers to evaluate their currently allocated radio spectrum to determine if they in turn can also address this new data marketplace.

Cellular system operators have evaluated their existing cellular mobile telephone frequencies and have determined with a minimal amount of hardware modification, data services can be directly addressed by their currently allocated and operational cellular channels. These frequencies reside in the eight hundred megahertz radio bands.

SMR system operators are also evaluating the utilization of their currently licensed frequencies. Historically utilized for voice dispatch, they are currently modifying their equipment architectures to accommodate the transmission of data. The SMR carriers are also attempting to adopt common data protocols that will permit the formation of wide area data systems that are compatible from region to region and from state to state.

Dormant IMTS mobile channels are also being evaluated (these exist in both the one hundred fifty and four hundred fifty megahertz radio bands) that also could accommodate mobile data services to address the marketplace.

To summarize, there are numerous frequencies that are available in the one fifty, four fifty, eight hundred and nine hundred megahertz radio bands that are currently allocated for two-way services that could include the transmission of data services based upon serial data protocols. Both one-way and two-way wireless systems use serial data protocols which have the common property that a single subcarrier is modulated to encode a single stream of serial information. A portion of frequencies to be auctioned by the Federal Communications Commission are to be for data services.

2. X.25 Packet Data Systems

X.25 packet data systems have been in existence for years. They were initially used for commercial dedicated network communications that were typically fixed point to fixed point in nature. The X.25 protocol is a CCITT packet protocol that has multiple layers and was originally designed for a wireline environment. It was adapted some years ago for the wireless environment and with some modifications has permitted packets to be sent with greater reliability in the wireless environment. The above-identified patents disclose a modification of the X.25 protocol. The primary difference between a wireless X.25 protocol and a wireline X.25 protocol is the fact that additional error correction as described above must be added to the wireless packets to increase the reliability of transmission. As the packet protocol is serial in nature, as much as fifty percent of the data transmitted pertains to error correction in an attempt to minimize the amount of packet retransmission that could occur when packets were improperly received at the destination. However, even with the added error correction, it became apparent that the fixed transmitting stations and the mobile equipment has to incorporate an added complexity in construction in an attempt to directly address the retransmission phenomenon when packets were improperly received by the destination equipment. This added complexity is in the form of additional processing equipment that has had to be located at fixed stations and also within the mobile equipment. There have been numerous permutations of additional equipment that are needed. It consists generally of added processing hardware which must store the received data message and then provide a degree of testing to insure that all of the information that was sent in the transmission was properly received. As data messages continue to increase in length, the complexity of the processing has increased correspondingly so that only portions of the received message would be retransmitted in the event of errors. The X.25 packets are divided into frames with each frame typically consisting of two hundred fifty-five characters. An error in an X.25 packet requires retransmission of the whole packet which adds substantial inefficiency to the data throughput.

If frame eight of a ten frame message contains an error, the receiving transceiving unit must wait until the entire packet is received. Then the receiving transceiving unit requests from the originating transceiver that frame number eight be retransmitted to the receiving transceiving unit. Retransmission of frame eight follows which leads to substantial overhead lowering the effective data throughput.

Regardless of the exact configuration of the equipment, it can be seen that an added complexity in the receiving/transceiving circuitry is needed to store the message during the evaluation process and to have the ability to request a retransmission of erroneous data. The entire message must be stored and then await for the erroneous data to be replaced in a new packet.

Not only is the complexity of the receiving/transceiving circuitry increased, the originator of the packet message also has a corresponding increase in equipment complexity. The originating transmitting facility associated with a base station has to store the entire message of ten frames of twenty five hundred characters and then hold that message until it receives verification from the receiving/transceiving unit or a request for missing frames of the transmitted information. Assuming that many data messages are constantly being processed and transmitted to many different transceivers, the complexity of the processing equipment at the data message originating end increases dramatically. In terms of air time efficiency, this retransmission of packets serves to reduce the numbers of subscribers that a two-way data mobile system is capable of accommodating.

Some of the wireless carriers have aligned with the European MPT1327 protocol. There are numerous permutations of this protocol each having different identifying numbers. The overall theory of operation remains essentially the same for each. It is a form of fast frequency shift keying (FFSK) that is utilized on narrow band radio channels. The MPT protocol in its most typical application is similar to that of many SMR systems. There is typically a setup channel and a number of working channels. The structure of the MPT protocol is such that it is similar to the one-way POCSAG protocol discussed above (CCIR radio paging code number one). The MPT protocol like the POCSAG protocol, is semi-synchronous in nature with time slots that can be allocated for messages to be sent to specific mobiles. The control channel is responsible for the tracking control of the mobile data units. The MPT protocol has the ability to handle voice as well as data transmissions. When voice or extended data transmissions are required, the mobile is sent to a traffic channel.

As discussed above regarding the X.25 protocol, the same complexities for both the receiving and transmitting transceiver are required for the MPT protocol to insure the reliable transmission of information when erroneous data transmissions occur. Essentially, the system must request a retransmission of the missing data which in turn lowers the throughput efficiency of the data system dramatically and therefore, lowers the number of subscribers that may be accommodated accordingly.

The European MPT protocol with its 63,48 cyclic code can tolerate bit fade error with varying results.

The more bit errors that are tolerated (five bits maximum or 4.166 milliseconds) the greater the probability of an erroneous data character will be received that could cause a problem. If the error occurs during the ID code or a channel change command, the result is a catastrophic loss in communications.

If the number of tolerable error bits are decreased to one or two bits, the decoding reliability increases considerably. However, the fade tolerance suffers a corresponding decrease (eight hundred thirty-three and sixteen hundred sixty-six microseconds respectively).

The MPT protocol is gaining an increased popularity for dispatch government, political, law enforcement, fire department and numerous other two-way radio data services that need both short data and analog communications. A loss of message or erroneous data characters can have serious consequences in an emergency situation. A wrong address to dispatch a fire truck or ambulance can cause a life threatening situation. A missed message from a police officer or a need for help situation can be fatal.

The semi-synchronous nature of the MPT protocol affords little tolerance for error correction of the data from the fading environment.

3. Cellular Data Systems

Cellular radio has an ability to address data services which is similar to the previously described two-way systems. Cellular operating frequencies are wideband in nature and permit both voice and data to be transmitted on a working channel. Much like the MPT protocol, cellular has a setup channel that communicates in a data only fashion to all of the mobiles that reside within a cell. This setup channel is responsible for keeping track of mobiles. Cellular systems have a data rate of approximately ten kilobaud that communicates to the cellular mobile units. The cellular system protocol is synchronous in nature and transmits data in a serial fashion.

Cellular radio systems have a similar problem that is experienced when fades occur during a transmission to a mobile that wishes to place or receive a call. The call setup process is aborted when bit error occurs during call setup. This typically gives the cellular mobile user a system busy response. In the case where a land to cellular mobile call is being attempted, the receipt of erroneous data precipitates a "mobile out of range" or "message to be received by the telephone party".

During a cellular mobile telephone call, the mobile is directed to a working channel by data sent to the mobile from the setup channel. Once the mobile is placed on a working channel, the voice conversation can begin and due to the wide operating bandwidth of the channel, both the voice conversation between three hundred and three thousand hertz can occur as well as ten kilobaud data stream that permits data to be sent from the mobile to the system or visa versa.

The amount of data that is sent on the cellular working channel is typically minimal. From the cellular system to the mobile, data is typically sent concerning a call hand off or an increase/decrease in operating power. When this information is subject to a fade that precipitates the loss of data, the mobile will either fail or erroneously change its power correspondingly resulting in a noisy conversation or cellular hand off information that is incorrectly received and a catastrophic failure with loss of call results.

4. Data Service Air Time Inefficiencies

Research by G. Cromack of Cromack Industries has indicated that the probability for data error increases when more data bits in a message are dedicated for error correction. The theoretical throughput is approximately eighteen percent for a mobile data communication's system. In reality, the data throughput of the mobile system can be as low as ten percent. This low throughput rate is due to a number of factors that relate to the design of the protocol utilized, and is in part, indirectly caused by the lack of robustness of the protocol to resist the effects of radio fading. In order to increase the efficiency and probability of reliable mobile data communications, the robustness of the protocol to resist fading of the data must be improved significantly.

5. Data Service Problematic Areas

Basically there are four distinct problematic areas that need to be addressed and the problems resolved to provide a substantial increase in air time efficiency. The four problematic areas serve to collectively combine to reduce the overall operating efficiency of a mobile data service. They are as follows:

a. Data Message Reliability

All of the current prior art data services are serial in format. There needs to be an improvement in the transmission of serial data that eliminates erroneous characters from being received. The primary cause of erroneously received characters is due to the phenomenon of fading. Fading for purposes of this explanation, as generally discussed above, is defined as any form of natural or man-made phenomenon that causes the median signal level to drop below that of the receiving circuitry's threshold receiving level. This fading could be caused by the effect of Rayleigh fading, multipath reception and waveform distortions caused by man-made or natural noises. The net effect of a fade is such that the receiver, transceiver or receiving circuitry associated with a base station experiences either an erroneous or lost character or, in a worst case, the loss of an entire message because of loss of synchronism. The fading phenomena takes place at all radio frequencies.

The cumulative effects of fading serve to substantially decrease air time efficiency of a mobile data channel. It first causes a mobile to request the retransmission of additional data that was missed or erroneously received due to the fade. Many of the serial protocols transmit blocks of characters that are two hundred fifty-five characters each. Even though there may only be five or six erroneous characters, the entire block of two hundred and fifty-five characters must be resent to the mobile. Additional air time is consumed by the mobiles request for retransmission of data, thereby making the radio channel unavailable to other mobile data units. The problem is further aggravated by the increased number of transmissions from mobiles requesting missing blocks of transmission of data to be retransmitted and the probability for mobile transmission collisions increases considerably. It is the collective combination of the added air time for the retransmission of missing data that typically requires a much greater number of characters to be retransmitted than the few missing characters, additional air time delays during transmissions, and the potential for additional collisions to occur, that cumulatively reduce the air time efficiency.

b. Increased Data Speed on Narrow Band Channels

Many of the serial digital data protocols transmit data at 1200 baud (subcarrier 1200 Hz.). At 1200 baud (or 1200 BPS), the actual data throughput speed when the number of error correction bits and other overheads are taken into account makes the data bit transmission rate very slow. This effectively reduces the number of mobile data units that can reside on an individual channel. In order to increase the number of mobile data units on the existing radio infrastructure, higher speed data protocols need to be implemented. The constraints of the current narrow bandwidth channels are such that a transmission philosophy must be compatible with the current bandwidth requirements to permit a high speed protocol to be implemented. If a data speed increase could be achieved, the number of mobile units that reside on a data channel could be increased correspondingly.

c. Median Field Strength

The median field strength for most data services is typically forty-three dbu. This corresponds approximately to 130 microvolts per meter of radio field strength. This field strength requirement is to permit a 95% reliability in the transmission and reception of data messages. This poses a problem with the current infrastructure in that to serve a metropolitan area, numerous radio transmitters and receivers are required to provide service. When multiple channels and a data service are accommodated, it becomes apparent that large numbers of radio transmitter receivers are required to provide reliable service in a metropolitan area. Techniques should be evaluated to reduce the number of radio transmitters necessary to provide reliable data service in a metropolitan area. If the median field strength can be reduced by one-half (e.g. three dbu), the number of transmitters can be reduced proportionately. Therefore any technological advance that could reduce the number of radio transmitters to provide such a data service has a net result in reducing capital plant equipment cost to the data service company, with a corresponding decrease in cost of service to the end data user.

d. Battery Consumption

Current mobile services are not sensitive to consumption of battery current. The electronics to process the receiving and transmitting of data messages have little impact on a vehicular transceiver that has an automotive battery at its disposal. However, there is a move in the industry towards increased portability and downsizing of very sophisticated computer products. Computers have progressed from twenty-five pound desktop devices to easily portable devices. Computers that are now this mobile and portable have a tremendous requirement for the receipt of wireless data. They are no longer confined to a desktop or dedicated telephone line to receive or transmit data information. However, with the downsizing and portability of these computer products, the battery power available for two-way transmission services becomes critical. The power output of the transceiver needs to be minimized in order to conserve battery life. More importantly, in order to gain the greatest savings in battery efficiency, the number of retransmissions to receive missed data must be reduced as much as possible. The previously described data speeds, field strength requirements, and robustness of the data protocol become critical factors to accommodate the portable devices which are anticipated to be introduced into the wireless marketplace.

The analysis of error rates described above with reference to one-way wireless communications involving digital protocols, such as POCSAG, is equally applicable to two-way wireless communications. Atmospheric fading causes two-way wireless systems to experience the same types of errors in transmissions between message originating transceivers and receiving circuitry associated with base stations (uplink) and transmissions between transmitters located at base stations (downlink) and message receiving transceivers as occur in one-way communication systems between a transmitter and a receiver.

DISCLOSURE OF INVENTION

The present invention is an improved one- and two-way method of wireless serial transmission of information subject to fading. The invention further is improved receiving circuitry used in receivers and transceivers and in association with base stations for reception of wireless serial transmissions of information subject to fading and improved transmitting circuitry used in transmitters, transceivers and in association with base stations for wireless transmission of serial information. The invention lessens erroneous information transmission caused by atmospheric fading by permitting error recovery and reconstruction of erroneous information which may not be corrected with error correction code contained in frames of the transmitted information, resynchronizes the clock of the receiving circuitry of transceivers and receivers and associated with base stations after the original receiving circuitry clock synchronism is lost. The invention also requires less radiated power than prior art one-way and two-way wireless systems to transmit serial information because of its error recovery, reconstruction and resynchronization capabilities.

First, the invention provides error recovery and reconstruction of data in frames comprised of data and error correction code bits consequent from the receiving circuitry using at least one processor (preferably a digital signal processor) to detect the presence of and position of erroneous uncorrectable bits within the frame in the circumstance when the bit error correction capacity of the error correction code is exceeded and, thereafter, processing the frames containing at least one erroneous uncorrectable bit to selectively reconstruct valid data therein which would be rendered erroneous when only error correction code processing is utilized to correct transmission errors. The computation by the at least one processor that a frame contains a number of bit errors exceeding the error correction capability of the error correction code of a frame (e.g. 3) is used to initialize a process of analyzing the bits of the complete frame including the data and error correction code bits to recognize a pattern of successive bit values representative of erroneous uncorrectable bits (e.g. all ones or all zeros) greater in number than the error correction code's bit correction capacity, which is typically two bits. Then a determination is made if that pattern of erroneous uncorrectable bits is totally within the error correction code bit field, which is indicative that the bits which are not within the bit field of the error correction code, are recoverable and valid.

Second, the invention permits resynchronization of the clock of the receiving circuitry after the original synchronization is lost by transmitting a synchronization marker contained within a frame group representative of an invalid data unit (e.g. 11000000 when extended as ASCII characters are being transmitted). Each frame group has at least one and preferably a plurality of frames with each frame being comprised of a plurality of data bits (e.g. 24) and a plurality of error correction code bits (e.g. 21) in the form, for example, of a 45, 21 BCH frame. Once one or more sequential frames are processed using the error correction code therein to determine that at least one frame has at least one erroneous uncorrectable bit, the processor of the receiving circuitry has determined the receiving circuitry's clock has lost its original synchronization. Thereafter, the at least one processor searches the stored detected bits of the frames using known techniques such as shifting of the bits stored in memory to detect and locate a synchronization marker transmitted in time after the at least one frame which has been determined to contain at least one erroneous uncorrectable bit. Location of the synchronization marker resynchronizes the clock of the receiving circuitry. A determination that the detected synchronism marker, which was transmitted after the transmission of the at least one frame containing the at least one erroneous uncorrectable bit, is within the transmission of the frames of information is confirmed by the at least one processor comparing a frame group address of a frame group containing one or more frames containing the at least one erroneous uncorrectable bit and a frame group address of a subsequently transmitted frame group containing the detected synchronization marker which is preferably a first frame group detected having a synchronization marker. The frame group address identifies a unique address of each frame group within a plurality of frame groups. Each frame group preferably contains a plurality of frames each including other bits which may encode for, example, data, identification information of the receiving circuitry and commands to be executed by the receiving circuitry and error correction code bits, the synchronization marker and the frame group address.

The frame group address of the frame group containing the detected synchronization marker is used to locate the synchronization marker address relative to the at least one frame containing the at least one erroneous uncorrectable bit. The frames which should be reconstructed after clock resynchronization include the frame(s) containing the at least one erroneous uncorrectable bit located by processing the error correction code, as described above, to the frames within the frame group containing the detected synchronization marker. Reconstruction processing of these frames permits recovery of valid data which would have been lost with the prior art's reliance on error correction code processing to correct transmission errors. The reconstruction process involves reprocessing each of the located frames first by determining if the frames contain valid bits outside the error correction bit field by processing the frames with the error correction code to determine if there are any erroneous uncorrectable bits in the frames and if no erroneous uncorrectable bits are present in the bits outside the error correction field, the bits outside the error correction field are stored as valid bits and the error correction code bits are discarded. Second, when the frames contain at least one erroneous and uncorrectable data bit determined from processing of the error correction code therein, a determination is made if the bits outside the error correction field are valid by locating where a pattern of a number of sequential bits of a single value (all zeros or all ones) are located in the frame with the number of sequential bits being greater than the error correction capacity of the error correction code. Bits outside the error correction code bit field are valid only when the pattern of all zeros or ones is located totally in the bit field of the error correction code. The valid bits are stored and the error correction code bit field bits are discarded and the invalid bits outside the error correction code bit field are marked by an error character and the error correction code bits are discarded.

As a result with the present invention, frames transmitted after the time of the fade causing the original clock synchronism to be lost until the end of the transmission of the frames of information are reconstructed after resynchronizing of the bit timing between the transmitter and receiver circuitry clock which would be permanently lost with prior art techniques. The reconstruction processing of the data frames, after resynchronizing the receiving circuitry, may be performed in either the forward or backward directions as determined by addresses of the frame groups containing the frames to be reconstructed. Consequently, frames transmitted both before and after the detected synchronization marker which resynchronizes the clock of the receiving circuitry are synchronously processed to recover and reconstruct valid data which in the prior art would have been lost because of loss of clock synchronism which terminated reception producing an unacceptably high data transmission error rate.

Less radiated power is required with the invention to transmit data without significant error than in the prior art. Fewer transmitters are required by the invention when compared to the prior art in a geographical area to provide a sufficiently strong electrical field required for a reliable low error rate data transmission as a result of reconstruction of frames containing at least one erroneous uncorrectable bit and to resynchronization of the receiving circuitry clock and thereafter, reconstruction of frames to recover valid data which would have been lost without resynchronization. The net effect of the invention on data reception is that the receiving circuitry clock is resynchronized with the transmitter for all fades except those fades which occur in the identification frame group which can prevent the identification by the receiving circuitry of its identification number in the information transmission and those fades which continue through and end of the information transmission described below.

In a wide area coverage system or a national system, savings in infrastructure resulting from requiring fewer base stations, etc. can save tens of millions of dollars per system. The reduction in infrastructure cost may be the difference between a data transmitting system being economical or uneconomical.

Faded information is any information or information units such as bits, bytes, or digital words caused by fading or other interference which are erroneous as a consequence of the serial information wireless transmission between the transmitting and receiving circuitry.

Erroneous uncorrectable bits are bits in frames which may not be corrected with error correction code contained in the frames. Fading of information may cause the receiving circuitry to output erroneous uncorrectable bits because of the loss of receiving circuitry clock timing.

As used herein, transmitting circuitry is circuitry associated with a transmitter, a base station or a transceiver which modulates the carrier with a subcarrier and modulates the subcarrier with serially encoded information to be wirelessly transmitted serially to receiving circuitry. Transmitting circuitry used for practicing the invention has many different and diverse possible forms.

As used herein, receiving circuitry is circuitry used in a receiver, transceiver switch or processor associated with a base station, etc. which detects the carrier, demodulates the subcarrier and processes the demodulated information which was modulated on the subcarrier in an encoded serial format by the transmitting circuitry. Receiving circuitry used for practicing the present invention has many different and diverse possible forms.

Individual cycles of a subcarrier may each respectively be modulated to contain part of a number of bits which make up each unit of transmitted information or data, such as the example below describing modulation of the squarewave subcarrier to encode individual eight bit characters into two sequential four bit nibbles which sequentially modulate halves of the same cycle of the subcarrier to encode the individual character or such as the example below describing modulation of a subcarrier having individual eight bit characters into sequential four bit nibbles modulated at discrete angular positions of two sequential cycles of the subcarrier. Alternatively, the individual modulated cycles of the subcarrier may each contain at least one complete unit of information or data such as an eight bit ASCII character.

The present invention has substantial advantages over the prior art data transmission protocols such as, but not limited to the POCSAG and the modified ERMES protocols. Serial information transmission is made with fewer transmission errors, at a higher data throughput rate with the transmission requiring less radiated power than with the prior art. With respect to the POCSAG protocol, the present invention will provide information transmission throughput rates which will be approximately an order of magnitude or more higher and an error rate which will be lower while not requiring substantial modification to the existing infrastructure. The invention may use approximately one quarter the radiated power level of the POCSAG protocol. Similarly, with respect to the modified ERMES protocol, the present invention will provide a higher data throughput rate with a lower error data rate with a much greater resistance to loss of synchronism caused by fading while requiring less radiated power requiring fewer base stations. Furthermore, the present invention will permit resynchronization of the clock of the receiving circuitry during the reception of the frames of information, which is not possible with any of the prior art protocols discussed above.

The present invention shares many of the same improved performance characteristics of the data transmission system which is the subject matter of the above-referenced patent application Ser. Nos. 07/850,275, 07/850,276 and 07/850,487 now abandoned and Ser. No. 08/112,256 now U.S. Pat. No. 5,446,759. As a consequence of the present invention transmitting the information in a serial format instead of as two parallel streams, as described in the above-identified applications, it will have twice the information transmission rate achieved by the data transmission system of the above-referenced patent application Ser. Nos. 07/850,275, 07/850,276, 07/850,487 and 08/112,256 without reliance on replacement of frames containing erroneous data with frames which are time offset from the faded frames that do not contain erroneous data as disclosed in the above-identified applications.

The invention provides wireless one or two-way transmission of information at high data rates even on channels such as on narrow band channels used for paging having 5 KHz FM deviation channel limits. With the invention, resynchronization is achieved between the broadcast serial information modulated on the subcarrier and the receiving circuitry even when atmospheric fades occur of a duration up to or greater than 400 milliseconds which is not possible with the prior art POCSAG protocol which has limited fade resistance representing a two-bit error or less which is typically two to four milliseconds and no resynchronization capability and the prior art modified ERMES protocol which has a fade resistance up to approximately fourteen milliseconds and no resynchronization capability.

In one preferred embodiment of the invention, quadrants of cycles of a sinusoidal subcarrier are modulated with the serial bits of the information and in another preferred embodiment, a squarewave subcarrier is: pulse width modulated with different pulse widths representative of different numeric values representative of bit groups encoding the serial information. These preferred subcarrier modulation techniques of the present invention provide for a greater amount of information to be modulated on each cycle of the subcarrier than with conventional digital modulation which provides for a single bit per half a cycle of the subcarrier and with the ERMES and modified ERMES protocols which are limited to four bits per cycle of the subcarrier. With the present invention, much higher data throughputs with a lower error rate are achievable on narrow data channels such as those channel bandwidths of the 150, 220, 450, 800, and 900 MHz. and above. For example, with a 2400 cycle sinusoidal subcarrier, data bit modulation rates of 19 KHz. are predictably achievable when processed with at least one digital signal processor as described below which optimizes the detection of data modulated on the subcarrier, as well as the reconstruction of frames containing erroneous uncorrectable data bits when processed with error correction codes and resynchronization of the receiving circuitry clock when a major fade occurs causing the transmitting and receiving circuitry to loose synchronization followed by the aforementioned reconstruction of frames.

The present invention uses conventional error correction codes such as, but not limited to, the BCH error correction code to correct minor bit errors in each of the frames detected by the receiving circuitry in the conventional manner. However, the receiving circuitry of the present invention when an uncorrectable error bit is detected in a frame containing other bits and error correction code bits, such as a three-bit error in the prior art POCSAG protocol which is substantial enough not be corrected by the error correction code and represents faded information which may cause synchronization to be lost between the transmitting circuitry and the clock of the receiving circuitry, outputs the received information with reconstructed frames having less error than achievable with the use of error correction code and when necessary, as determined by processing of the error correction code of the frames of information to detect one or more frames each containing at least one erroneous uncorrectable bit error and resynchronizes the clock of the receiving circuitry by locating a synchronization marker transmitted within a frame group. Resynchronization of the receiving circuitry clock permits the detected stored frames decoded by the receiving circuitry to be synchronously processed with the reconstruction technique of the invention to recover valid data which originally could not be processed reliably because of the loss of synchronism. Reconstruction of valid data bits after resynchronization is performed when (1) the error correction code correction capacity of the frames is not exceeded or when (2) the erroneous uncorrectable bits are determined to be totally within the error correction code bit field of a frame which is the condition required to reconstruct valid data in the presence of at least one uncorrectable bit error in a frame.

The present invention uses the pattern recognition capability of a digital signal processor to determine where in a frame at least one erroneous uncorrectable bit error exists. Valid data is reconstructed from a frame and stored in memory while discarding the error correction code bits of the frame when a pattern of erroneous bits in the form of a number of successive zeros or a number of successive ones contained totally within the bit field of the error correction code is detected with the number being greater than the bit error correction capacity of the error correction code. If any bits within the pattern of successive ones or zeros are located outside of the bit field of the error correction code, the data of the frame is considered invalid necessitating the storage in memory of the receiving circuitry of an error marker.

The at least one digital signal processor of the receiving circuitry provides for enhanced signal to noise response consequent from signal processing of the analog or digital subcarrier. The digital signal processing provides for extremely high speed integration of the modulated subcarrier which sums the energy encoding the modulated data on the subcarrier to produce highly accurate detection of the data. The detected individual cycles of the subcarrier are processed to calculate an integral of at least one selected modulated part of each of the individual cycles (e.g. one half of a pulse width modulated cycle of a squarewave subcarrier or an angular window centered on discrete spaced apart angular positions of an analog subcarrier). The integral is numerically compared with a plurality of stored numerical ranges which ranges each represent one of a plurality of possible numerical values that the selected part may encode to identify a stored range numerically including the calculated integral and substituting for the at least one selected part of each of the cycles the one of the plurality of numerical values representative of the identified stored range including the calculated integral with each numerical value encoding at least bit of the frames of the information. The numerical values may be that of a single bit or groups of bits.

The digital signal processor further processes the detected individual cycles of the subcarrier to further calculate the integral by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of the numerical values, the compared value is replaced with a value which is a function of the sample values adjacent the sample value which is replaced. The compared value is replaced with a value which is function of the values adjacent the sample value which is replaced. Preferably, the compared sample value is replaced with a value which is an average of the at least one sample value which precedes the sample value and the at least one sample value which succeeds the compared sample value.

A system for recovering faded information in a plurality of wirelessly transmitted frames of information in accordance with the invention includes transmitting circuitry for wirelessly transmitting a radio frequency carrier modulated with a subcarrier with the subcarrier being modulated with the plurality of frames of information, the plurality of frames of information including at least one frame which identifies receiving circuitry to receive the radio frequency carrier with each frame including a plurality of bits encoding error correction code in the plurality of other bits; and receiving circuitry for receiving the radio frequency carrier, detecting the bits of the transmitted frames modulated on the subcarrier and storing the detected bits, processing the stored bits of the frames with the error correction code therein to determine if the frames contain at least one erroneous uncorrectable bit which cannot be corrected with the error correction code therein, processing the bits of any frames which contain at least one erroneous uncorrectable bit to determine if the other bits of the at least one frame are valid bits, and storing the valid other bits of each frame. The receiving circuitry processes the plurality of bits of each frame determined to contain at least one erroneous uncorrectable bit to determine if the at least one erroneous uncorrectable bit is contained totally in the bits of the error correction code, and upon determination that the bits of the error correction code of each frame containing at least one erroneous uncorrectable bit totally contain the at least one uncorrectable bit, the receiving circuitry stores as valid other bits each of the other bits of each frame determined to contain the at least one erroneous uncorrectable bit totally in the bits of the error correction code. The receiving circuitry processes the plurality of bits of each frame determined to contain the at least one erroneous uncorrectable bit to determine if the bits of the error correction code of each frame containing at least one erroneous uncorrectable bit do not totally contain the at least one erroneous uncorrectable bit, and upon determination, that the bits of the error correction code of each frame containing at least one erroneous uncorrectable bit do not totally contain the at least one erroneous uncorrectable bit, the receiving circuitry stores as invalid other bits each of the other bits of each frame determined to contain at least one erroneous uncorrectable bit not totally in the bits of the error correction code.

The receiving circuitry processes the bits of the error correction code contained in each frame which contains at least one erroneous uncorrectable bit to search for a bit pattern of the erroneous uncorrectable bits totally within the bits of the error correction code; and the receiving circuitry stores the other bits as valid other bits when the bit pattern of erroneous uncorrectable bits is detected as being totally within the bits of the error correction code. The bit pattern is a number of successive bits having an identical numeric value of either zero or one with the number being at least one greater than a number of bits which may be corrected with the error correction code in a frame.

The plurality of frames comprise at least one identification frame and at least one data frame with the other bits of each identification frame comprising a plurality of bits encoding at least identification information of the receiving circuitry and the other bits of each data frame comprising the plurality of bits encoding data.

Cycles of the subcarrier are modulated with pulse width modulation with a width of parts of the carrier being modulated with at least one bit of the frames of information or cycles of the subcarrier are modulated with bits encoding the plurality of frames of information with each cycle of the subcarrier being modulated by bits at a plurality of separated angular positions. The receiving circuitry processes detected individual cycles of the subcarrier to calculate an integral of at least one selected modulated part of each of the individual cycles, numerically compares each of the calculated integrals with a plurality of stored numerical ranges which ranges each represent one of a plurality of possible numerical values that the selected part may encode to identify a stored range numerically including the calculated integral and substitutes for the at least one selected part of each of the cycles the one of the plurality of numerical values representative of the identified stored range including the calculated integral with each numerical value encoding at least one bit of the frames of information. The processing of the detected individual cycles of the subcarrier by the receiving circuitry includes calculating the integral by taking a plurality of samples of each selected modulated part of each of the individual cycles with each sample having a numerical value and each sample is compared with a range of numerical values representing a valid sample which should be included within this calculation of the integral and when the comparison reveals that the sample value is outside the range of the numerical values, the compared sample value is replaced with a value which is a function of the sample values adjacent the sample value which is replaced. The compared sample value is replaced with a value which is an average of at least one sample value which precedes the compared sample value and at least one sample value which exceeds the compared sample value.

A process for recovering faded information in the plurality of wirelessly transmitted frames of information using the aforementioned system includes the foregoing steps performed by the system.

A system for resynchronizing reception of a plurality of frames of wirelessly transmitted information in accordance with the invention includes transmitting circuitry for wirelessly transmitting a radio frequency carrier modulated with a subcarrier with the subcarrier being modulated with at least one identification frame group which identifies receiving circuitry to receive the information followed by at least one data frame group, each identification frame group comprising a plurality of frames with at least one of the plurality of frames of the identification group containing bits identifying the receiving circuitry to receive the radio frequency carrier, a plurality of bits of error correction code in each frame, synchronization information for originally synchronizing the clock of the receiving circuitry and a synchronization marker comprised of a plurality of bits which do not represent valid data for resynchronizing the clock of the receiving circuitry, each data frame group having a plurality of frames each including a plurality of bits of error correction code and a plurality of bits of data, and another synchronization marker comprised of a plurality of bits which do not represent valid data for resynchronizing the clock of the receiving circuitry; and wherein the receiving circuitry receives the radio frequency carrier, detects the bits of the at least one identification frame group and the at least one data frame group modulated on the subcarrier, the clock is originally synchronized in response to the synchronization information and at least one processor of the receiving circuitry causes storing in a memory the detected bits of the frames of the at least one identification frame and the frames of the at least one data frame, processes the stored bits of at least one frame with the error correction code therein to determine when the stored bits of the at least one frame contain at least one erroneous uncorrectable bit which cannot be corrected with the error correction code therein which is representative of the clock requiring resynchronization, and searches the stored bits transmitted after the stored bits of the at least one processed frame containing the at least one erroneous uncorrectable bit to detect a synchronization marker to resynchronize the clock. The at least one processor of the receiving circuitry processes the stored bits of a plurality of frames with the error correction code therein to determine when the stored bits of the plurality of frames each contain at least one erroneous uncorrectable bit which cannot be corrected with the error correction code therein which is representative of the clock requiring resynchronization, and searches the stored bits transmitted after the stored bits of the plurality of frames each containing the at least one erroneous uncorrectable bit to detect the synchronization marker to resynchronize the clock.

Each frame group contains a frame group address comprised of a plurality of bits which identify a unique address of the frame group within the plurality of frames of wirelessly transmitted information; and after resynchronization of the clock, the at least one processor of the receiving circuitry processes the bits of the frames in at least one frame group transmitted after the frame group containing the detected synchronization marker to determine if an address encoded with the at least one frame group transmitted after the frame group containing the detected synchronization marker identifies an address of a frame group contained within the transmission of the plurality of frames of information and when the address is an address of the frame group within the wireless transmission of the plurality of frames of information, processes the frames which were transmitted after the detected synchronization marker as part of the transmission of the plurality of frames of information and when the address is not an address within the wireless transmission of the plurality of frames of information ceases processing the transmission of the plurality of frames of information.

After resynchronization of the clock, the at least one processor of the receiving circuitry reconstructs the bits of frames within the frame group containing the detected synchronization marker to identify those frames within the frame group containing the detected synchronization marker which contain only valid bits outside the field of the error correction code bits and those frames which do not contain only valid data bits outside the field of the error correction code bits, causes storing in a memory the valid bits and stores an error marker where the invalid bits are found.

The at least one processor of the receiving circuitry processes the bits of the frames within the at least one frame group transmitted after the frame group containing the detected synchronization marker with the error correction code therein to determine if the plurality of bits of the frames therein contain at least one erroneous uncorrectable bit which cannot be corrected with the error correction code, causes storing in a memory bits outside a field of the error correction code as valid bits and discards the bits of the error correction code of the frames transmitted after the frame group containing the detected synchronization marker which do not contain any erroneous uncorrectable bits and processes the plurality of bits of each frame transmitted after the synchronization marker containing at least one erroneous uncorrectable bit to determine if the at least one erroneous uncorrectable bit is contained totally in the bits of the field of error correction code, and upon determination that the bits of the error correction field totally contain the at least one erroneous uncorrectable bit causes storing in a memory bits outside the field of the error correction code as valid bits and discards the bits of the error correction code of each frame containing the at least one erroneous uncorrectable bit totally in the bits of the error correction code and upon determination that the bits of the error correction code do not totally contain the at least one erroneous uncorrectable bit causes storing in a memory the bits outside the field of the error correction code as an error marker and discards the bits of the error correction code.

The at least one processor of the receiving circuitry processes the bits of frames within the frame group containing the detected synchronization marker with the error correction code therein to determine if the plurality of bits of the frames contain at least one erroneous uncorrectable bit which cannot be corrected with the error correction code therein, causes storing in a memory bits outside the field of the error correction code as valid bits, discards the bits of the error correction code bit field of frames which do not contain any erroneous uncorrectable bits and processes the plurality of bits of each frame containing the at least one erroneous uncorrectable bit to determine if the at least one erroneous uncorrectable bit is contained totally in the bits of the field of the error correction code, and upon determination, the bits of the error correction code field totally contain the at least one erroneous uncorrectable bit causes storing in a memory bits outside the field of the error correction code as valid bits and discards the bits of the error correction code of each frame containing the at least one erroneous uncorrectable bit totally in the bits of the error correction code and upon determination that the bits of the error correction code do not totally contain the at least one erroneous uncorrectable bit, causes storing in a memory the bits outside the field of the error correction code as an error marker and discards the bits of the error correction code.

The at least one processor of the receiving circuitry reprocesses the bits of the frames to be reconstructed with the error correction code therein to determine if the plurality of bits of the frames contain at least one erroneous uncorrectable bit which cannot be corrected with the error correction code therein, processes the plurality of bits of each frame containing the at least one erroneous uncorrectable bit to determine if the at least one erroneous uncorrectable bit is contained totally in the bits of the field of the error correction code, and upon determination of the bits of the error correction code field totally contain the at least one erroneous uncorrectable bit causes storing in a memory bits outside the field of the error correction code as valid bits and discards the bits of the error correction code of each frame containing the at least one erroneous uncorrectable bit totally in the bits of the error correction code and upon determination that the bits of the error correction code do not totally contain the at least one erroneous uncorrectable bits causes storing in a memory the bits outside the field of the error correction code as an error marker and discards the bits of the error correction code.

Cycles of the subcarrier are modulated with pulse width modulation with the width of parts of the subcarrier being modulated with at least one bit of the frames of information or cycles of the subcarrier are modulated with bits encoding the plurality of frames of information with each cycle of the subcarrier being modulated by the bits at a plurality of separated angular positions. The at least one processor of the receiving circuitry processes detected individual cycles of the subcarrier to calculate an integral of at least one selected modulated part of each of the individual cycles, numerically compares each of the calculated integrals with a plurality of stored numerical ranges which ranges each represent one of the plurality of possible numerical values that the selected part may encode to identify a stored range numerically including the calculated integral and substitutes for the at least one selected part of each of the cycles the one of the plurality of numerical values representative of the identified stored range including the calculated integral with each numerical value encoding at least one bit of the frames of information. The processing of the detected individual cycles of the subcarrier by the at least one processor of the receiving circuitry includes calculating the integral by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced. The compared sample value is replaced with a value which is an average of at least one sample value which precedes the compared sample value and at least one sample value which succeeds the sample value.

A process for resynchronizing reception of a plurality of frames of wirelessly transmitted information using the aforementioned system includes the foregoing steps performed by the system.

BRIEF DESCRIPTION OF DRAWINGS

FIG. 3 illustrates numeric POCSAG protocol transmissions.

FIG. 7 illustrates a block diagram of a one-way information transmission system in accordance with the present invention.

FIG. 9 illustrates pulse width modulation of the subcarrier to produce another form of the serial information encoded in accordance with the present invention.

FIGS. 23–25 illustrate examples of bit patterns of frames in accordance with the frame groups of FIGS. 5A–C containing erroneous uncorrectable bits that are processed by the digital signal processor of the receiving circuitry to attempt to reconstruct valid data which cannot be recovered by processing the frames with only the error correction code.

FIGS. 26A–C illustrate a flow chart of the processing performed by the digital signal processor of the receiving circuitry to reconstruct data within frames containing at least one erroneous uncorrectable bit, to resynchronize the clock of the receiving circuitry to synchronize processing of the frames of the frame groups of FIGS. 5A–C and after resynchronization to reconstruct frames beginning with the frames which were previously tested with the error correction code and determined to have at least one erroneous uncorrectable bit and continuing through the frames of the frame group containing the detailed synchronization marker.

Like reference numerals identify like parts throughout the drawings.

BEST MODE FOR CARRYING OUT THE INVENTION

Figure 1:
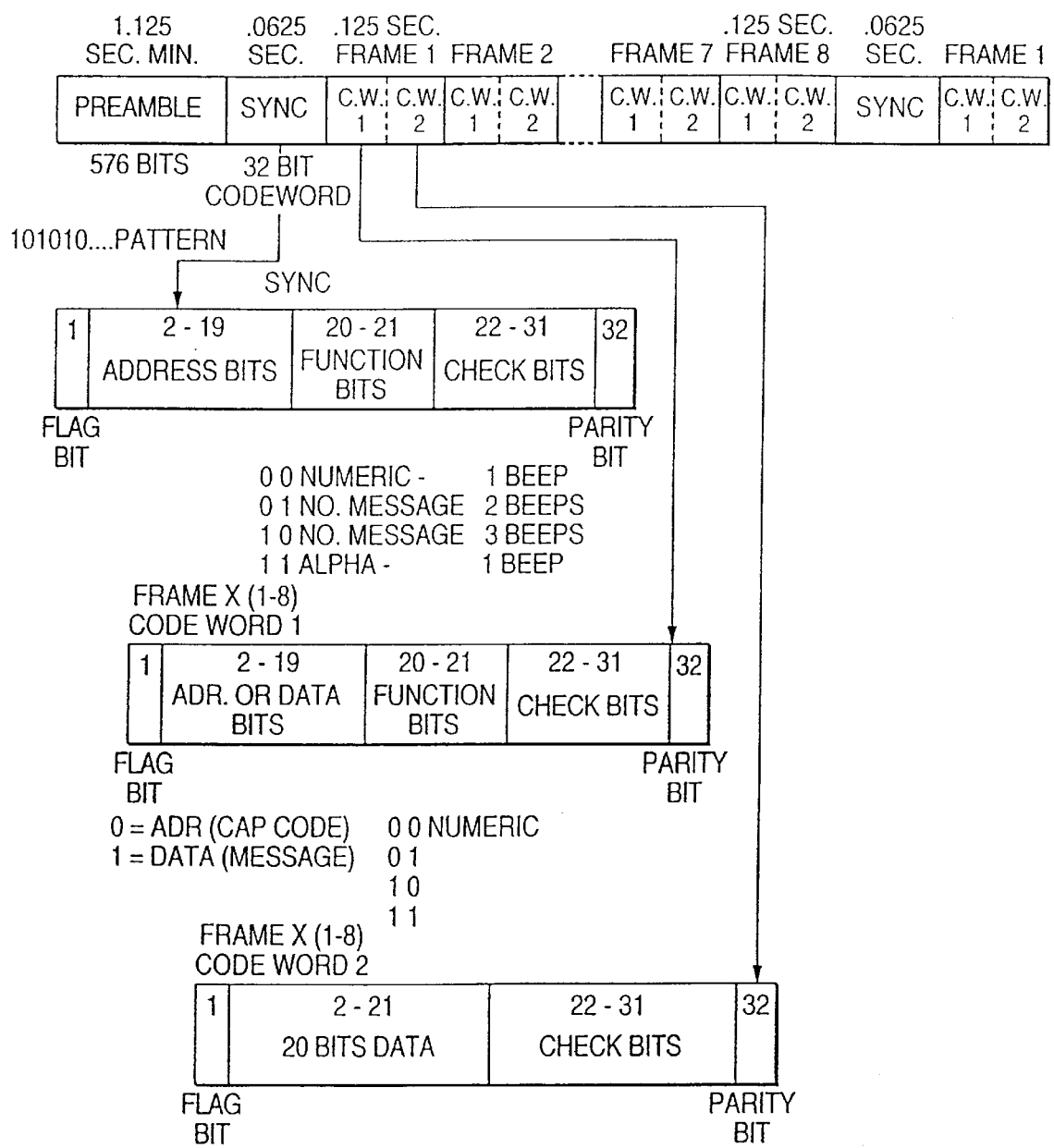
FIG. 1 illustrates a diagram of the prior art POCSAG protocol.
Figure 2:
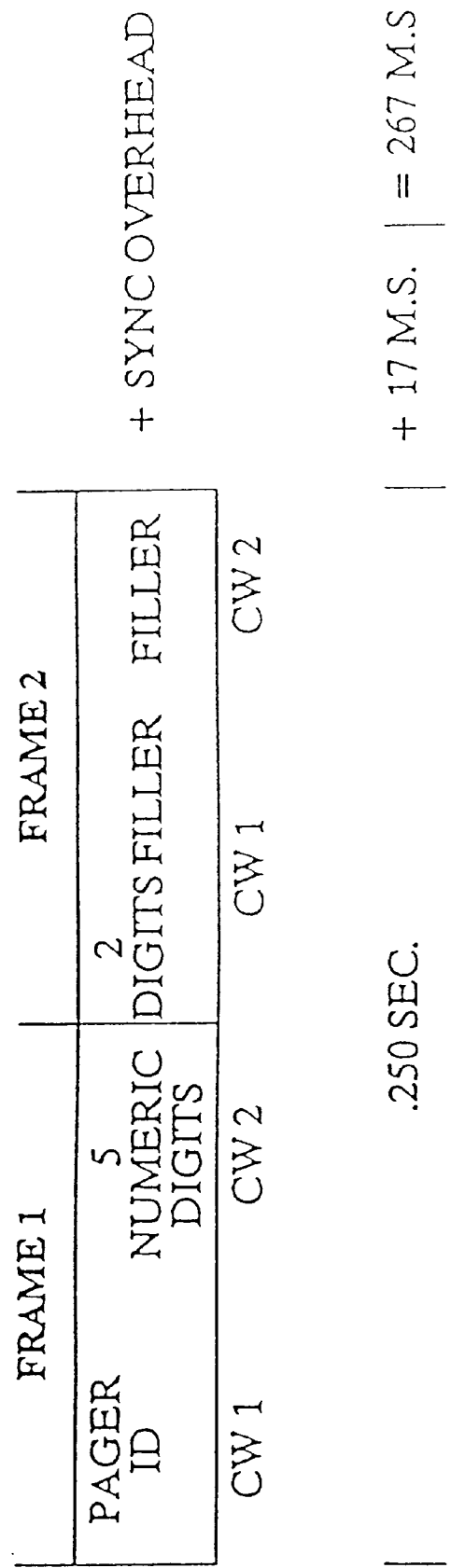
FIG. 2 illustrates a diagram of a typical seven digit numerical page using the POCSAG protocol.

The present invention is an improved one-way and two-way wireless serial information communication system and method of operation thereof having a higher data transmission rate, a lower error rate and requiring lower required radiated power than prior art one-way and two-way serial communication systems. The invention further is improved transmitting and receiving circuitry and a method of operation thereof for wireless transmission of serially encoded information.

The present invention provides reconstruction of data detected with the receiving circuitry which has been rendered erroneous by fading causing bit errors beyond the bit error correction capacity of error correction code contained in frames of information such as the BCH error correction code used in the prior art. The error correction code of each frame is processed with at least one processor, which preferably is a digital signal processor, to detect and analyze where erroneous uncorrectable bits are present in each frame which cannot be corrected using error correction code to permit reconstruction of valid bits outside the bit field of the error correction code where a bit pattern representative of a fade (e.g. successive all zeros or all ones) of a number of bits greater in number than the bit error correction code capability of the error correction code, such as two bits, is detected totally in the error correction code bit field of the frame.

Furthermore, the present invention resynchronizes the clock of the receiving circuitry after a series of one or more frames are determined by processing with the error correction code therein to have at least one erroneous uncorrectable bit which is representative of the detected receiving circuitry clock being out of synchronism with the subcarrier timing of the transmitting circuitry. Resynchronization of the clock of the receiving circuitry is accomplished by detecting a valid synchronization marker using known techniques, such as bit shifting in registers or memory of the decoded serial information, which has been transmitted after the one or more erroneous uncorrectable bits in at least one frame which have been detected by processing the frame with the error correction code contained therein. Resynchronization of the receiving circuitry clock enables subsequent synchronous processing of the frames transmitted before the detected synchronization marker to be processed as part of the reconstruction process and synchronous processing of frames transmitted after the detected synchronization marker. The frame group address transmitted with each frame group permits determination of the number of frames transmitted before the detected synchronization marker which must be processed as part of the reconstruction process occurring after resynchronization. All the frames, beginning with the at least one frame containing the at least one erroneous uncorrectable bit through the frames in the frame group containing the detected synchronization marker are again processed with the error correction code and bits outside the bit field of the error correction code are stored as valid bits and the bits of the error correction code are discarded when the bit error correction capacity of the error correction code of the frames is not exceeded. Moreover, after resynchronization, all of the reprocessed frames which are determined to contain erroneous uncorrectable bits which are determined to have the erroneous uncorrectable bits totally within the bit field of the error correction code have the bits outside the bit field of the error correction code stored as valid bits. Finally, an error character is stored to mark the bits of frames outside the bit field of the error correction code which cannot be reconstructed when one or more erroneous uncorrectable bits are determined to be outside the bit field of the error correction code. Furthermore, normal synchronous processing is performed of frames transmitted after the detected and synchronization marker resynchronizes the clock of the receiving circuitry including reconstruction of those frames which are determined to contain at least one erroneous uncorrectable bit. Conventional bit manipulation techniques may be used to locate the synchronization marker required for resynchronization such as bit shifting in registers or memory.

Figure 5A:
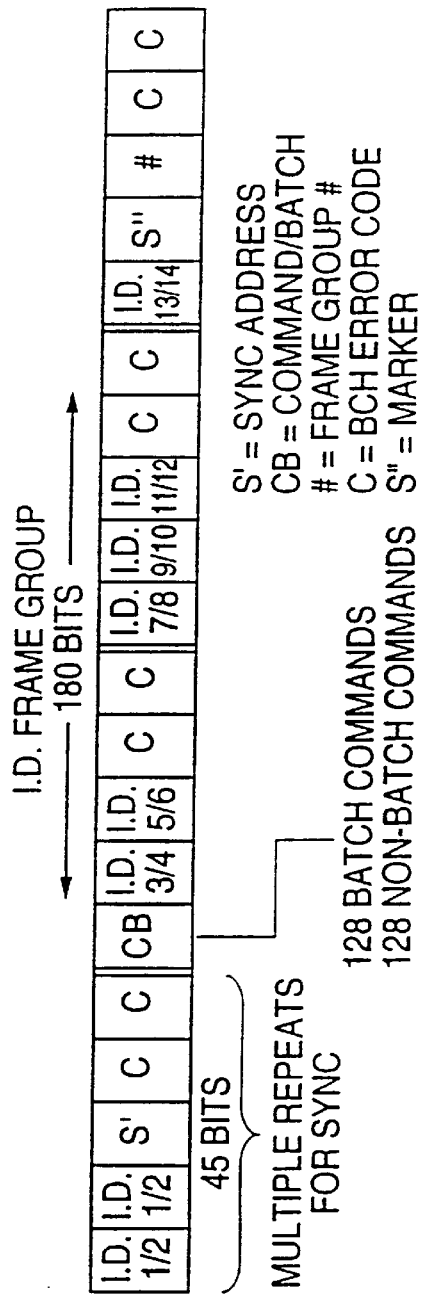
FIGS. 5A–C illustrate frame groups of frames of information formatted for serial wireless transmission in accordance with the present invention and FIG. 5D illustrates an alternative frame group of frames which may be used to send a smaller number of frames of information than with the frame groups of FIGS. 5A–C.
Figure 5B:
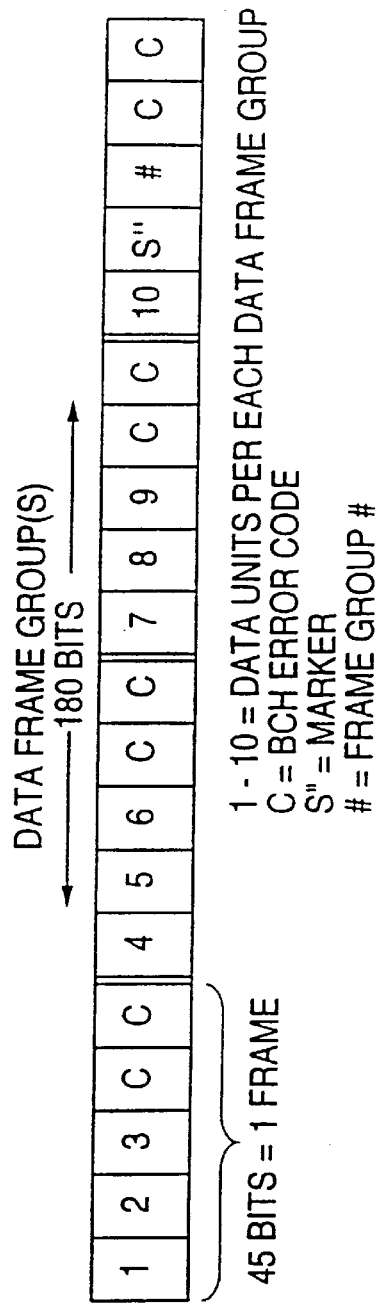
Figure 5C:
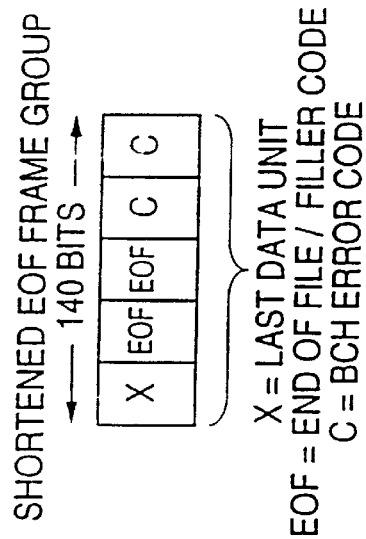

FIGS. 5A–5C illustrate an example of a preferred serial encoding format of information in accordance with the protocol of the present invention. The information is transmitted in time from left to right and from FIG. 5A to FIG. 5C such that the ID FRAME GROUP is followed by one or more DATA FRAME GROUPs, followed by the SHORTENED EOF FRAME GROUP. However, if the number of data units at the end of the transmission was one less (e.g. nine) than the total number of data units in the DATA FRAME GROUP (e.g. to ten) the EOF character could be placed in the data unit position ten of the DATA FRAME GROUP which eliminates transmission of the SHORTENED EOF FRAME GROUP. Each wireless transmission of information is typically comprised of three sequentially transmitted main blocks of frame groups respectively illustrated in FIGS. 5A–5C.

FIG. 5A illustrates the ID (identification) FRAME GROUP which is comprised of at least four frames each comprised of forty five bits. Each frame is comprised of twenty one bits of error correction code preferably of the BCH type. The bit groups "C" are respectively representative of groups of ten and eleven bits of BCH code which comprise the total of twenty one bits of error correction code and define the bit field of the error correction code. The bits which are not contained in the error correction code bit field are referred to as other bits. The preceding and remaining three bit groups each contain groups of eight bits. The first two eight bit groups each contain a repeat of eight bits of identification information each containing two four-bit nibbles respectively encoding the first two digits of the receiving circuitry identification which, along with the other identification nibbles three through fourteen, as illustrated, collectively uniquely identify the receiving circuitry to receive the information to be transmitted. The third eight bit group S' is a standard SYNC address well known in the art which performs the initial synchronization of the clock of the receiving circuitry. The first frame may be repeated multiple times as indicated.

The S' and ID wake-up fields have multiple purposes. One aspect of the S'/ID fields is to permit the coexistence of the protocol of the present invention with other radio messaging protocols on the same radio channel. Ninety-five percent of the current radio messaging infrastructure utilized for paging has multiple messaging formats which are intermixed in a non-time synchronized fashion. The protocol of the present invention, unlike the modified ERMES protocol, may coexist with other industry standard protocols without interference, and does not cause interference or degrade reception. The same benefit of the invention also exists for its application to two-way wireless systems.

The S'/ID fields are binary serial data that permit the receiving circuitry to detect that information which is contained in the information field is to be transmitted. The S' field has the first two digits of the receiver's or transceiver's ID embedded into it. The digital signal processor of the receiving circuitry, as described below, detects and looks for a bit pattern match that matches its preprogrammed synchronization and the first two ID digits of its identification code. When a match occurs, the receiving circuitry turns on the balance of its electronics and begins the decoding process as described below. The S'/ID fields utilize the first two digits of the receiver's or transceiver's ID to provide as many as one hundred different groups of receivers or transceivers to be accommodated on the same radio channel. The net effect of the two digits of the identification code S' embedded within the initial synchronization information is to provide a significant battery savings to wireless receivers and transceivers. only the group that is being signalled with the two digit ID match within the synchronization field containing the first two digits of identification information and S' is alerted resulting in the receiving circuitry being turned on. All other receivers or transceivers, which include those in ninety nine possible groups, will not detect a S'/ID digit match which results in the receiver or transceiver power consuming electronics not being turned on to save battery life which is significant with mobile receivers and transceivers powered with small batteries.

The duration of the S'/ID wake-up fields is programmable on a customer basis. The duration of the overall synchronization signal including the first two digits of the identification code of the receiving circuitry and S' is directly dependent upon the type of receiver or transceiver that is being utilized on the system. Variations of durations may be necessary to accommodate receivers or transceivers of different designs as the decoder technology advances in accordance with the present invention. The duration of the overall synchronization signal may be approximately 900 Ms. As higher data rates are achieved, this duration may be shortened. The duration of the synchronization signal is dependent upon the channel sampling rate of the receiver or transceiver. If the receiver or transceiver must turn on (wake-up) once every 450 MS, and it requires two samples, then the minimum synchronization duration should be approximately 900 MS. The wake-up duration is directly dependent upon the amount of battery current savings in the receiver or transceiver that are desired. The more frequently the receiving circuitry wakes up to sample the channel the greater impact upon the receiver's or transceiver's battery life.

The next frame of the ID FRAME GROUP contains an eight bit command field CB which may contain commands to the individual receiving circuitry or to batches of receiving circuitry to perform specified functions. The commands may be diverse in function such as, but not limited to, those disclosed in the above-described United States patents. The frame further includes four four-bit nibbles encoding identification digits three through six, which encode four additional digits of the identification code of the receiving circuitry, which are contained in the next two groups of eight bits followed by the two groups of ten and eleven bits making up the twenty one bits of error correction code as described above.

The following frame is comprised of three eight bit groups of four bit nibbles encoding identification digits seven through twelve of the identification code of the receiving circuitry.

The final frame of the ID FRAME GROUP is comprised of one eight bit group of two four bit nibbles of identification digits thirteen and fourteen encoding the final two digits of the identification code of the receiving circuitry. The next eight bit group is a synchronization marker S" which is a unique pattern of eight bits which do not identify valid data such as an extended ASCII character 11000000 as described below. The detection of synchronization marker S", after a number of frames containing one or more erroneous uncorrectable bits have been identified by processing the error correction code in the frames which represents a loss of synchronization, provides the important function of resynchronization of the clock of the receiving circuitry. The original synchronization is, as explained above, established by the initial two digits of the identification code and S'. Typically, the synchronization address S' has a different bit pattern than the synchronization marker S". Effectively, the synchronization marker S" locates and provides correct clock timing to permit resynchronizing the clock of the receiving circuitry's at least one processor to provide correct timing for processing groups of forty five bits defining each frame from the point of loss of the original synchronization thru and after the detection of the frame group containing a detected synchronization marker S". As is known, the loss of even a single clock cycle in the timing of the decoding and processing of frames of bits by the receiving circuitry renders the data totally erroneous. Following the synchronization marker S" is a FRAME GROUP # comprised of eight bits which contains a unique address of the ID FRAME GROUP within the plurality of frames of wirelessly transmitted information comprising the overall transmission. As will be discussed below, the FRAME GROUP # is used to locate the frames and bits which must be processed during reconstruction by the digital signal processor after resynchronization is established beginning with the frames where synchronization loss is first detected by at least one frame being processed to contain at least one erroneous uncorrectable bit which cannot be corrected with error correction code embedded in the frames to the frames of the frame group containing the detected synchronization marker S". Frames within the ID FRAME GROUP may be reconstructed as described herein. In the ID FRAME GROUP an erroneous uncorrectable bit in the identification field nibbles one through fourteen, which cannot be reconstructed by the reconstruction technique of the invention, as explained below, is catastrophic and the entire transmission is erroneous. The synchronization marker S" and FRAME GROUP # cannot correct erroneous uncorrectable bits encoding identification digits one through fourteen because of their presence outside of the bit field of the error correction code.

FIG. 5B illustrates the format of the one or more DATA FRAME GROUPS contained in the serial transmission of frames of information. Each DATA FRAME GROUP is comprised of four frames containing a total of 180 bits with each frame containing forty five bits as illustrated. The DATA FRAME GROUPS are repeated sequentially to contain sufficient eight bit data units in combination with the SHORTENED EOF (end of frame) Frame Group of FIG. 5C described below to encode the entire transmission regardless of the type of data being transmitted. It should be noted that the choice of having three eight bit data units per frame of the DATA FRAME GROUP is to optimize the transmission of alphanumeric data encoded in eight bit ASCII or other eight bit data encoding mechanism. However, the number of bits per frame of data in an ID FRAME GROUP, DATA FRAME GROUP and a SHORTENED EOF FRAME GROUP, as described below, may be varied in accordance with the invention. The invention may be practiced without having multiple data units per frame in the DATA FRAME GROUP. The twenty four data bits or other number of bits per frame in a DATA FRAME GROUP may be subparts, define a single data unit or define more than one data unit including fractional parts (e.g. one and one-half data units each comprised of sixteen bits). Each frame contains twenty one bits of error correction code, as described above, which is preferably BCH code, broken down into ten and eleven bit groups identified, as described above, with the letter "IC". The bits which are not contained in the error correction code bit field are referred to as other bits. As is known, the error correction code bit field bits have a value which is a function of the twenty four data bits. The error correction code field bits will be identical only when all twenty four data bits are identical (e.g. when three data units, such as three characters, are repeated in different frames, the error correction code for the identical data units encoding the characters is repeated in the different frames). As illustrated, each DATA FRAME GROUP contains ten eight bit data units which are identified in succeeding frames by the numbers "1–10". The synchronization marker S" is identical in form and function to the synchronization marker S" as described above in conjunction with FIG. 5A and is comprised of eight bits which do not encode a valid unit. The detection of the synchronization marker S" performs the resynchronization function of the clock circuitry as described above. The FRAME GROUP # is also identical to the FRAME GROUP # described above in conjunction with FIG. 5A and performs the function of permitting the identification of a number of frames which must be reconstructed from where one or more frames containing at least one erroneous uncorrectable bit are detected which is representative of loss of synchronization of the clock of the receiving circuitry are located to where the synchronization marker S" is detected, as described below, for example, in conjunction with FIG. 27. The combination of the synchronization marker S" and FRAME GROUP # in the DATA FRAME GROUP permits data reconstruction after resynchronization as described below.

When a long transmission is made spanning several hundred bits of data, the number of DATA FRAME GROUPS is chosen to pack all of the bits within the DATA FRAME GROUP and the SHORTENED EOF FRAME GROUP as described below. Each successive DATA FRAME GROUP has a FRAME GROUP # which is an address comprised of a plurality of bits which identify a unique address of the DATA FRAME GROUP within the plurality of frames of information which comprise the entire transmission. For example, if a transmission is to be made containing 1608 bits, a total of twenty DATA FRAME GROUPS are required each containing a unique address encoded in the FRAME GROUP # which identifies and addresses the frames and data units therein of each DATA FRAME GROUP with an address different from the remaining frames and data units of the remaining DATA FRAME GROUPS and a SHORTENED EOF FRAME GROUP containing one data unit. Usually, but not necessarily, the addresses in succeeding DATA FRAME GROUPS are in the form of ascending numbers which permit the at least one processor of the receiving circuitry, as described below, to immediately determine if the detection of a subsequent synchronization marker S" is within the same transmission because the FRAME GROUP # address in the DATA FRAME GROUP containing the detected synchronization marker is not lower than an address of a DATA FRAME GROUP containing at least one frame in which one or more erroneous uncorrectable bit errors are detected which is indicative at the outset of a loss of synchronization. If the detected FRAME GROUP # address is lower, the least one processor determines that the fade has obliterated the remainder of the data transmission, including the SHORTENED EOF FRAME GROUP containing an end of message character or notation.

FIG. 5C illustrates a SHORTENED EOF (end of frame) GROUP which is preferably used to end each transmission of information of the format of FIGS. 5A–C. A single data unit comprised of eight bits, which is identified by the symbol "X", contains the last eight data bits of the transmission of the multiple frames of information. The following two groups of one hundred twelve bits, which are identified by the legend "EOF" contain an eight bit end of file marker and one hundred four bits of filler code. The error correction code identified by "C", as described above, which comprises twenty one bits, is identical to the error correction code of the ID and DATA FRAME GROUPS. The bits which are not contained in the error correction code bit field are referred to as other bits.

Each transmission of data, regardless of what is being encoded (e.g. eight bit ASCII characters, sixteen bit graphics, etc.) is typically formatted by the at least one processor of the transmitting circuitry as explained below into the format having the sequence of the ID FRAME GROUP, the DATA FRAME GROUP(s), and the SHORTENED EOF FRAME GROUP. As has been stated above, the architecture of each frame of the DATA FRAME GROUPS having three eight bit data units has been optimized for the transmission of eight bit characters encoded with ASCII. However, the number of bits of data per frame, and the number of bits of error correction code in each of the FRAME GROUPS may be varied while practicing the invention.

Figure 5D:
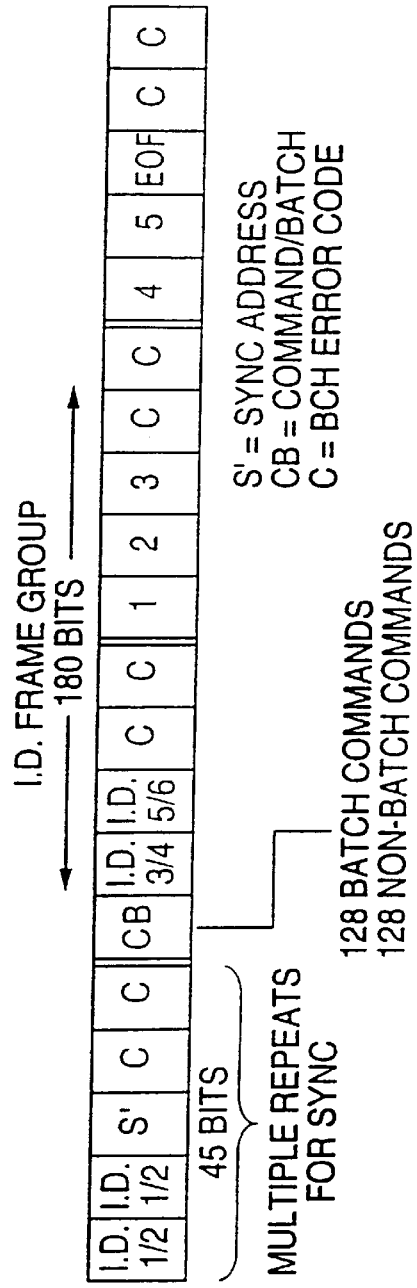

FIG. 5D illustrates an alternative format for transmitting relatively small numbers of frames of data bits which do not require multiple FRAME GROUPS as described above. One difference between the format of FIG. 5D and the preceding format of FIGS. 5A–C is that the synchronization marker S" and FRAME GROUP # have been deleted. Reconstruction is possible, as described below in FIG. 23, where all of the erroneous uncorrectable bits are determined to be totally in the field of the error correction code bits. The shortness of the field of the data bits makes resynchronization unnecessary which permits the elimination of the synchronization marker S". Since there is only one FRAME GROUP with all the data and the command CB being in the ID FRAME GROUP, the address information supplied by the FRAME GROUP # is surplus. The bits which are not contained in the error correction code bit field are referred to as other bits. The EOF character is positioned where the FRAME GROUP # was formerly positioned. The number of frames in the ID FRAME GROUP may be increased or decreased with four frames being only one possible example. The same processing circuitry used to encode the format of FIGS. 5A–C is used to process and encode the format of FIG. 5D.

Figure 6A:
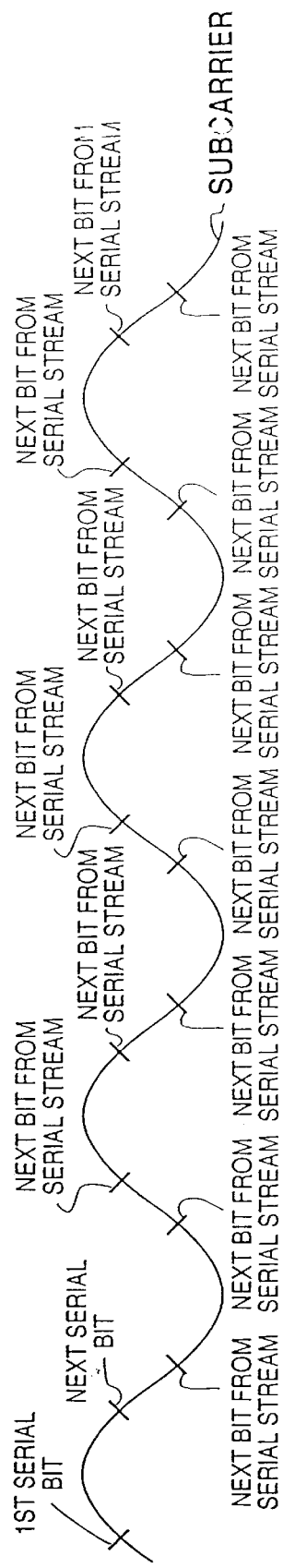
FIGS. 6A and 6B respectively illustrate a sinusoidal subcarrier and a squarewave subcarrier modulated with phase and pulse width modulation encoding the serial information of FIGS. 5A–D.
Figure 6B:
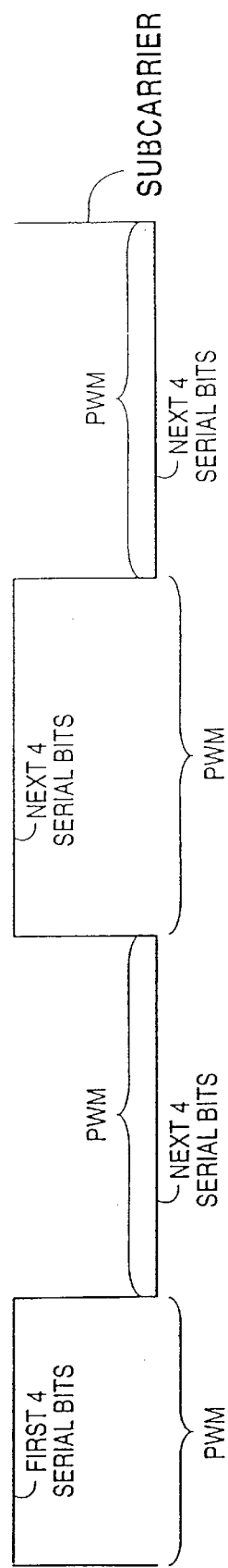

The subcarrier may be either analog or digital. The modulated analog subcarrier may be a sinusoidal waveform as illustrated in FIG. 6A and the modulated digital subcarrier may be a squarewave as illustrated in FIG. 6B. Moreover, the number of bits of data which may be modulated on each cycle of the subcarrier may be varied from the four bits per cycle of FIG. 6A and four bits per half of cycle of FIG. 6B. The high speed integration capability of digital signal processors used with the present invention consequent from their high clock speed and Harvard architecture permits multiples of the number of bits encoded on each cycle illustrated in FIG. 6B and especially the sinusoidal subcarrier of FIG. 6A to be achieved with the invention.

Figures 8, 11:
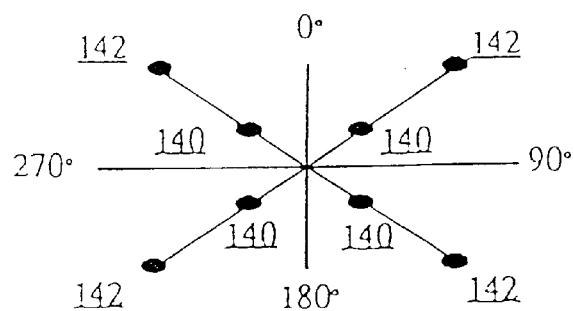
FIG. 8 illustrates the modulation of the sinusoidal subcarrier to produce one form of the serial information encoded in accordance with the present invention.
FIG. 11 illustrates encoding controller system entries used in accordance with the invention.

In FIG. 6A the sinusoidal subcarrier is modulated at four different phases (discrete angular positions) of a 3600 cycle to encode a one or a zero value of the individual bits of the FRAME GROUPS of FIGS. 5A–5C, FIG. 5D or modifications thereof on the sinusoidal subcarrier. As illustrated, the modulation is diphase quadrature modulation (1 or 0 modulated at 45°, 135°, 225° and 315°). FIG. 8 discussed below further illustrates a constellation representing the encoding of either a one or zero at each of these four discrete angular phases.

In FIG. 6B a squarewave subcarrier is pulse width modulated with a first half of the squarewave subcarrier cycle encoding four bits of the bits of the FRAME GROUPS of FIGS. 5A–C, FIG. 5D or modifications thereof. FIG. 9, discussed below, illustrates the possible numerical values representative of bit groups which may be encoded with squarewave modulation as illustrated in FIG. 6B. As illustrated, the pulse width modulation has sixteen possible widths encoding a four bit group which preferably are proportionate, i.e. a value of one is one sixteenth the width of a value of sixteen which facilitates high speed integration by the at least one digital signal processor of the receiving circuitry.

The present invention is fully compatible with analog and digital transmitters of the type commonly used for one-way message transmission (paging) throughout the world and with analog and digital transmitting circuitry of the type used for two-way wireless transmission throughout the world. With the invention, the carrier is modulated with a subcarrier having individual cycles modulated with the serial information, as illustrated in FIGS. 6A, 6B and FIGS. 8 and 9 as discussed below. Furthermore with the invention, the speed of transmission is higher than the prior art which approaches ten or more times the speed of the transmission of the POCSAG protocol with a lower error rate than POCSAG and the modified ERMES protocols, and can utilize less radiated power than that of the POCSAG (e.g. ¼)

and modified ERMES protocols permitting use of fewer transmitters. Reduction in the number of transmitters achieves substantial savings in building out the transmitting infrastructure and further permits frequencies allocated to existing IMTS transmitters to be used without modification for two-way wireless transmission.

The encoding format of the protocol of the present invention in either one-way or two-way wireless systems differs depending upon whether the transmitting circuitry is operating in analog mode or digital mode. When the transmitting circuitry is operating in analog mode, the encoder, which preferably uses at least one digital signal processor to modulate sinusoidal cycles of a subcarrier, as illustrated in FIGS. 6A and 8 produces the serial information with encoded bits in FRAME GROUPS, as illustrated in FIGS. 5A–C, FIG. 5D or modifications thereof, which is transmitted by modulating the carrier. In the analog mode the encoder of the transmitting circuitry modulates cycles of the subcarrier with multiple phase modulation at discrete angular positions of the subcarrier such as, for example, as discussed above in conjunction with FIG. 6A so that a plurality of quadrants of cycles of the subcarrier are modulated with at least one bit and preferably a plurality of bits encoding the FRAME GROUPS illustrated in FIGS. 5A–C, FIG. 5D or modifications thereof. Diphase quadrature modulation, as discussed above in conjunction with FIG. 6A and below in FIG. 8, is only exemplary of the numerous angular positions that may be utilized to encode the serial information comprised of the FRAME GROUPS of FIGS. 5A–C, FIG. 5D or modifications thereof by modulating quadrants of a cycle of the subcarrier with one or more bits.

When the transmitting circuitry is operated in a digital mode, digital or squarewave cycles of the subcarrier are pulse width modulated with the serial information. The digital encoder of the transmitting circuitry, which preferably uses at least one digital signal processor, modulates cycles of the subcarrier with pulse width modulation so that halves of the cycles of a subcarrier are respectively pulse width modulated, as discussed above with reference to FIG. 6B and below in FIG. 9. Pulse width modulation may be used to encode a range of numbers representing a plurality of bits (e.g., four in FIGS. 6B and 9) during the successive parts or halves of a single cycle of a subcarrier to produce encoding of the FRAME GROUPS of FIGS. 5A–5C, FIG. 5D or modifications thereof.

In the event that receiving circuitry is utilized which has the capability of receiving multiple channels under control of system broadcast commands as disclosed in the aforementioned patents, the selection of the 900 MS preamble for "local", single frequency receiving circuitry provides an added benefit to the multi-frequency receiver or transceiver. As a multi-frequency receiver, such as the one described in the aforementioned patents, requires an additional 1800 MS preamble to successively scan fourteen channels and successfully take two samples, the receiver does not wake-up to the local 900 MS preamble. This provides an added battery savings for multiple frequency receivers or transceivers that are capable of travelling when the protocol of the present invention is utilized. Any battery savings that can be afforded to multiple-frequency receivers or transceivers is significant. Multiple-frequency receivers or transceivers by design consume more battery power than single frequency receivers or transceivers. This is due to the fact that multiple-frequency receiving circuitry must scan and monitor more than one frequency during travelling and roaming operation between radio transmitting systems. Multiple-frequency receivers have experienced scanning rates of operation for three paging months per year (two regionally and one nationally), and therefore, spend approximately 25% of their receiving time in travelling mode of operation that can degrade the battery performance life span of the receiver. Assuming the same low battery drain technologies can be utilized in both single frequency and multiple-frequency receiving circuity, any additional battery savings that can be afforded are beneficial.

The protocol of the present invention provides such battery savings. By permitting the S'/ID wake-up length, as described above with reference to FIGS. 5A or 5D, to wake-up only local single frequency receivers or transceivers is of significance. In a local radio messaging system, 85% of the receivers will be for local purposes. By design of the shorter local preamble, the multiple-frequency receiver or transceiver utilizing the protocol of the present invention will not wake-up when local messages are sent. The local receivers or transceivers wake-up upon receiving the longer multiple-frequency frequency preambles. However, the battery life impact due to the lower number of travelling receivers or transceivers is minimal.

The command field CB of FIG. 5A and FIG. 5D is for the purpose of permitting the receiving circuitry to be programmed to operate in different modes of operation. The command field CB may convey information to the receiving circuitry control processor to determine how the wireless receiving circuitry processes the information field which follows including actions to be performed by the receiving circuitry. The command CB may convey to the receiving circuitry whether the message information within the INFORMATION field is numeric, seven bit ASCII, eight bit ASCII, or sixteen bit ASCII (graphics or Chinese) or other information, such as digital words, etc. The command CB can also convey to the receiving circuitry whether the message is complete and/or is arriving in portions. The command CB permits multiple messages or a long message to be broken into several shorter messages as needed. This feature may be necessary in systems with co-reside with other types of messaging terminal equipment and therefore, short duration messages may be assigned by the system controller of the transmitter.

The command CB may also indicate to the receiving circuitry of the receiver or transceiver if the message is to be routed to an external device, as described in the aforementioned patents, as well as perform the diverse other functions disclosed in the above-referenced patents. This permits direct integration of a wireless receiver or transceiver within a laptop or personal computer.

FIG. 7 illustrates a block diagram of a one-way system in accordance with the present invention for wireless transmission by a transmitter 124 of information on a radio frequency carrier 106 modulated with the modulated subcarrier of the present invention. The subcarrier, as illustrated in FIGS. 6A and 6B, is modulated with the bits of the FRAME GROUPS of FIGS. 5A–C, FIG. 5D or modifications thereof. Moreover, as discussed below, it should be understood that the invention may be utilized in two-way wireless systems in which a transceiver performs the dual functions of the processor and protocol encoder 110 and the wireless receiver 104. The system includes a signal processing system 102 for providing the modulated subcarrier of the present invention as discussed above. The transmitters 124 provide wireless atmospheric transmission of the carrier 106 modulated with the subcarrier of the present invention, as discussed above, with the transmission of information being subject to atmospheric fading to at least one radio frequency receiver 104. The signal processing system 102 may be used to modulate the subcarrier with either the analog or digital modulation of FIGS. 6A, 6B, 8 and 9 to produce the serial information as discussed above and below and broadcast by one or more transmitters 124 of either an analog or digital type as is in use in the infrastructure of one-way or two-way radio frequency transmission throughout the world. Information to be transmitted to the receivers 104 is gathered by a telephone communication through the public switched telephone network (PSTN) and transmitted by a telephone connection between the telephone office 108 and a processor and protocol encoder 110.

The processor and protocol encoder 110 is comprised of a processor which is preferably at least one digital signal processor and associated memory 111 which digitally encodes and stores a serial message or data for transmissions received from the telephone office 108. The stored ENCODED SERIAL MESSAGE OR DATA has the encoded format described above in FIGS. 5A–C, FIG. 5D or modifications thereof. The ENCODED SERIAL MESSAGE OR DATA is modulated on cycles of an analog sinusoidal or digital subcarrier or other subcarrier by an analog or digital subcarrier modulator (protocol encoder) 113 to produce the serial information which modulates the carrier 106. The processor and protocol encoder 110 may be in accordance with FIG. 12 discussed below. The information to be transmitted may be without limitation inputted to the telephone office 108 through any one of numerous types of telephone connections 112 which is indicative of general inputs which may interface with an operator such as from a business office of a paging service or a telephone input from an E-mail network. Input 114 is connected to a personal computer 116 of any design which composes messages or data via keyboard or other peripheral device which are to be broadcast to the wireless receivers 104. In the transmission of E-mail messages, the message may be inputted from an E-mail service which is connected to a plurality of computers which have identification subscriber numbers of the E-mail service or directly from PC's 116 connected to the telephone office 108 for broadcast to a laptop personal computer 118 which is connected to the wireless receiver 104 by a serial data port connection 120 of the type typically available on a laptop PC such as an RS-232 data port. The information which comprises the frames of information of the FRAME GROUPS of FIGS. 5A–C, FIG. 5D or modifications thereof may be without limitation units of encoded numeric, alphanumeric, graphics information or any other type of information, such as digital words, etc. of differing bit length. A conventional simulcast controller 122 controls a plurality of transmitters 124 for broadcasting the FM modulated carrier 106 which is modulated by the TX1 and TX2 modulators to produce the analog or digitally modulated carrier 106. The carrier 106 may be without limitation any of the narrow depth of modulation carriers used for one-way or two-way messaging such as those usable for the 150, 220, 450, 800, 900 MHz bands or higher frequencies. Typically, a plurality of transmitters 124 are disposed around a geographic area within which reliable broadcast coverage is desired. As is known, the distance which may be covered by a simulcast system comprised of a simulcast controller 122 and a plurality of transmitters 124 is limited to the line of sight distance between the transmitters 124 and the receivers 104. In metro areas severe fading occurs because of multipath distortion and further man-made sources of noise are typically present which can produce erroneous uncorrectable bits within individual frames or even loss of synchronism where multiple frames are faded to cause at least one bit of clock timing of the receiving circuitry to be lost which results in a lost transmission unless resynchronization of the clock timing of the receiving circuitry processing the group of bits which comprise a frame can be reestablished. Modems 126 must be disposed between the processor and protocol encoder 110 and simulcast system controller 122 and the simulcast system controller and the plurality of transmitters 124 when the carrier is digitally modulated. The modems 126 perform the conventional function of converting the output digital signal from the processor and protocol encoder 110 and the simulcast system controller 122 into a audio bandwidth sufficient for transmission over narrow band audio lines such as telephone lines and back to digital at the far end. When the system utilizes analog transmitters 124, which do not require the presence of the modems 126, the processor and protocol encoder 110 provides the ENCODED SERIAL MESSAGE OR DATA to be wirelessly transmitted. The information encoding protocol of the subcarrier for use with analog transmitters is preferably multiple phase discrete angle modulation of a subcarrier as illustrated FIG. 6A and in FIG. 8 and the information encoding protocol for use with digital transmitters is preferably the pulse width modulation of a subcarrier, as illustrated in FIG. 6B and in FIG. 9, to produce the serial information having the format of the FRAME GROUPS of FIGS. 5A–C, FIG. 5D or modifications thereof.

As is apparent, numerous permutations of modulation of the cycles of the digital or squarewave subcarrier are possible with the serial transmission of information in accordance with the invention. Moreover, increasing the number of numeric values or discrete angular phases being modulated for a given subcarrier frequency, such as doubling the values, proportionately increases the information throughput transmission rate. Doubling the subcarrier frequency with the same number of bits per cycle being modulated also doubles the throughput transmission.

The processor and protocol encoder 110 which comprise the transmitting circuitry and operation thereof is further described below in conjunction with FIGS. 10 and 12. The receiving circuitry contained in the receiver 104 is described below in conjunction with FIG. 13. However, it should be understood that the present invention is not limited to the preferred embodiments of the processor and protocol encoder 110 and receiver 104 described below.

Figure 4:
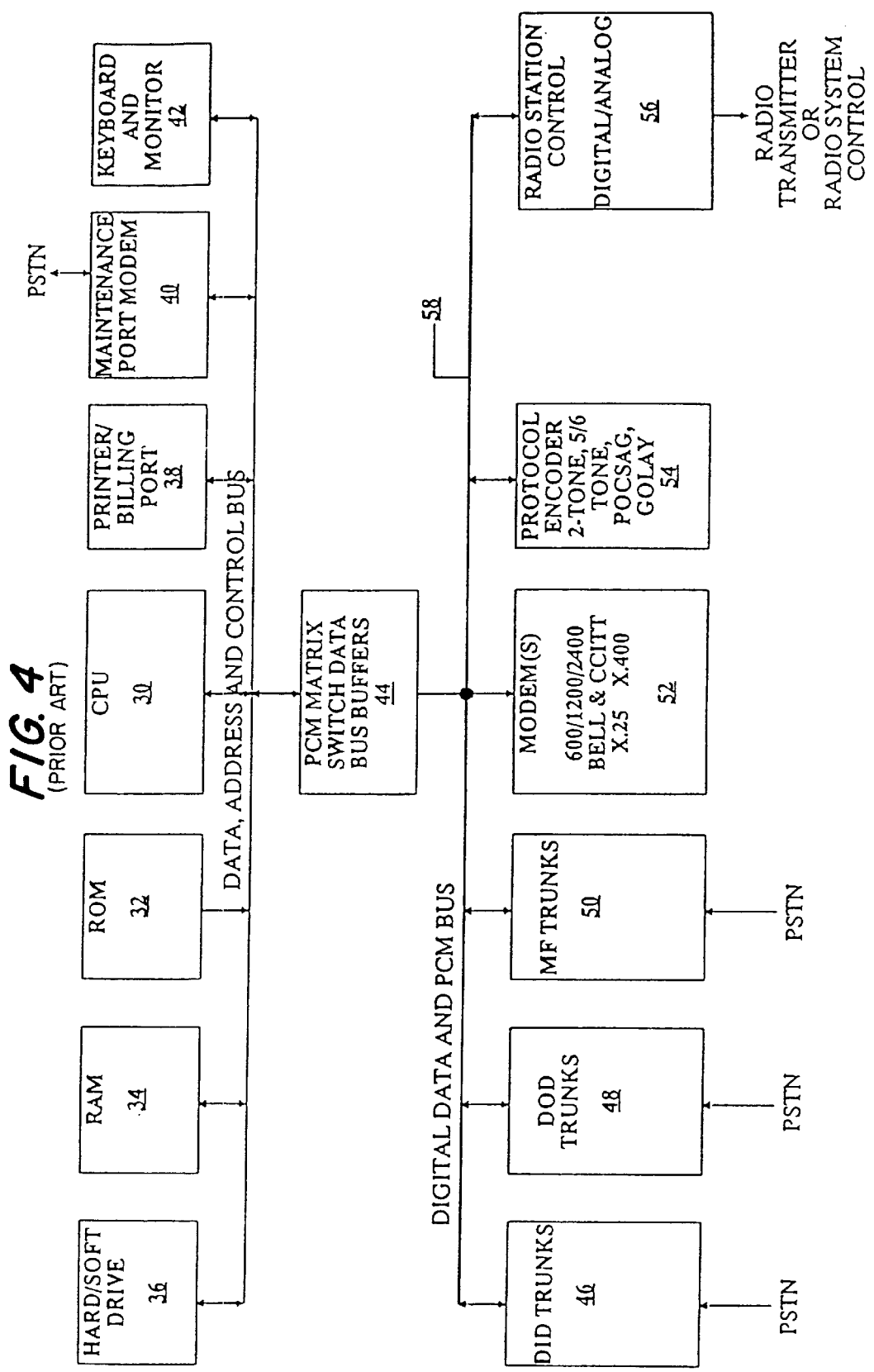
FIG. 4 illustrates a block diagram of a prior art processor and protocol encoder.
Figure 10:
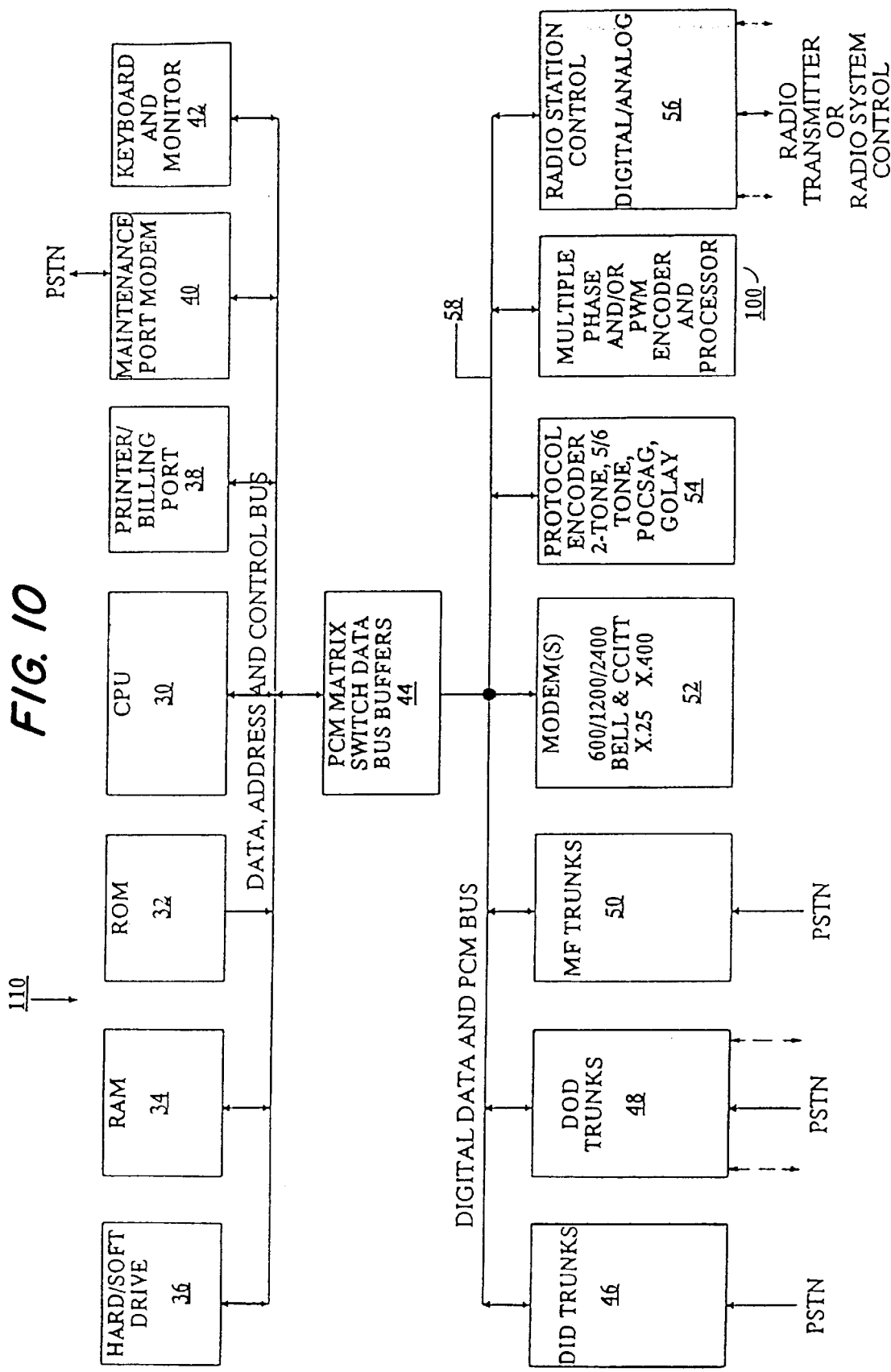
FIG. 10 illustrates a block diagram of an example of a processor and protocol encoder in accordance with the present invention.

FIG. 10 illustrates a block diagram of the transmitting circuitry comprising the processor and protocol encoder 110 of FIG. 7. FIG. 10 is identical to the prior art of FIG. 4 except that a multiple phase discrete angle of modulation and/or pulse width modulation encoder 100 is connected to the digital data bus 58 to permit the encoding of prior art protocols used for one-way and two-way messaging as well as the practicing of the present invention in encoding the analog or digital modulation of the subcarrier as described above with reference to FIGS. 6A and 6B and FIGS. 8 and 9. The architecture of the multiple phase and/or pulse width modulation encoder 100 is described below in detail in FIG. 12. It should be understood that FIG. 10 represents only one of many possible embodiments of the transmitting circuitry comprising the processor and protocol encoder 110 which may be used in practicing the invention.

In an analog mode of transmission, an example of the modulation of the bits comprising the serial information in the form of the FRAME GROUPS of FIGS. 5A–C, FIG. 5D or modifications thereof may be visualized for each cycle of the subcarrier as a repeat of the constellation of FIG. 8 with four discrete angles of modulation to encode zeros 140 and ones 142. If each cycle of the subcarrier is modulated by the encoded serial information as illustrated in FIG. 6A, and also as described in detail below when, for example, eight bit ASCII characters are separated into four bit nibbles, the serial information has bits of each of two four bit nibbles encoding one character modulated at the 45°, 135°, 225° and 315° positions in quadrants of successive cycles of the subcarrier.

The digital mode of transmission of the serial information stream may be visualized with respect to FIGS. 6B and 9. One or more sequential halves or parts of the digital or squarewave subcarrier are modulated with the encoded serial information over a sequence of cycles of the subcarrier. Each half of a subcarrier cycle encodes a four bit nibble of for example an eight bit ASCII character encoded on a full cycle. However, as described above, a greater range of numbers may be encoded in each half of the squarewave subcarrier. The receiving circuitry comprising at least one processor, which is preferably a digital signal processor, has the integration capability, as described below in conjunction with FIG. 15, which facilitates detection of a greater range of different modulation widths per cycle of subcarrier.

The error correction bits that are embedded in each of the frames of the serial information provide the receiving circuitry with the capability to correct minor transmission errors in the event of short natural or man-made interferences that occur during the transmission of the FRAME GROUPS of FIGS. 5A–C, FIG. 5D or modifications thereof. As has been described above, each frame may be comprised of forty five bits of information and error correction code to be received by the receiving circuitry. The bits of error correction information may be without limitation in the form of a 45/24 BCH error correction code such that each frame is comprised of twenty four bits of information or data optionally comprised of three eight bit data units which may be extended ASCII characters, when the information being transmitted is character based to which is added twenty one bits of error correction code. However, when longer natural or man-made interferences occur that have a duration of several milliseconds or more, the receiving circuitry upon detecting the predetermined bit error such as a three bit or larger error, which results from a fade that may cause loss of receiving circuitry clock synchronism and results in erroneous uncorrectable bit errors in one or more frames of the FRAME GROUPS of FIGS. 5A–C, FIG. 5D or modifications thereof processes the serial information of individual frames containing one or more erroneous uncorrectable bits to attempt to recover faded portions of data units which otherwise would be lost. The recovery of information within a frame which contains bit errors exceeding the bit error correction capacity of the error correction code therein and the resynchronizing of the clock of the receiving circuitry is described below in detail. However, it should be understood that the aforementioned improvements of the present invention are achieved with the use of the high speed processing capability of digital signal processor in the receiving circuitry without additional bit overhead in the frames of information which, when modulated on the subcarrier with analog or digital subcarriers, as described above, provides a substantial increase in data throughput which may be an order of magnitude higher than the POCSAG protocol at substantially lower error rates with lower radiated power being required than used with the POCSAG and modified ERMES protocols.

FIG. 11 illustrates a representative example of the various entries that are needed to optimize the encoding protocol efficiency. Entry one of FIG. 11 is a system-wide entry that indicates to the transmitting circuitry whether the data units in the form of characters, words, data, etc. should be sent to the radio transmitter, transceiver or base station system in a digital or an analog format. Entry two of FIG. 11 indicates to the transmitting circuitry what the maximum rate of transmission that the radio transmitter, transceiver or base station is capable of accommodating. The maximum rate of transmission is a limitation that is solely dependent upon the radio transmitter, transceiver or base station and the frequency of the subcarrier. Transmission may be sent at any rate slower than the maximum rate to accommodate the various generations of receivers, transceivers or base stations that may have slower receiving circuitry. Entry three of FIG. 11 is an entry that is common on wireless radio transmitting systems which is the finite period of time required for the encoding controller or a simulcast system controller 122 in a one-way wireless system or in a two-way wireless system illustrated in FIG. 20 to send commands to the radio transmitters or base stations to turn on. This time delay can vary dramatically depending upon the system configuration. It may be as short as a few hundred milliseconds and as long as several seconds when numerous radio links are utilized to convey the transmitter or base station turn on information to the radio base station. This programmable entry allows system technicians to program the period of time or pause between the time the encoder sends the key transmitter or base station signal and begins the actual transmission of the protocol. Entry four of FIG. 11 indicates to the encoding controller the configuration and/or presence of additional equipments that may be utilizing the same radio transmitting system. A multitude of different types of transmitter controllers and radio message encoders or paging terminals are present in the one-way and two-way wireless industry. There are very few industry standards as to the type of control between the two co-residing controllers for the radio channel. Therefore, this two character, alphanumeric entry permits a wide variation of timing as well as logic level interfaces to be utilized to permit co-existing with other paging and messaging equipments as well as two-way wireless equipment. Entry five of FIG. 11 indicates to the encoder the duration that it will have access to the channel. In many systems it is required or desired to limit the amount of air-time utilized by either of the two controllers. This is to permit an opportunity for each to distribute the messages they have to the radio transmitting system of a one-way or two-way wireless system in a timely fashion. Entry five also permits a level of safety for the radio transmitter of a one-way or two-way wireless system. It assures that in the event of a malfunction, the encoder of the transmitting circuitry will relinquish control of the transmitting system back to the co-resident controller within a fixed period of time.

Figure 12:
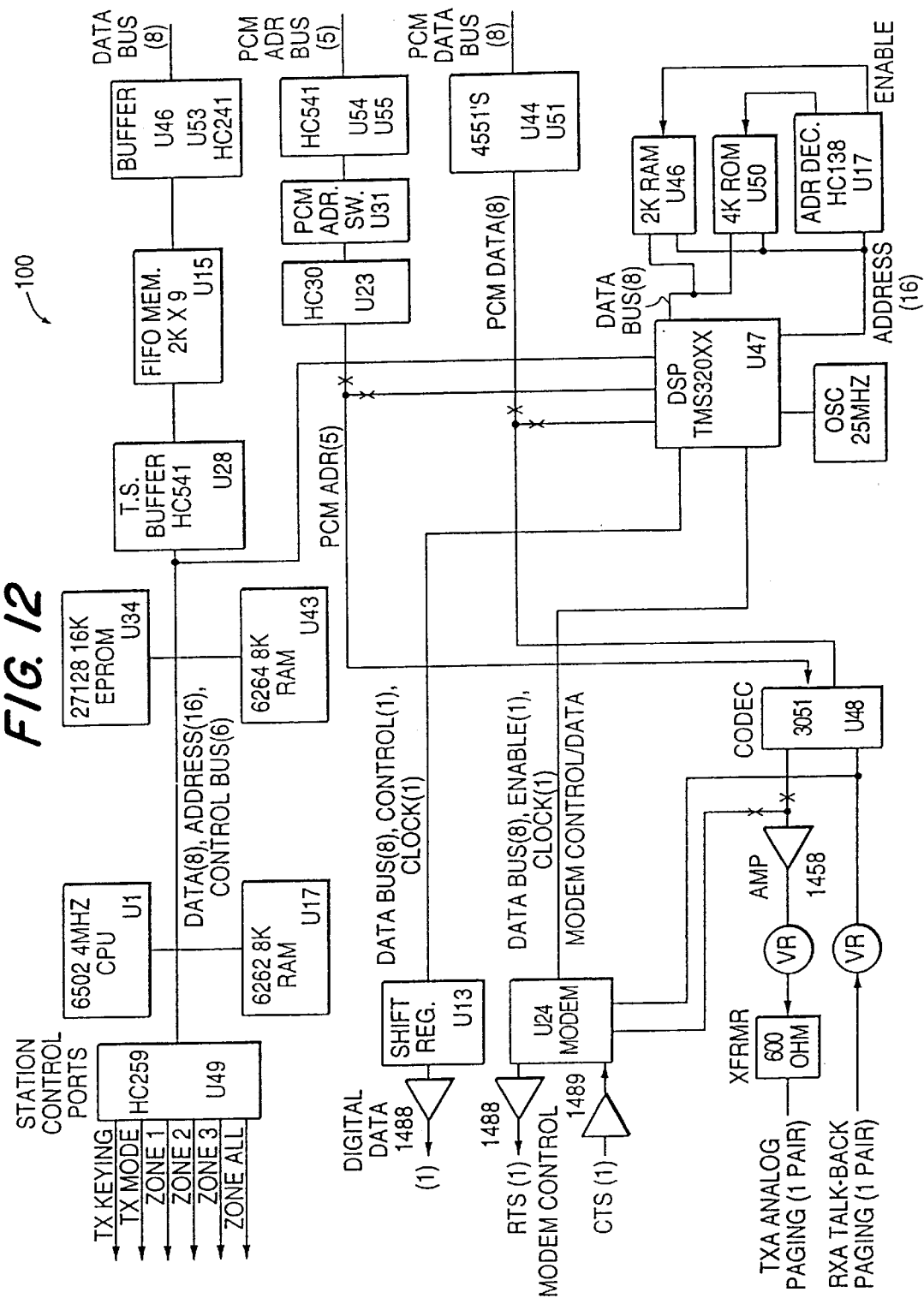
FIG. 12 illustrates a circuit schematic of the transmitting circuitry of the present invention.

The processing of the serial information stream by the transmitting circuitry may use the following steps to prepare the message for transmission with reference to FIGS. 10 and 12. They are:

1. The resident processor U1 illustrated in FIG. 12, of the processor and encoder and processor module 100 of FIG. 10 receives the wireless receiver's or transceiver's ID, command CB, information or data to be transmitted, and end-of-file marker EOF from the main central processing unit such as the CPU 30. The information to be transmitted, as stated above, may be of diverse form such as data but for purposes of this example is assumed to be an alphanumeric message.
2. The resident processor U1 of the encoder and processor module 100 makes the conversion of the alpha numeric including the addition of the requisite number of bits of error correction code to each frame message into a format, as illustrated in FIGS. 5A–D, FIG. 5C, FIG. 5D or modifications thereof. Two digits of the receiving circuitry's identification code are added to the S'/ID portion of the message as explained above in conjunction with FIGS. 5A and D. This permits an optimization of the wireless receiver's or transceiver's battery efficiency as previously described.

3. The resident processor U1 of the encoder and processor module 100 causes storage of the encoded serial message encoded in the form of the ID, DATA, and SHORTENED EOF FRAME GROUPS, as illustrated in FIGS. 5A–D, FIG. 5C, FIG. 5D or modifications thereof. The memory processing and storage may be performed in the RAM U17 and U43 of FIG. 12.

4. The resident processor U1 of the encoder and processor module 100 fetches the serial information comprised of the ID, DATA and SHORTENED EOF FRAME GROUPS of FIGS. 5A–C, FIG. 5D or modifications thereof from the RAM memory U17 and/or U43 of FIG. 12 including the synchronization markers S" and FRAME GROUP #'s and BCH or other error correction code. The synchronization markers S" are added to permit the receiving circuitry processor U7' illustrated in FIG. 13 to recover the data bits in each frame of the frame groups and/or maintain synchronization when faded information is in excess of the bit error correction capacity of the frames of the frame groups information stream as discussed below with reference to FIGS. 23–25, 26A–C and 27. The formatted message in accordance with FIGS. 5A–D, FIG. 5C, FIG. 5D or modifications thereof is stored in the transmission buffer memory U17 or U43 of FIG. 12.

5. The resident processor U1 of the encoder and processor module 100 then waits for the availability of the analog or digital radio transmitter. Upon gaining access to the radio transmitter of a one-way or two-way wireless system, the resident control processor U1 of the encoder module and processor 110 fetches the stored message formatted in accordance with FIGS. 5A–C or FIG. 5D to be transmitted from the transmission buffer memory and forwards the formatted message to the encoder and processor 100 for modulation on the cycles of the subcarrier in either the analog (e.g., FIGS. 6A and 8) or digital (FIGS. 6B and 9) format for radio transmission as described above.

If the preceding cycle of the subcarrier contains all binary ones, the next cycle of the subcarrier is inverted to contain all zeros for the purpose of receiving circuitry synchronization. This is to insure that a cycle transition occurs during the end of the modulation of a half of a cycle of the subcarrier to insure that the digital signal processor U3', of FIG. 13 of the receiving circuitry as described below maintains synchronization during the synchronization window. If a transition does not occur during the synchronization window, the digital signal processor U3' maintains the precalculated sync and waits for the synchronization window to resynchronize the receiving circuitry to the incoming data stream. The stability of the internal receiving circuitry oscillator is such that approximately 600 consecutive synchronization transitions may be missing without causing a total loss of the received serial information.

The encoder and processor module 100 receives the following information from the main processor 30:

1. The one or more messages or data to be transmitted having the same preamble.
2. The ID code of the receiving circuitry of receiver(s) or transceiver(s) to receive the wireless transmission.
3. A command CB from the main CPU 30 subscriber file (by default) or a command CB that has been received by the message originator.
4. The message text or data which may be four bit groups (nibbles) encoding numeric base 10 information, seven bit, eight bit ASCII or sixteen bit graphics or other information.
5. The speed of data transmission.
6. The mode of data transmission (analog or digital).
7. The special EOF command of the SHORTENED EOF FRAME GROUP of FIG. 5C and FIG. 5D.

The resident control processor U1 of FIG. 12 in the encoder and processor module 100 adds the following information to the message stream during the encoding process:

1. The 45/24 BCH error correction code or other error correction code chosen for the one-way or two-way wireless application.
2. The synchronization marker S" and FRAME GROUP # as illustrated in FIGS. 5A–B.
3. The EOF termination command as illustrated in FIGS. 5C and D.

FIG. 12 illustrates a preferred embodiment of the transmitting circuitry comprising the encoder and processor module 100 in the form of a block diagram containing the necessary electronics to interface the digital highways from the main control CPU 30 and process the information for transmission to an analog and/or digital one-way radio system such as that of FIG. 7 or a two-way radio system such as that of FIG. 20 described below. The encoder and processor module 100 contains the interface electronics necessary to meet the many diverse interface requirements that are present in the one-way and two-way radio transmitter industry. Data arrives from the central processor 30 via the eight bit DATA BUS to buffer circuits U46 and U53. The message data or information is temporarily stored in a "first in, first out" memory that provides a form of elastic storage for the board resident processor U1. When the board resident processor U1 is alerted that information exists in the FIFO memory, the data is transferred and stored via the data address control bus to RAM memories U17 and U43 for processing. Upon system initialization, the board resident processor U1 is alerted as to the default transmission speed to which messages will be sent, and also a default mode of data transmission (analog or digital). The board resident processor U1 has a stored program that controls the encoding process as described above that is contained in EPROM U34. The information and ID which are received as previously described from the control processor 30, are then converted to the encoded serial format of the FRAME GROUPS containing frames with embedded error correction code as described above in conjunction with FIGS. 5A–C, FIG. 5D or modifications thereof. The control processor U1 attempts to gain access to the radio transmitter of the one-way or two-way wireless system such as that illustrated in FIG. 7 or FIG. 20 described below. Depending upon the interface configuration, the resident control processor U1 searches for a status control signal from either the radio base station or the external simulcast controller 122 or two-way wireless controller or network switch 602 via the clear to send line or station busy signal as it is commonly referred to in the industry. Upon determination that the radio transmitter 124 of a one-way wireless system or a transmitter of a two-way wireless system is not busy, the resident control processor U1 keys the radio transmitter by a digital logic signal that is sent by a control latch U49.

It may be necessary to send several signals to the one-way or two-way radio transmitter from the control latch U49 depending upon the system configuration. A second logic signal called "mode" may also be sent to indicate to the radio transmitter or the simulcast controller 122 of a one-way wireless system or transmitter or network switch of a two-way wireless system if the desired message is to be sent in an analog configuration or in a digital FSK or PWM configuration. In many system configurations transmitter zones are also utilized and one or more of the zone outputs may be enabled to select the required transmitting area to transmit the message.

Upon completion of the turn on sequence of the radio transmitter of the one-way or two-way wireless system, the board control processor U1 sends the formatted data and a mode command to the digital signal processor U47. U47 is a board resident co-processor which preferably is a digital signal processor that modulates the subcarrier with binary information using the multiple phase discrete angle or PWM modulation, as described above, or other analog or digital protocols using the system parameters that have been sent to the board resident processor U1 by the main processor 30. The encoding format, as described above and error correction routines, such as the 45/24 BCH error correction routine in a one-way wireless application or other error correction routine in a two-way wireless application, that needs to be added to the serial information resides in a resident stored program memory U50. In the example given above, four bit nibbles of the message are sent in sequential order by the board resident processor U1 to the digital signal processor U47 for processing. The message is temporarily stored in the 2K RAM buffer U46 and the digital signal processor forwards the information to either the digital shift register U13 to produce the digital format of FIGS. 6B and 9 for transmission by a digital transmitter, or to the CODEC U48 to produce the analog format of FIGS. 6A and 8 for transmission by an analog transmitter.

The digital signal processor U47 also has access to and is capable of generating modem tones by accessing the board resident modem U24. The output of the modem is then connected to the analog ports via data switches for transmission to the analog radio transmitting system.

With the system configuration information that resides in the control program of the main processor 30, numerous interface configurations may be obtained by the encoder and processor 100 to a one-way radio transmitting system such as that of FIG. 7 or a two-way wireless system such as that of FIG. 20 described below. The encoder and processor 100 also has the ability to receive data from other modules that may exist in the encoding mechanism. That information arrives from the PCM DATA bus and can be sent via an analog switch directly to the CODEC U48 for transmission to the analog radio transmitting system. This connection to the external digital PCM highways can permit voice messaging or other analog paging tones to be sent from the synthesizer module. As many messaging systems have multiple formats that co-exist on the same radio transmitter, two tone signaling, 5/6 tone signaling, DTMF signaling, POCSAG and Golay protocol formats and two-way formats may also be transmitted by the processor and encoder 100 via the external PCM ports.

The digital signal processor U47 may also send digital data directly back to the PCM DATA bus to another module. In the event that a purely analog system with multiple analog radio channels is utilized, the digital data of the digital signal processor U47 may be sent to a dual channel board module (not illustrated). If frequency agile receivers or transceivers are utilized, as described in the above-referenced patents, this is the preferred mode of interface to the multiple radio transmitters. One encoder module can be utilized to gain access to numerous radio channels without the need for additional encoder modules.

Upon completion of the transmission of the message, the digital signal processor U47 alerts the board resident control processor U1 that the message is complete. The board resident control processor U1 then signals the main processor 30, via control signals and the eight bit DATA bus, that it is ready for transmission of new messages.

Figure 20:
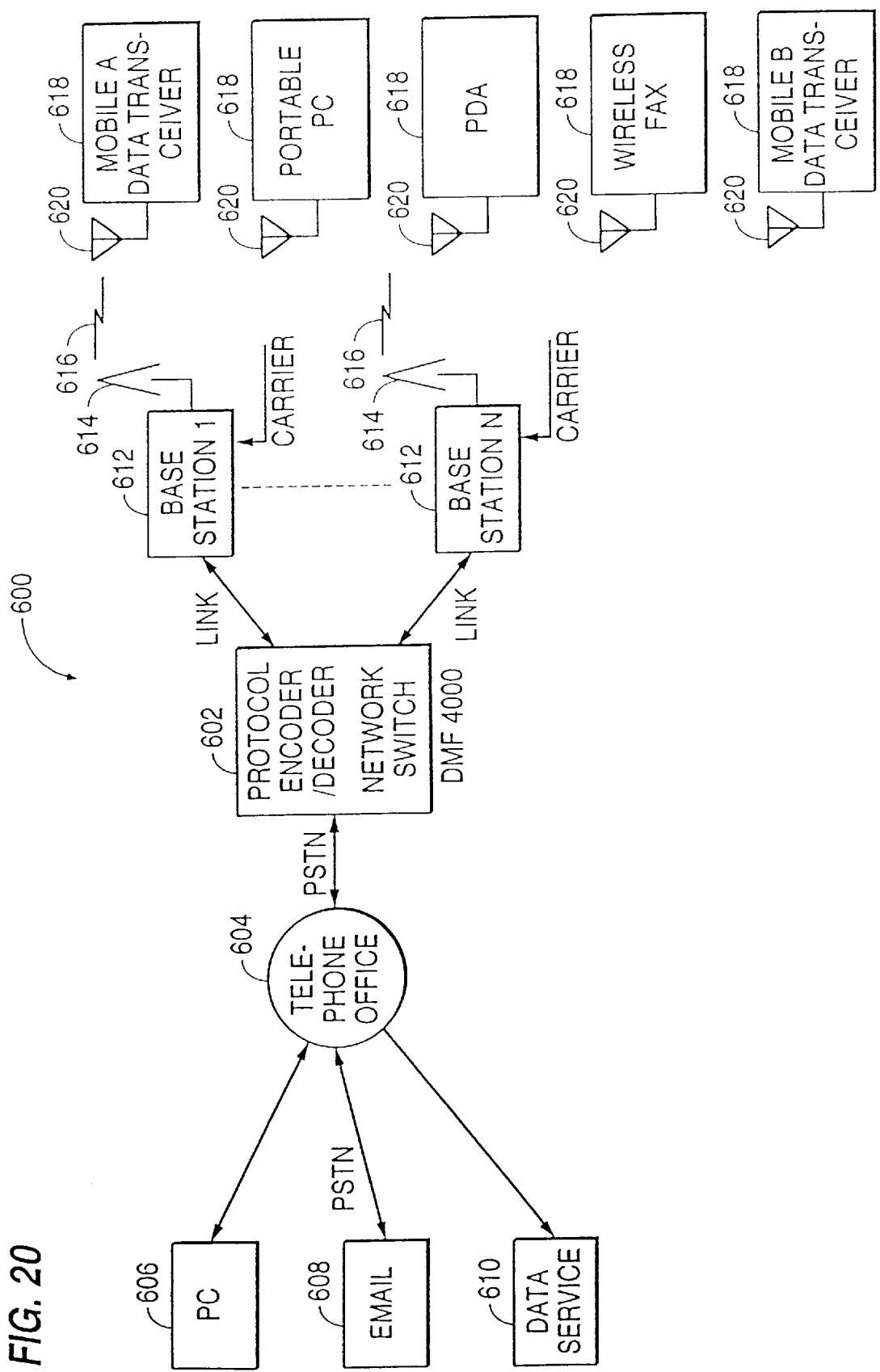
FIG. 20 is a block diagram of a two-way wireless information transmission system in accordance with the present invention.

When the message is ready for transmission, the one-way system controller 122 of FIG. 7 or network switch 602 of FIG. 20 requests access to the radio transmitter facility and begins the transmission process. Often times the one-way radio controller mechanism 122 or two-way network switch 602 must co-reside and/or exist with other radio control equipments and share the same radio transmission facility. Such co-existence is commonplace in the industry and is accomplished by cross connecting the equivalent of clear to send and ready to send control signals with each other to permit the two system controllers to co-exist without conflict or collision. This co-existence permits messaging facilities to utilize many other types of radio equipments that they may currently have. The control mechanism and protocol can co-reside and co-exist with the hundreds of various signaling protocols that are currently being utilized in the industry today.

When the transmitter 124 is available for use by the system controller 122 in a one-way wireless system or the transmitter for use by the network switch 602 or other controller in a two-way system is available, the transmission of the serial transmission in the form of FRAME GROUPS of FIGS. 5A–C, FIG. 5D or modifications thereof begins. The encoder module microprocessor U1 fetches the stored serial information as described with reference to FIGS. 5A–C, FIG. 5D or modifications thereof from the random access memory modulates the subcarrier and forwards the modulated subcarrier to the modulator of the transmitter which modulates the radio frequency carrier 106 of the one-way system of FIG. 7 or two-way system of FIG. 20.

The SYNC signal S' is sent at the subcarrier rate that has been previously programmed into the encoding controller by entry two of FIG. 11. The SYNC signal S' purpose is to alert the digital signal processor U3' of the receiving circuitry in FIG. 13 that information is forthcoming, and also serves as a battery saving technique to wake-up only the receivers 104 or transceivers 700 assigned to that particular prefix or synchronization group as described above. This has a net effect of providing a tremendous battery savings, as only a portion of the receivers or transceivers in a system wake-up at this point and consume battery current. All receivers or transceivers that do not see the SYNC signal S' pattern that corresponds to its synchronization code and two digits of the ID code of the ID FRAME GROUP of FIGS. 5A and D remain in a low current sampling mode.

The receivers 104 or transceivers 700 that have now received the synchronization code S' are now awaiting the balance of the serial transmission of the DATA FRAME GROUPS, and the SHORTENED EOF FRAME GROUP of FIGS. 5A–C or the remainder of the information of FIG. 5D.

The ID code has fourteen digits as described above with two of the digits being placed in the previously described first frame of the ID FRAME GROUP, to maximize the battery efficiency of the wireless receivers or transceivers. The first two digits of the ID code are followed by a COMMAND code CB. The command code CB, as explained above, alerts the receiving circuitry as to the nature or type of information that is about to follow. It can request that the receiver or transceiver store the information internally, or direct it to an external port to a peripheral device, such as a laptop PC 118, and also convey information to the receiver as to the nature of the type of message and perform other functions including the commanded functions described in the above-referenced patents. For example, the command code CB may alert the receiving circuitry that the information to follow is seven-bit ASCII information, eight-bit ASCII information or sixteen-bit information (in the event of graphics or Chinese characters or other information), digital words, control an alarm function, etc.

The serial information encoded in one or more sequentially addressed DATA FRAME GROUP(S), as described above in conjunction with FIG. 5B, is terminated with the SHORTENED EOF FRAME GROUP as described above in conjunction with FIG. 5C containing the EOF or end of transmission word or EOF end of transmission of FIG. 5D which are sent to indicate to the receiver 104 or transceiver 700 the termination or completion of the serial message text.

The transmitting circuitry of the present invention interfaces with radio transmitters of either one- or two-way wireless systems in either a digital or analog subcarrier modulation format. The protocol may be sent via analog or digital radio transmitters. This hybrid transmission protocol is beneficial due to the fact that there exists, both domestically and globally, an almost even distribution of both analog and digital radio transmitters in one-way and two-way wireless systems. Typically, large metro city radio transmitting systems in one and two-way wireless systems can accommodate both analog and digital signaling protocols. Smaller and rural paging systems may typically be exclusively analog in nature. Private paging systems such as municipalities, factories, and hospitals typically utilize analog radio transmitters because analog radio transmitters are lower in cost. When the digital format is utilized, the characteristic clear to send, ready to send and digital data output of the protocol controller U1 of FIG. 12 is connected typically to a modem.

Currently, the one-way and two-way wireless industry uses 1200 baud asynchronous modems quite extensively and the design of equipment in accordance with the invention emphasizes immediate compatibility with the current radio messaging infrastructure. When connected to a digital radio base station in a one-way or two-way wireless system, the encoder and processor 100 produces the pulse width modulation of the subcarrier as illustrated in FIGS. 6B and 9, to encode a selectable number within a range of numbers representing a groups of bit during each half cycle of the subcarrier which encodes the serial information in the format of FIGS. 5A–C, FIG. 5D or modifications thereof. Various widths of the subcarrier encode different numbers which cause positive or negative deviation of the FM radio transmitter. By varying the width of each part of the subcarrier, pulse width modulated encoded units of information, such as four bit nibbles, are modulated upon the subcarrier.

There is movement in the industry underway to increase the subcarrier frequency of the radio transmitters from 1200 Hz. to 2400 Hz. and beyond. It is for this reason that the variable data rate has been designed into the format. As faster modulation rates are obtained by the radio transmitter manufacturers in one-way and two-way wireless systems, the protocol of the invention can be used to increase the data throughput rate.

The encoding controller U1 of FIG. 12 also has the ability to be directly interfaced to an analog transmitting system in a one-way or two-way wireless system. The encoding controller U1 contains a modem capable of encoding in accordance with the example of FIG. 6A. The encoding controller U1 is directly connected via a radio link or wire pairs to the radio transmitter 124 in a one-way wireless system or to the radio transmitter 614 in a two-way wireless system as discussed below in conjunction with FIG. 20. When the encoding controller U1 is utilized in an analog fashion, an example of the wave form of the data stream appears as shown in FIGS. 6A and 8. Each of the four phases (45°, 135°, 225°, 315°), represents a part of the serial information that may be modulated to encode a binary zero or one. The binary one 142 is the higher of the two amplitudes and the binary zero 140 is the lower of the two amplitudes of FIG. 8. This permits multiple bits of data to be sent in serial format with their respective significance in the data stream being encoded at discrete phase angles of the sinusoidal subcarrier. The choice of the number of phases located at discrete angular positions of the subcarrier which are modulated by the serial information format of FIGS. 5A–C, FIG. 5D or modifications thereof may be varied in practicing the invention.

The transmitting methodology of the present invention is both analog and digital radio transmitting system compatible in one-way and two-way wireless systems and further meets the required telephony bandwidths and the existing infrastructure radio transmitter requirements to assure compatibility in the current marketplace.

The net result of the encoding mechanism using the serial format of FIGS. 5A–C, FIG. 5D or modifications thereof and the high speed analog or digital modulation of the subcarrier of FIGS. 6A, 6B, 8 and 9 permits rapid implementation of the protocol with minimal capital expenditure to permit the messaging facility to gain entry to more profitable alphanumeric information and E-mail services. The efficiency of the protocol of the present invention permits a paging facility with a single frequency transmitting facility or a two-way wireless system that is currently air time restricted while only accommodating numeric paging subscribers to gain additional air time to entertain new services and subscribers.

Figure 13:
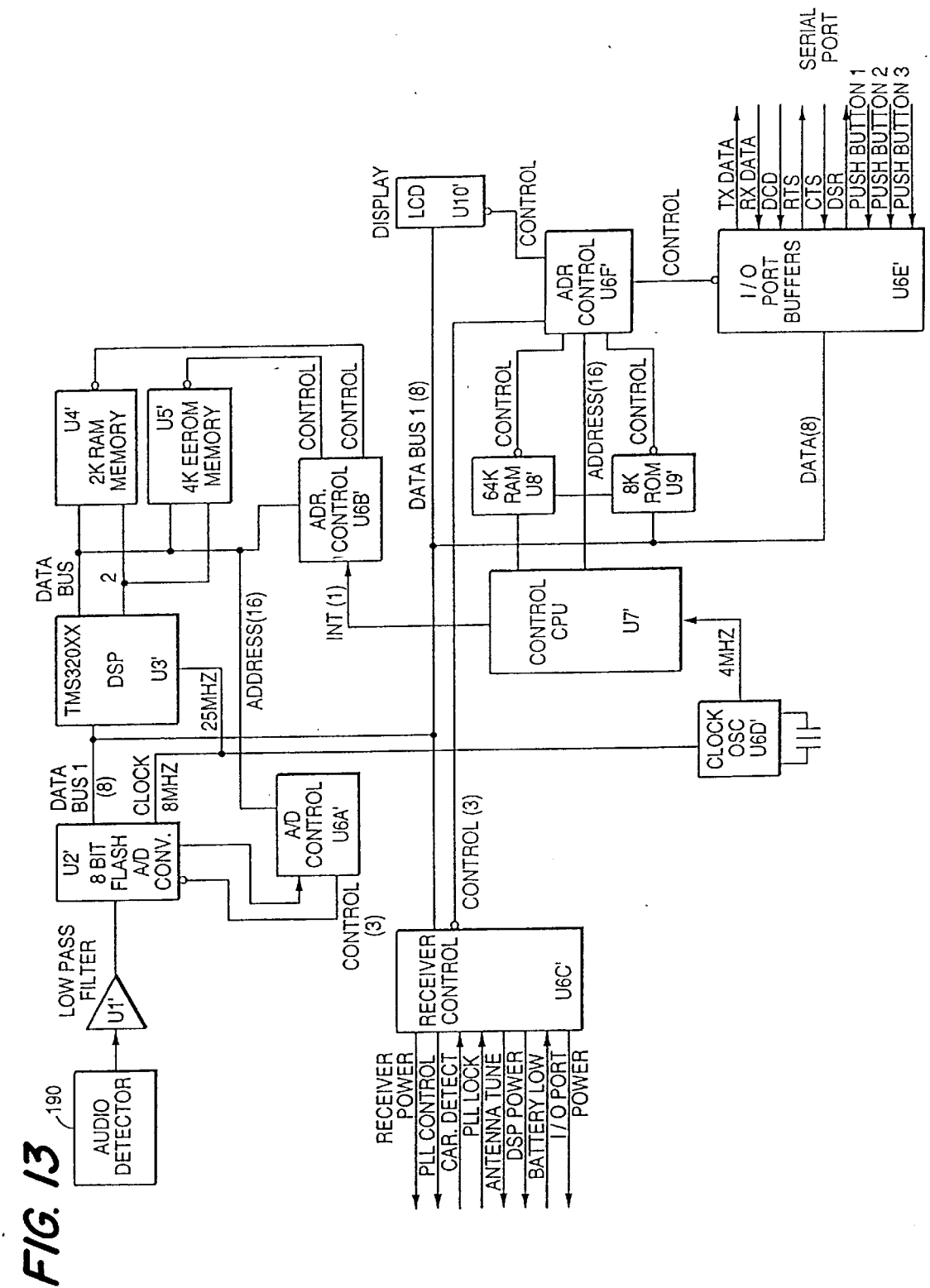
FIG. 13 illustrates a circuit schematic of the receiver circuitry in accordance with the present invention.

The digital signal processor U3' of the receiving circuitry of FIG. 13 processes the detected individual modulated cycles of the subcarrier in the format of FIGS. 6A and 6B to calculate an integral of at least one selected modulated part of each of the modulated cycles. A selected modulated part when pulse width modulation is used is each of the first and second halves of the squarewave which each contain pulse width modulation that may encode any one of a range of numbers representing a part or a data unit as explained above with reference to FIG. 6B and 9. A selected modulated part when multiple phase discrete angular modulation of a sinusoidal subcarrier encoding bits at spaced apart angular positions is used has been explained above with reference to FIGS. 6A and 8. Each of the calculated integrals is numerically compared with a plurality of stored numerical ranges to identify a range which contains the numerical value of the integral. Each range represents one of a plurality of possible numerical values that the selected part may encode. These stored ranges represent the possible integrated values of the subcarrier modulation encoding a bit having one and zero value when multiple phase modulation is used as discussed above with reference to FIGS. 6A' and 8 or the possible integrated values of the subcarrier modulation encoding a group of bits having the individual numerical values within the numerical range of pulse widths as discussed above with reference to FIGS. 6B and 9. The numerical comparison is discussed in detail below with reference to FIG. 18. A binary representation of the numerical value representative of the identified numerically closest range in which the calculated integral is found is substituted and stored in memory for each of the at least one selected modulated part of each of the cycles. The substitution process is discussed below with reference to FIG. 18. The numerical value encodes at least a part of an information unit of the serial information. For example, when the serial information is a series of characters and pulse width modulation is used in accordance with FIGS. 6B and 9, each numerical value represents four bits which is one-half the information required to encode a full character with ASCII.

The modulation of the subcarrier in either analog or digital format is converted by the digital signal processor U3' of the receiving circuitry of FIG. 13 from a time varying signal of FIGS. 6A and B to a series of numbers encoded as bits representing part of or a complete data unit(s) which facilitates processing of faded information as discussed below. The series of numbers are stored in the memory U4' as data bits which represent the detected information including error correction code in the format of FIGS. 5A–C, FIG. 5D or modifications thereof.

The digital processor U3' of FIG. 12 further performs processing of individual samples, which are taken to calculate the aforementioned integrals and to remove the effects of noise causing a sample value to fall outside a normal expected range. Each sample value is compared by the digital signal processor U3' with a range which represents acceptable sample values. If the comparison yields a determination that a sample is numerically within the acceptable range, the sample is used in the integration without modification. However, if the sample is numerically outside the acceptable range, the sample is replaced with a numerical value representing a function which may be an average of one or more adjacent samples that are stored in memory which may be preceding and following samples of the sample outside the numerical acceptable range. As a result, the effects of noise in causing an erroneous integration of a selected part of a cycle of the subcarrier are substantially lessened. This process is described below with reference to FIGS. 16A and B and 17A and B.

Most importantly the digital signal processor U3' of FIG. 13 provides the ability to analyze the detected modulated subcarrier for the presence of valid information. For example, when a pulse width modulated or phase modulated waveform is received, the digital signal processor U3' takes numerous samples of the area under the waveform. This permits the digital signal processor U3' to determine the value of each multiple bit group or individual bits of information modulated on the subcarrier. The pulse width or duration or a plurality of phases at spaced apart angular positions of the subcarrier encodes each multiple bit group or bit of information that it represents. Due to the high sample rate and processing architecture of the digital signal processor U3', hundreds of samples can be made of the area under each cycle or part of a cycle as described below with reference to FIGS. 14A, B and 15 to very accurately determine by integration the numeric value of the data that the pulse width modulated signal or phase modulated subcarrier encodes. This is especially important to remove the effects of phase distortion and other degradations of the subcarrier which are prevalent in transmitting data wirelessly. By integrating the area under the curve, an extremely accurate analysis of the pulse width modulated or phase modulated waveform can be made that eliminates distortions that are typical at the leading and trailing edges of a digital waveform. These distortions are aggravated in the wireless environment. Noise spikes that appear on the waveform are easily negated by an integration of the area under the waveform. Noise spikes on a waveform that occur during the transitions of the waveform do not effect the ability of the digital signal processor U3' to maintain synchronism of the incoming serial transmission and do not cause an erroneous determination of the data encoded with the pulse width modulation or the modulation at spaced apart angular positions of the subcarrier.

The digital signal processor U3' of FIG. 13 looks for the S'/ID wake-up to determine the rate of information transmission as well as if it should continue the receiving circuitry turn on process if the two ID digits in the ID FRAME GROUP match that of the receiving circuitry of the receiver or transceiver. When the digital signal processor U3' has determined the rate of information transmission and the type of data transmission, it fetches from the microprocessor U7' stored program code to maximize the decoding reliability. The digital signal processor U3' has the ability to set or alter the bandwidth of the received data to mask unwanted received components or information. The digital signal processor U3' provides the clock recovery by utilizing an energy based clock recovery technique. This clock recovery technique is considerably more reliable than utilizing zero crossovers. Zero crossovers typically can be severely distorted by multipath unalignment of multiple simulcasting transmitting systems. The energy based clock recovery technique utilizes and detects the midpoint of each cycle of the subcarrier. It does so by summing the energy, or the area under the curve or phase (angular position) of the subcarrier as described above. This increases the receiving circuitry's detection sensitivity by making it immune to distortions that are inherent in simulcast messaging systems of the wave form as well as the zero crossover transitions. Due to the high processing speed of the digital signal processor U3', real time preprocessing of the serial information, including integration and sample processing, as described above, can occur prior to the data being sent to the control microprocessor U7' for information decoding and recovery and reconstruction of erroneous information and maintaining of synchronization and resynchronization to provide an improved signal to noise ratio which is calculated to be about three db attributable to the integration process and another 20% attributable to sample signal processing.

The digital signal processor U3' utilizes a modified Harvard architecture with multiple pipelining to permit the maximum number of calculations and samples to be made of the received information. Due to the high sample rate of the digital signal processor U3' and its multiple pipeline architecture, the digital signal processor can provide numerous real time preprocessing steps to optimize and correct anomalies in the received waveform.

The digital signal processor U3', as with any other type of information decoder, has performance trade-offs. Most fixed hardware designed decoders have to select between bandwidth and the bit error rate of the data it receives. The wider the bandwidth, the quicker the decoder can synchronize and lock on to the incoming carrier. However, when the bandwidth is increased the decoder becomes more susceptible to noise and the bit error rate of the detector increases. If a narrow bandwidth decoder design is utilized, the bit error rate is lowered but the carrier synchronization time is increased substantially. The digital signal processor U3' resolves this problem in that during the sampling time the bandwidth is dynamically programmed by the stored program to have a wide bandwidth to permit a rapid detection of the received carrier 106 or 616. However, as soon as the carrier is received, the stored program then provides supportive software to narrow the bandwidth to optimize the integrity of the received data. It is this dynamic operation of the digital signal processor U3' that is under control microprocessor U7' and stored program control that permits the receiving circuitry to rapidly detect and synchronize to an incoming signal and then optimize the integrity of the received data by narrowing the bandwidth.

Upon completion of the preprocessing involving integration and sample signal processing by the digital signal processor U3', the digital signal processor forwards the decoded serial binary information from the buffer RAM U4' to the microprocessor U7' for decoding and recompilation of the received data. The microprocessor U7', under stored program control, fetches the error correction code that is embedded in the serial encoded information for correcting minor bit errors (e.g. two or less) and tests each frame to identify when a frame contains at least one erroneous uncorrectable error bit exceeding the bit error correction capability of the error correction code as described below in conjunction with FIGS. 23–25, 26A–C and 27. The serial data, including error correction, code is stored in random access memory U8' for later processing as described below when larger irrecoverable errors (faded information) are detected which require reconstruction alone or after resynchronization of the clock of the receiving circuitry.

The microprocessor U7' is also responsible for controlling the resident display electronics and control of the external data port for transmission of the received information to an external peripheral device such as the laptop PC 118.

FIG. 13 illustrates a 10-chip set decoder and control of the receiving circuitry which may be implemented in receiver 104, transceiver 700 or associated with a base station. The decoding mechanism, can be connected to a number of different receiving circuitry configurations at the discriminator audio entry point inputted from the audio detector 190. Various receiving circuitry configurations can be a single frequency crystal controlled single or dual conversion type of receiver. A multi-frequency or scanning type of receiving circuitry utilizing a programmable phase lock loop for multi-channel reception may be used, or the decoder may be connected to a mobile or portable two-way transceiver that is either single or multi-frequency using multi-crystal or programmable synthesizer technologies.

The decoder may be further integrated by LSI technologies to a 3-chip set. The integrated circuits U2', U3', U4', U5', and U6A',B' are currently available in a single digital signal processor. The control CPU U7', RAM memory U8', 8K ROM memory U9', address control U6F', and I/O port U6E' are currently available in a single LSI microcircuit. The remaining electronics, consisting of the receiving circuitry control U6C' and clock oscillator U6D' are integrated into a PAL logic array that may be manufactured by National Semiconductor or Texas Instruments or other sources.

The operation of the decoder is as follows:

The low pass filter U1' consists of a switched capacitor filter that limits the frequency response of the discriminator audio to the 300–3000 Hz audio bandwidth. The low pass filter is a fourth order filter that prevents high frequency noise components from entering the eight bit flash analog to digital converter U2'. The audio detector 190 represents the audio output from any type of a one-way receiver, such as that in the aforementioned patents, or two-way transreceiver.

An eight bit flash analog to digital converter U2' is connected to the digital signal processor U3' via an eight bit DATA BUS 1. Clock signals are provided by a portion of U6D' that takes a master crystal oscillator and provides the necessary clock pulses for the processors and the A/D converter. Input/output control of data from the flash A/D converter is accomplished by the A/D control portion U6A'. The clock of the receiving circuitry is resynchronized by detection of the synchronization marker S" by using conventional techniques for shifting stored bits in memory or registers to locate the stored synchronization marker S". The eight bit flash A/D converter samples the incoming audio waveform at high frequency sufficient to take at least hundreds of samples per modulated phase as illustrated in FIG. 6A or squarewave as illustrated in FIG. 6B. The higher the sample rate, the more accurate the integration is. The A/D converter converts those samples to eight bit binary words that are sent to the digital signal processor U3' via the eight bit data bus. Timing control is provided by the A/D control U6A' and permits data to exit U2' only when the digital signal processor U3' addresses U2' when data is present.

The digital signal processor U3' simultaneously reads data from the flash A/D converter U2', processes and analyzes the data, and then sends the decoded data via DATA BUS 1 to the control CPU U7'. Decoded and analyzed data is forwarded to the control CPU U7' between readings of the eight bit flash A/D converter.

The digital signal processor U3' may be manufactured by Texas Instruments and is in one of three generations of TMS320XX series processors. Texas Instruments manufactures low, voltage, low current processors that are applicable to battery operated receiving circuitry.

The digital signal processor U3' is connected to a 2K random access memory U4' and a 4K EEROM memory U5'. A second data bus DATA BUS 2 is utilized to permit data to be read by the digital signal processor U3' from and to the RAM memory and from the EEROM memory, which contains the stored program. The digital signal processor U3' controls the selection of reading and writing to RAM memory U4' and reading from EEROM memory U5' by the address control U6' portion of a custom gate array U6B'.

The digital signal processor U3' is responsible for initially synchronizing the receiving circuitry to the incoming serial information by using the sync address S' of the ID FRAME GROUP of FIG. 5A and resynchronizing the receiving circuitry to the incoming serial information by using the synchronization markers S" of the aforementioned ID and DATA FRAME GROUPS of FIGS. 5A and B and providing waveform analysis for the decoding of the pulse width modulated digital serial information or the multiple phase serial analog information as described above. Upon completion of the decoding of the received binary data stream, the digital signal processor U3' forwards the decoded data via DATA BUS 2 to the control CPU U7'.

The 2K RAM memory U4' serves as a scratch pad memory for the digital signal processor U3'. Intermediate calculations and reconstructed received data are temporarily stored and buffered in RAM memory U4'. The 2K RAM memory also temporarily stores intermediate calculations and instructions as needed on occasion by the digital signal processor U3'. The 2K RAM memory has a DATA BUS 2 utilized to communicate to and from the digital signal processor U3'. This permits the digital signal processor U3' to access and store data in the 2K RAM memory simultaneously while utilizing DATA BUS 1 to receive information from the eight bit flash A/D converter or sending information to the control CPU U7'. It is this architecture that is commonly referred to a modified Harvard architecture where the digital signal processor U3' is capable of simultaneously communicating on two separate data buses.

The EEROM memory U5' contains the stored program for the digital signal processor U3'. It contains resident softwares that permit the digital signal processor U3' to decode both the analog multiple phase and pulse width modulation digital subcarrier waveforms respectively of FIGS. 6A and 6B and the integration processing as described below to convert the detected subcarrier to binary data and further to eliminate noise transients as described below. The EEROM memory U5' also contains the supportive digital signal processor software to permit synchronization, resynchronization of the receiving circuitry, analysis of the received waveform data, storage and transfer of the received data to the control processor U7', and bandwidth control of the received data when the receiver becomes synchronized to the data stream.

U6' is a custom gate array that provides numerous encoding and decoding functions for the multiple phase and pulse width modulation decoder. U6A' provides address and control interfacing between the digital signal processor U3' and the eight bit flash A/D converter U2'. It is the functional equivalent of an active low address enable IC similar to the 74HC138, and also the functional equivalent of the 74HC251 input multiplexer that can sense when the A/D converter has data to be read by the DSP. U6B' provides address control of the 2K RAM memory U4' and the 4K EEROM memory U5'. Accessing of data to and from these memories is controlled by the digital signal processor U3' via U6B. U6B' is the functional equivalent of a 74HC138 3–8 decoder with some additional gating electronics for read/write control to and from the 2K RAM memory U4'. U6C' is the receiving circuitry control portion of the custom gate array. It provides interfacing from the control processor U7' via DATA BUS 1 and a control signal from U6F'. The receiving circuitry control IC consists of the functional equivalent of control latches such as the 74HC259 for receiver power. U6C' provides the functional equivalent of a tri-state buffer (one section of an HC244) for serial transmission of data to the PLL control circuit. U6C' also provides the functional equivalent of a 74HC251 to sense receiving circuitry carrier detection and the PLL synthesizer lock conditions. U6C' also provides the functional equivalent of a 74HC244 (single section) to provide a serial data stream to the antenna tuning processor when a multi-frequency receiving circuitry is utilized. U6D' provides the necessary clocks for the control CPU U7', the digital signal processor U3', and the eight bit flash A/D converter U2'. A 25 MHz or higher frequency crystal may be utilized for the decoding circuit. The oscillator section consists of the functional equivalent of two 74C04's that are connected in parallel with the crystal and provide the necessary inversion for the oscillator and buffering. The balance of U6D' are respective dividers that divide the clock frequency to the lower 8 MHz required by the A/D converter U2' and 4 MHz required by the control CPU U7'. The clock frequency is buffered and directly sent to the digital signal processor U3'. The U6E' portion of the custom gate array provides the necessary I/O port buffering for the external serial port and the control processor U7' data bus of the multiple phase and PWM decoder circuit. Tri-state input and output buffers and level conversion is provided so that the serial port which operates in a RS-232 configuration can send and receive data to an external device as described above. The I/O port buffers are the functional equivalent of a 74HC245 bi-directional tri-state buffer and control latch to encode DSR and RTS data signals (HC259), and a 74HC251 eight to one MUX to decode the CTS and DSR received signals from the peripheral device. The buffering and level conversion is accomplished by the functional equivalent of a 74188 or 74189 RS-232 to TTL level converter.

The U6F' portion of the custom gate array is the functional equivalent to an address control decoder that permits the control processor U7' to address select the 64K RAM U8', the 8K ROM U9', the I/O port buffers and latches U6E', the receiving circuitry control portion of U6C', and the liquid crystal display U10'. It is the functional equivalent of a 74HC138 3–8 decoder.

The control processor U7' is responsible for all of the control functions of the decoder of the receiving circuitry. It controls all receiving circuitry control functions, including the turning on and off of the power to the receiving circuitry electronics, digital signal processor electronics, and the serial I/O port electronics. The messages received are stored by the control processor U7' in the 64K RAM memory U8' or are forwarded to the serial port for external use. The control processor U7' is also responsible for sending stored messages from the 64K RAM memory U8' to the resident liquid crystal display U10 for display and reading purposes by the user. Control processor U7' also responds to push button requests initiated by the user and/or data requests initiated by the serial port as necessary.

The 64K Random Access Memory U8' is utilized by the control processor U7' for message storage and retention. A portion of the memory is utilized as working buffer memory and storage of control variables for the operating program. The 64K RAM is enabled by U6F', the address control register. Data is transferred to and from the 64K RAM via the eight bit data bus 1.

The 8K Read Only Memory U9' stores the resident software for the receiving circuitry. It contains all of the operating softwares and subroutines to permit the control processor U7' to operate the receiving circuitry. Message decoding routines, error correction routines, and message replacement routines are contained in the operating software. The operating software also contains the control and timing electronics for the control processor U7' to control the various portions of the receiving circuitry via U6C'. Service routines to transfer received stored messages are also contained in the 8K ROM and via the control processor U7' may be transferred to the liquid crystal display U10, erased, or transferred to the serial port U6E' for external use. A block diagram of the receiving circuitry decoding/control processes that are contained in the 8K ROM are described below with reference to FIGS. 19A and B. The control flowchart shows the general service routines that are utilized to permit the decoder to turn on the receiving circuitry, sample the channel for presence of carrier and data, and respectively look for the receiver or transceiver receiving circuitry corresponding ID code and message or data.

The receiving circuitry utilizes a single line dot matrix liquid crystal display. When the receiving circuitry senses a button press via the I/O port buffer U6E', the control processor U7' in turn responds and forwards messages to the liquid crystal display for display purposes. Alternatively, multi-line liquid crystal displays may be used to permit a greater amount of text to be displayed simultaneously.

Figure 14A:
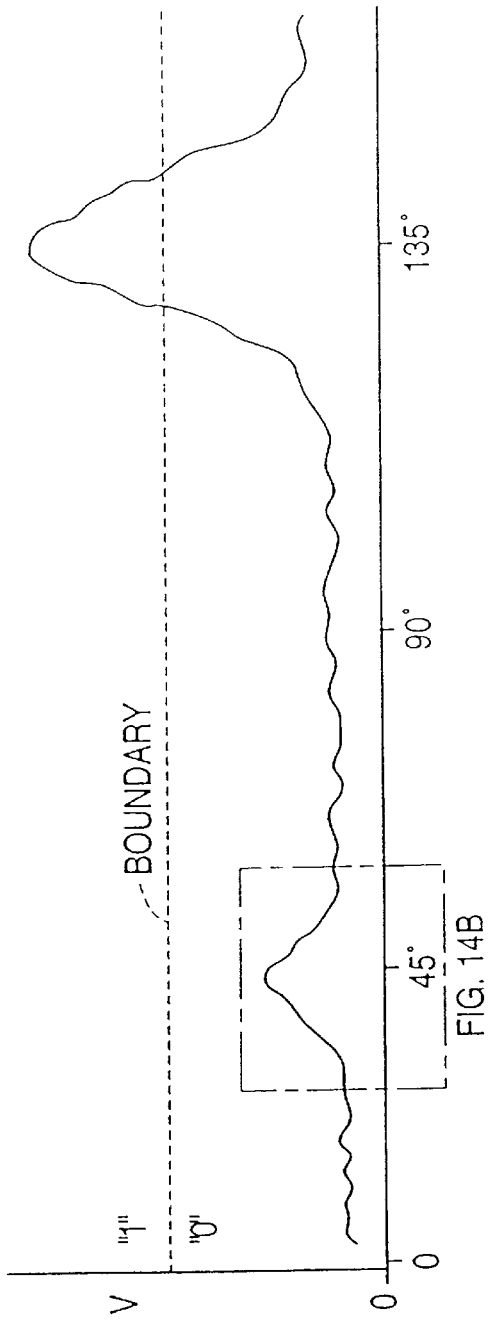
FIGS. 14A and B illustrate the integration of the detected modulated sinusoidal subcarrier in accordance with FIG. 6A by the digital signal processor of the receiving circuitry of the present invention.

The integration of an analog subcarrier modulated, as illustrated in FIGS. 6A and 8, is explained in detail as follows. FIGS. 14A and B illustrate the received diphase quadrature modulated subcarrier as received from a discriminator of the receiving circuitry in a receiver, transceiver or associated with a base station. The data, as illustrated in FIG. 14A, is encoded at the 45° and 135° phases with the 225° and 315° phases having been omitted from the illustration. Regardless of the number of spaced apart angular positions of the subcarrier which are modulated, the determination of whether a one or a zero is encoded in the modulation involves the discrimination of whether the integral falls on the "1" or "1" side of the boundary on the vertical voltage axis U representing the magnitude of the integral. The lower magnitude voltage V range along the Y axis represents the encoding of a binary zero at 45° and the higher magnitude voltage range represents the encoding of a binary one at 135°.

The digital signal processor U3' clock is synchronized by ID/S' of FIG. 5A or FIG. 5D to the incoming data which permits it to integrate in a window around the exact angular phase of where the modulation is placed. The sampling of the voltage, may begin at 35° and end at 55°. In the 20° window, the digital signal processor U3' computes hundreds of samples which are integrated. The size of the window and the number of angular positions of the subcarrier which are modulated may vary in practicing the invention with much higher numbers of bits modulated per quadrant of the subcarrier being possible than illustrated in FIG. 6A.

Figure 14B:
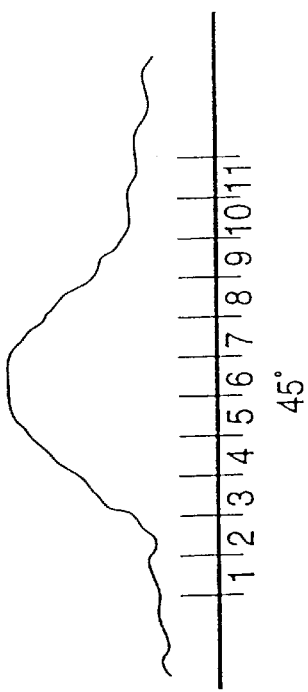

FIG. 14B illustrates a simplified example of computing the integral of the waveform at 45° in FIG. 14A where only eleven samples are taken which have an integrated value of eight. Once the integrated value is obtained, the digital signal processor U3' looks in a prestored lookup table as described below in detail in conjunction with FIG. 18 which permits a value of zero to be within a numerical integration range between zero and sixteen. In FIG. 14A it can be that the numeric value for the data contained at the 135° phase will be greater than sixteen. Therefore, the same integration process and comparison with the range of prestored values centered in a 20° window around 135° would yield a value of one at the 135° phase.

The actual values obtained in each step of the integration process will typically be much higher than the foregoing example of FIGS. 14A and B. The actual values obtained in each step of the integration process will be dependent upon many variables determined primarily by the receiving circuitry. The operating voltage, A to D sampling speed, and clock speed of the digital signal processor U3' will all influence the actual numeric values obtained in this integration process. However, the transmitted waveform will appear essentially the same for all mobile data products using the invention. Each of the different received data waveforms will have different binary values and different binary ranges in their lookup tables.

Figure 15:
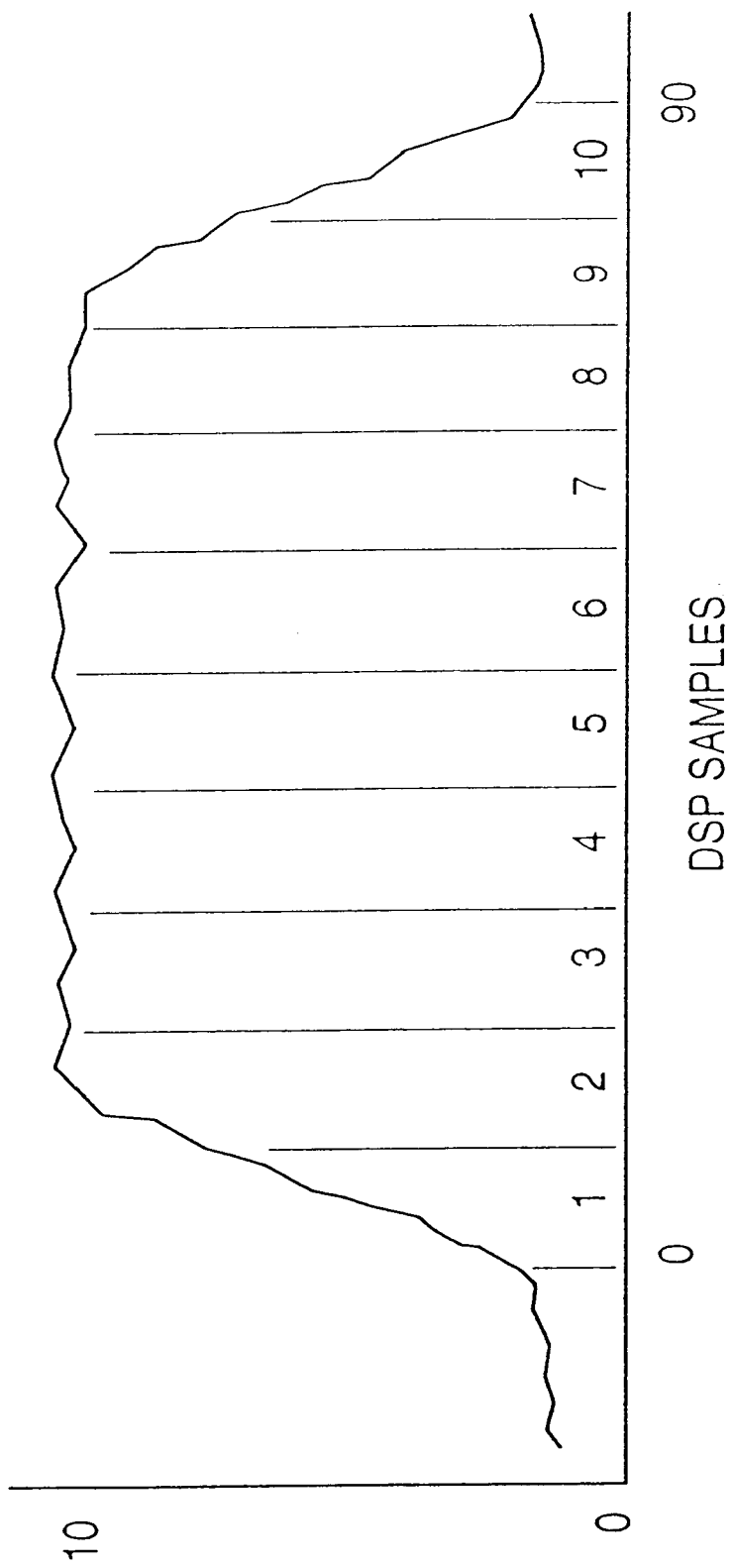
FIG. 15 illustrates the integration of the detected pulse width modulated subcarrier in accordance with FIG. 6B by the digital signal processor of the receiving circuitry of the present invention.

The integration of a squarewave subcarrier with each half being pulse width modulated with four bits (numerical widths varying between one and sixteen), as illustrated in FIGS. 6B and 9, is described as follows with reference to FIG. 15. In this simplified example, the digital signal processor U3' takes ten samples of the detected subcarrier where in actual practice hundreds of samples would be taken. The previously stored sample values representing the waveform are processed by the digital signal processor U3' to integrate the area under the waveform. In actual practice, the number of samples will be dependent upon the sampling speed of the A to D converter and the clock speed of the digital signal processor U3'. In this example, there is a fixed numerical value assigned to the X axis and a value that is representative of the received voltage V of the waveform on the Y axis. The digital signal processor U3' uses these values to calculate a numeric sum for each sample. These numerical values of each sample are in turn summed to provide a summation or integration of all of the samples under the pulse width modulated waveform. The summation value of FIG. 15 is ninety. This number would be much larger in actual practice. The digital signal processor U3' then uses its prestored program to look up the range of summation values stored in its lookup tables as described below in detail in conjunction with FIG. 18. Because of signal distortions, which are always present in a wireless environment, the lookup tables contain finite boundaries or numeric ranges that pertain to each of the sixteen possible binary combinations. FIG. 15 illustrates that for a value of ninety the four bit combination of zero, one, zero, one is obtained. Any summation within the numeric range of eighty-five to ninety-five is represented in subsequent signal processing of the serial information by the aforementioned four bit combination.

Like the example discussed above involving multiple phase modulation, products using digital modulation will have prestored ranges depending upon the design of the receiving circuitry. If very low received voltages are summed, smaller summation ranges are obtained.

Figure 16A:
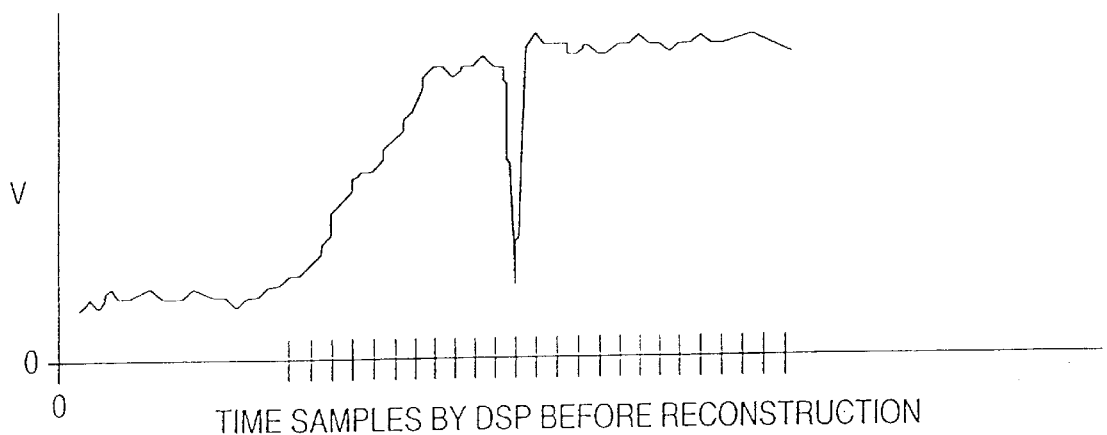
FIGS. 16A and 16B illustrate sample processing performed by the digital signal processor of the receiving circuitry to remove noise transients in a pulse width modulated subcarrier in accordance with the present invention.
Figure 16B:
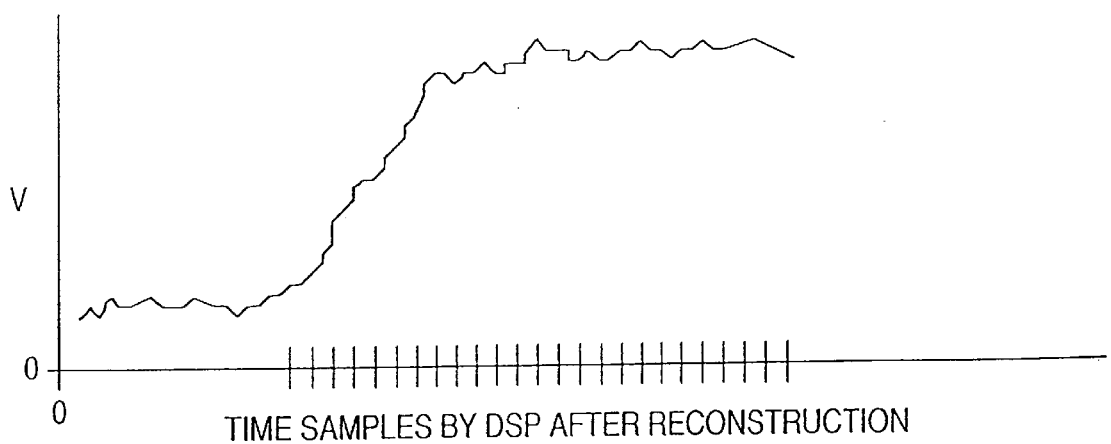

FIGS. 16A and 16B illustrate the sample processing of a half of a cycle of a pulse width modulated squarewave to eliminate the effects of noise which introduces error into the calculation of the integral of the half a cycle as described above in conjunction with FIG. 15. FIG. 16A shows the leading edge of the waveform that contains a noise transient. This negative going transient is not a portion of the actual pulse width modulated data and introduces error in the integration of the waveform by the digital signal processor U3'. Sample signal processing is utilized to assist in the reconstruction of the pulse width modulated waveform to remove transients that are caused by noise and other manmade interference. While the digital signal processor U3' is decoding the pulse width modulated waveform to transform the serial information into a series of numerical values each representing the range containing the calculated integral of each selected part, the numeric sample values encoded as groups of bits are stored in a temporary RAM memory such as U4'. As illustrated in FIG. 16A, each of the samples is converted to a numerical value by an A to D converter or comparator associated with the digital signal processor. The ROM associated with the digital signal processor stores a table of numerical ranges which represent valid sample values over the duration of a part of the cycle of the subcarrier which are to be included in the integration of the subcarrier. As illustrated, the numerical ranges are based upon expected ranges which occur for a particular receiving circuitry design that represent signal levels which occur when the half of the subcarrier cycle is at its high or low level. For example, the illustrated transient is outside the numerical range of sample values which represent valid samples when the pulse width modulated carrier is at its high level. When a sudden or dramatic change in the A to D voltage reading occurs, as described above by the comparison of the sample value with a range of valid sample values, the digital signal processor U3' is triggered to perform a series of calculations. Because of storage in a RAM buffer area of the sample values necessary to compute the integral, one or more sample values immediately before and immediately after a transient are used for signal processing to provide a replacement sample value. The replacement information is a function of sample values adjacent the sample value which is replaced. In one form of possible signal processing to replace the noise with a sample value more accurately representing what the actual sample values should have been, the immediately preceding and succeeding sample values are added and divided by the number of samples to be averaged to yield a replacement sample value average to fill in the erroneous sample caused by the noise transient. The resulting waveform appears in FIG. 16B as a small step that makes the resulting waveform more representative of the pulse width modulated waveform. In this example, if the preceding sample value from the A to D converter was 1 volt and the following reading was 1.1 volts, the replacement sample would have a value of 1.05 volts. This is considerably more accurate than the actual received pulse width modulated waveform that would have had a near zero value for the sampling period.

Figure 17A:
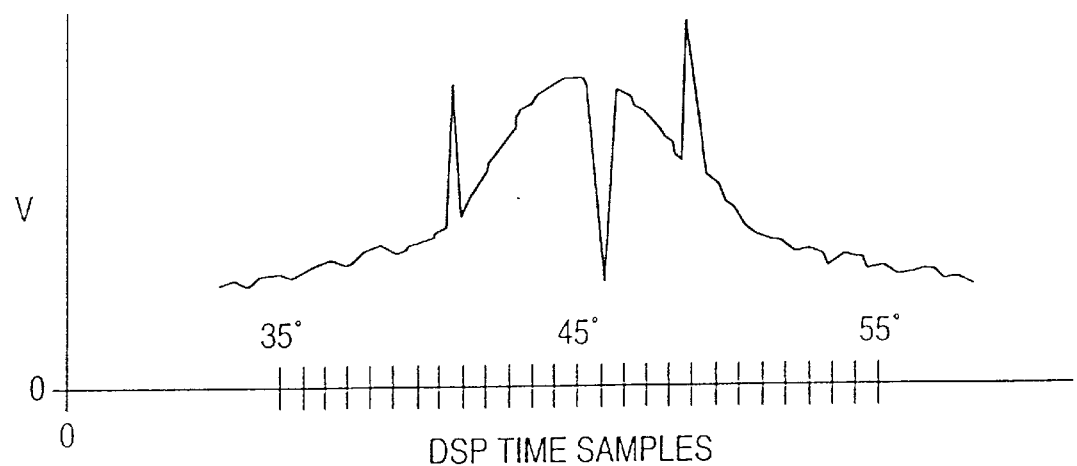
FIGS. 17A and 17B illustrate sample processing performed by the digital signal processor of the receiving circuitry to remove noise transients in a phase modulated sinusoidal subcarrier in accordance with the present invention.
Figure 17B:
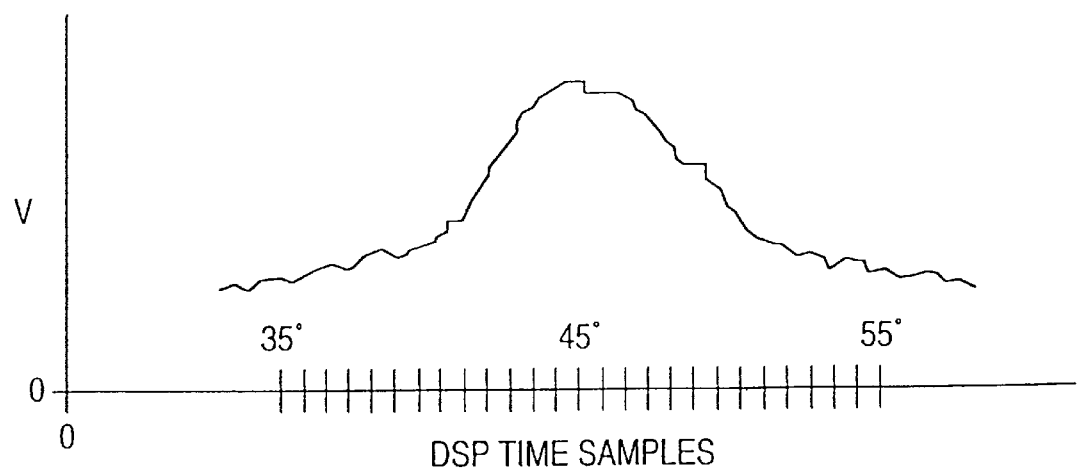

FIGS. 17A and B illustrate the reconstruction of a data waveform when modulation of the sinusoidal subcarrier is used as illustrated in FIGS. 6A and 8. In this example, the 45° phase is being processed which is modulated with binary information having noise riding on the data signal level. As discussed above in conjunction with the processing of a pulse width modulated waveform having noise riding on the data signal level, the digital signal processor U3' stores the sample values in the temporary RAM buffer. As illustrated in FIG. 17B, each of the samples is converted to a numerical value by an A to D converter or comparator associated with the digital signal processor. The ROM associated with the digital signal processor U3' stores a table of numerical ranges which each represent valid sample values over the duration of a part of the cycle of the subcarrier which are to be included in the integration of the subcarrier. As illustrated, the numerical ranges are based upon expected ranges which occur for a particular receiving circuitry design that represent signal levels which occur around the modulated phases of the subcarrier. For example, the illustrated transients are outside the numerical ranges of sample values which represent valid samples when the subcarrier is modulated with a one or zero as illustrated in FIG. 7 in the 20° window centered at 45°. When a series of voltage readings do not conform to the rate of rise or slope that would have been typical of valid binary encoding phase data, the signal processing is triggered to attempt to correct the data. The previous and subsequent A to D converter voltage readings are added together and divided by the number of readings to substitute a more accurate sample value which would typically be present in the absence of noise for the sample value representing noise. As can be seen in FIG. 17B, the modified signal waveform resembles more closely and more accurately the actual transmitted data. When the digital signal processor U3' now begins the integrating process to determine if the phase information contained at the 45° phase sample is a binary one or zero, the accuracy of the integration (and, therefore, the determination) is considerably more accurate. FIG. 14A illustrates what the data would look like when subcarrier modulation is being transmitted. In FIG. 14A it can be seen that the binary value of the data at the 45° phase is a binary zero and the binary value of the data at the 135° phase is a binary one. When the receiving circuitry in a receiver, transceiver or associated with a base station is be located in an extremely noisy environment, the aforementioned sample signal processing will serve to enhance and reconstruct the received data and will reduce the amount of error introduced by noise in the integrating process.

Figure 18:
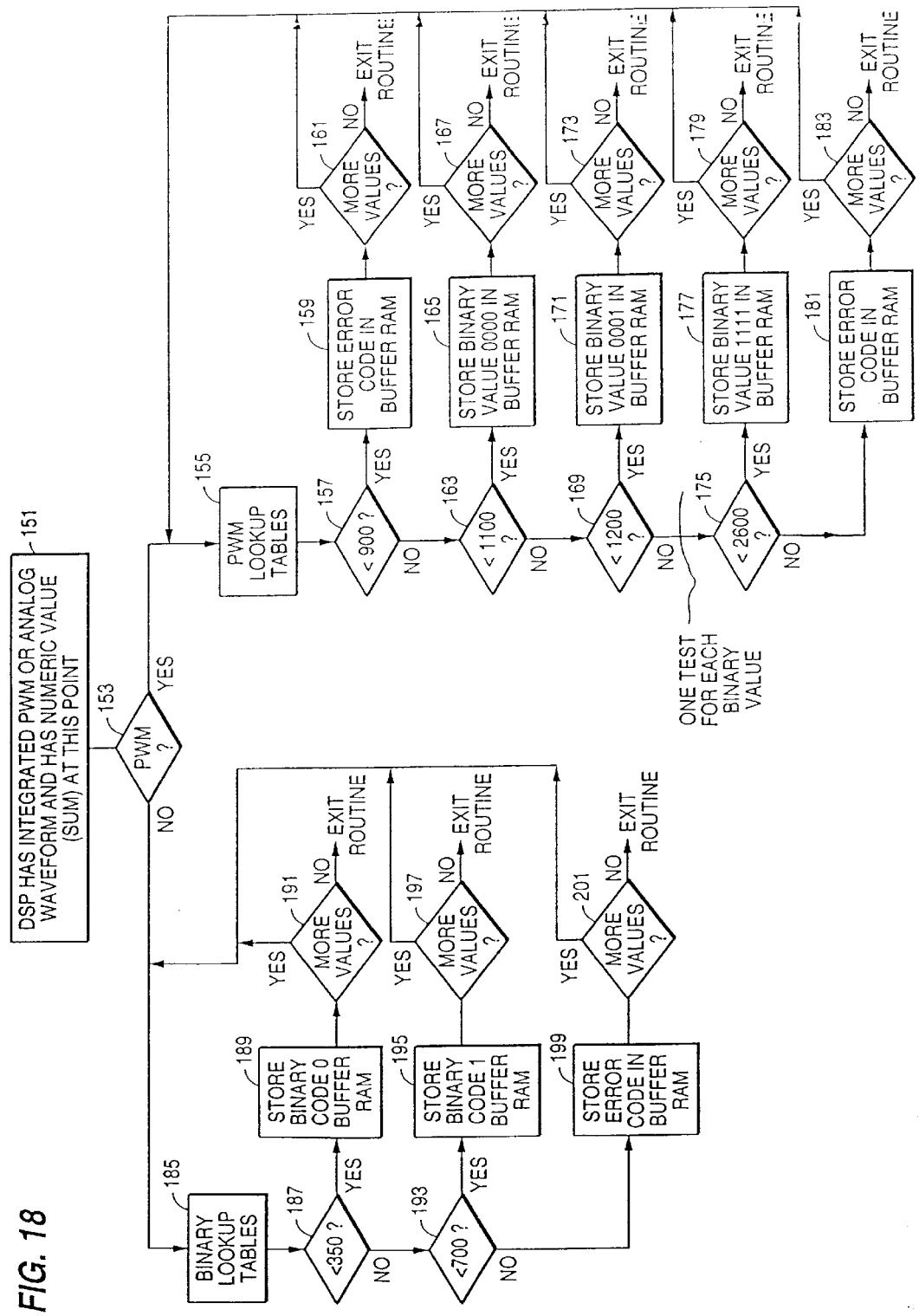
FIG. 18 is a flowchart of the operation of the digital signal processor of the receiving circuitry comparing integrals of the detected sinusoidal or digital subcarriers with prestored ranges to convert the serial information modulated on the subcarrier into a series of numerical representations of at least parts of data units in the form of individual bits or groups of bits which are modulated on the subcarrier in accordance with the format of FIGS. 5A–C, 5D or modifications thereof.

FIG. 18 illustrates the processing of the digital signal processor U3' which numerically compares each of the calculated integrals with a plurality of stored ranges which ranges each represent one of a plurality of possible numerical values that the selected part (one-half of a squarewave subcarrier or angular position of an analog subcarrier) may encode to identify a stored range numerically including the calculated integral and substituting for the at least one selected part of each of the cycles the one of the plurality of numerical values representative of the identified stored range including the calculated integral with each numerical value encoding at least a part of a data unit of the frames of information after the integrated value of the at least one selected part of a cycle of a subcarrier for a plurality of cycles has been determined which includes the integration of FIGS. 14A and B and 15 and the noise transient reduction of FIGS. 16A and B and 17A and B. The digital signal processor U3' takes the obtained integrated value and looks up the resulting binary value of a single bit or a group of bits depending if the subcarrier modulation is analog or digital or equivalent in the prestored lookup tables. With reference to FIG. 18, the processing proceeds from step 151 where integration is completed to decision point 153 where a determination if the modulation is analog (multiple phase at spaced apart angular positions of the subcarrier of FIG. 6A) or digital (pulse width modulation of halves of the squarewave subcarrier of FIG. 6B) is made. If the answer is "yes" at decision point 153, processing proceeds to step 155 where the lookup tables for processing the integration of pulse width modulation of a half of a cycle of the subcarrier are accessed. The stored ranges are each 100 in magnitude. Processing proceeds to step 157 where a determination is made if the value of the integration is less than 900. A value at decision point 157 of less than 900 indicates that the pulse width modulated waveform has an inherent problem making the comparison process invalid. If the answer is "yes" at decision point 157, the processing proceeds to step 159 where an error code is stored in a buffer within the RAM U4'. Processing proceeds from step 159 to decision point 161 where a determination is made if all of the stored integration values which are being group processed have been processed. If there are more values to be processed, the program loops back to step 155. Otherwise, the processing is complete. If the answer at decision point 157 is that the integral value is not less than 900, processing proceeds to decision point 163 where a determination is made if the integral is less than 1100. If the answer is "yes" at decision point 163, a four bit binary value of 0000 is stored at step 165 in the buffer RAM U4' which represents at least a part of an information unit of the serial information. Processing proceeds to decision point 167 where a determination analogous to decision point 161 is carried out. If the answer is "no" at decision point 163, processing proceeds to decision point 169 where a decision is made if the integral value is less than 1200. If the answer is "yes" at decision point 169, processing proceeds to step 171 where a binary value of four bits of 0001 is stored in the buffer RAM U4'. The processing proceeds to step 173 which is analogous to decision point 167. The broken line labelled "ONE TEST FOR EACH BINARY VALUE" indicates testing of the integral values for a series of increasing ranges which are increased in steps of 100 to determine if the binary values representing four bit groups between 0010 and 1110 should be stored in the buffer RAM U4'. Decision point 175 represents the last test where a determination is made if the integration value is less than 2600. If the answer is "yes", the processing proceeds to step 177 where the four bit binary valve 1111 is stored in the buffer RAM U4'. The processing proceeds from step 177 to decision point 179 which is analogous to decision points 167 and 173. If the answer is "no" at decision point 175, processing proceeds to step 181 where an error code is stored in the buffer RAM indicating that the integration value is greater than that which would be predicted by the prestored values (ranges) for each of the sixteen binary combinations. The processing then proceeds to decision point 183 which is analogous to decision points 167, 173 and 179.

If the answer to decision point 153 is "no", the processing proceeds to step 185 where the range for the binary values of one and zero are accessed for comparison with the integration value obtained at step 151 for the modulated separated angular phases of the subcarrier. The binary lookup tables are different than the pulse width modulation tables and are representative of the boundary between "1" and "0" values present in FIG. 14A for each of the separated angular phases which are modulated on the subcarrier. The integrated value falls within a range on one or the other side of the boundary for each separated angular phase which controls whether the modulation of the subcarrier at the separated angular positions is decoded as a one or a zero. When the integration process is completed, the processing compares the integrated value with ranges that define on which side of the boundary the actual integration lies. In this process the processing proceeds to decision point 187 where a determination is made if the value of the integral is less than 350. If the answer is "yes" the processing proceeds to step 189 where a binary zero is stored for the angular phase in the buffer RAM U4'. The processing proceeds to step 191 where a determination is made if more values are to be processed. This step is analogous to steps 161, 167, 173, 179 and 183 previously described. If the answer is "no" at step 187, processing proceeds to decision point 193 where a determination is made if the value of the integral is less than 700. If the answer is "yes", processing proceeds to step 195 where a binary one is stored in the buffer RAM U4'. The processing proceeds from step 195 to decision point 197 where a decision is made analogous to decisions 161, 167, 173, 179, 183 and 191 described above. If the answer is "no" at step 193, the processing proceeds to step 199 where an error code is stored in the buffer memory analogous to steps 159 and 181 as previously described. The processing proceeds from step 199 to decision point 201 which is analogous to decision points 161, 167, 175, 179, 183, 191 and 197.

The contents of the buffer RAM U4' store a group of binary values representative of individual bits when multiple phase modulation at separated angular positions is modulated on the subcarrier and groups of bits representative of the possible modulated numerical values when pulse width modulation is modulated on the subcarrier. The contents of the buffer RAM U4' store the detected serial information containing the detected FRAME GROUPS of FIGS. 5A–C, FIG. 5D or modifications thereof for subsequent processing by the signal processor U3'. Any errors caused by fading or other transmission fault which renders one or more bits of individual frames erroneous and uncorrectable or a sequence of frames including whole frame groups are contained at this time in the buffer RAM U4'. The processor U3' detects when an error is present by processing the error correction code embedded in the frames of the stored serial information as described below.

Although the previously described sample processing will serve to remove transients that may produce the decoding of erroneous data when large errors are introduced into the calculation of the integrals, it is still possible that the integration of the data modulated on the subcarrier at a particular phase would result in an erroneous detection. Many discriminators in radio receiving electronics have finite voltage limits when data is being detected. When receiving circuitry in a receiver or transceiver are designed for low voltage operation, the recovered data will be between zero and one volt in amplitude. However, in many types of discrimination there are particular combinations of interferences (typically, adjacent channel interference) that can cause a noise signal to be much greater in amplitude than the one volt level. These spikes or noise may be as high as two or three times the expected amplitude and not be representative of a true received data signal. The problem is more prevalent when multiple phase data is being decoded as this type of adjacent channel noise that is detected by the discriminator contributes greatly to distorting of the detected waveform and may change a binary zero to a binary one and a binary one to a value much greater than what a binary one is predicted to be. As previously described, the sample signal processing has finite limits on an amount of data interpretation that can be accomplished. Specific high and low boundaries must be placed in the lookup tables to prevent such data interpretation from being considered invalid. This is the reason for finite boundary values as discussed above in processing both multiphase and pulse width modulation of the subcarrier. The boundaries and the need for such boundaries will be dependent upon the receiving circuitry design of the particular product. Therefore, the boundaries represented by decision points 159, 181 and 199 may or may not be necessary in the receiving circuitry of a particular multiple phase or pulse width modulation application of the receiving circuitry which can make steps 159, 181 and 199 unnecessary. If the receiving circuitry is based exclusively upon either the multiphase or pulse width modulation protocol, decision point 153 may be omitted with only the necessary part of the processing for the particular protocol being included in the receiving circuitry.

Figure 19A:
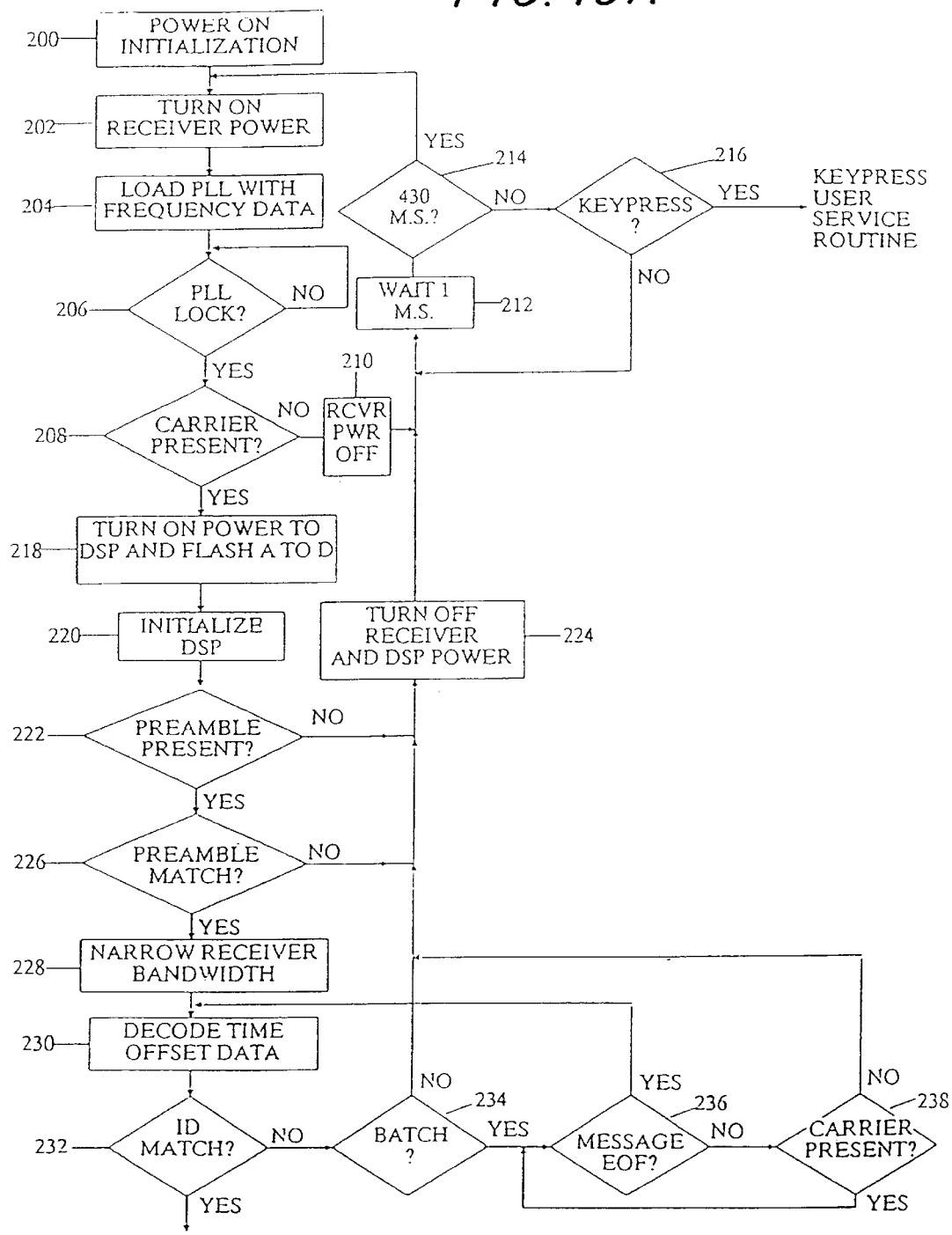
FIGS. 19A and 19B are a flowchart of the general operation of the receiving circuitry in accordance with the present invention.
Figure 19B:
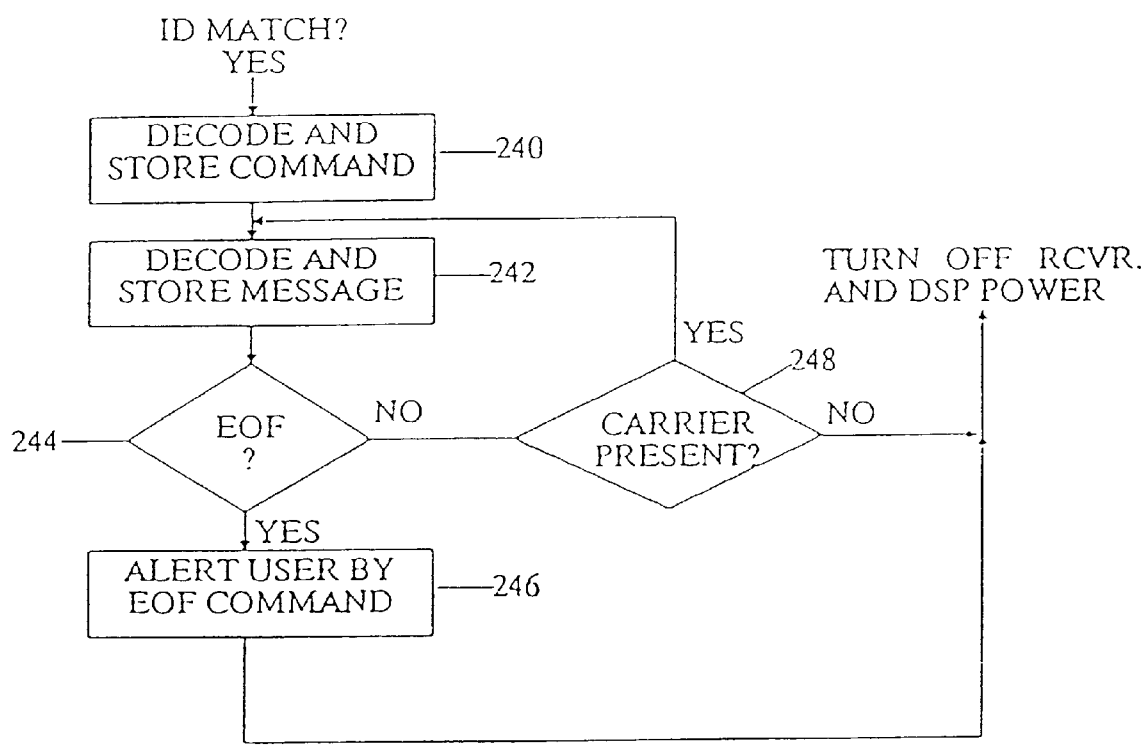

FIGS. 19A and B depict the general operation of the receiving circuitry as described above in FIG. 13. The flowchart depicts frequency synthesized receiving and battery saving techniques that are used with current receiver designs. Point 200 represents the power on initialization routines. When the user first turns on the power to the receiving circuitry at point 202, the resident control processor U7' starts an initialization process and self-testing diagnostics to insure that the receiving circuitry is fully functional. These diagnostics include the turning on and preprogramming of a frequency to the phase lock loop (not illustrated) and verification that the phase lock loop at point 204 can lock on a test frequency or the preprogrammed operating frequency, and a measurement of the battery voltage. The initialization routine also includes a verification of receiving circuitry's preprogrammed ID as contained in the encoded ID digits of the ID FRAME GROUP of FIGS. 5A and B and a visual test of the liquid crystal display by scrolling a test message for the user to observe.

Upon completion of the power on initialization, the receiving circuitry initializes its sampling routine of the radio channel. The control processor U7' first turns on the receiving circuitry power and loads the phase lock loop with the operating channel frequency data. The control processor U7' then waits for a channel lock verification from the PLL circuit prior to determining if carrier is present on the sample channel. When the lock condition is detected at point 206, the control processor U7' then tests for the presence of carrier at decision point 208. If there is no carrier present on the received radio channel, it is unnecessary for the control processor U7' to continue the receiving process, and it then powers off the receiving circuitry at point 210. Processing then stays in a loop including 212, 214, 202, 204, 206, 208 and 210 in which incrementing a 430 millisecond timer in one millisecond increments at points 212 and 214 occurs. During this time the control processor U7' is also looking for external keypress or serial port activity. If the user initiates a keypress function at decision point 216 (e.g., to read or display a message), the control processor U7' then executes the respective service routines to display the message. If an external peripheral device, such as the laptop PC 118, via the serial port 120 indicates that some activity is desired, the control processor U7' again goes into the user service routine to service the request.

Upon completion of the 430 millisecond time out, the control processor U7' then turns on the receiving circuitry power at point 202 and loads the PLL with frequency data at point 204. This channel sampling conserves the battery of the receiving circuitry of the receiver or transceiver.

When carrier is detected, the control processor U7' then turns on the power to the digital signal processor U3' and flash A to D converter at point 218. An initialization sequence is then initiated at point 220 by the control processor U3' and the digital signal processor U3' then searches for the presence of the multiple phase or pulse width modulation preamble information at point 222. If no preamble is present, the control processor U7' then proceeds to turn off the receiving circuitry and digital signal processor power and the four hundred thirty millisecond timer sequence is again initiated. If preamble is present at decision point 222 during the digital signal processor U3' sampling time, the digital signal processor then searches for a preamble match at decision point 226 identical to that contained in the ID FRAME GROUPS of FIGS. 5A or FIG. 5D. If the preamble does not match that of the preprogrammed ID of the receiving circuitry of the receiver or transceiver, the control CPU then initiates the orderly power off sequence at point 224.

If a preamble ID match is found at decision point 226, the control processor U7' then initiates the command to narrow the receiving circuitry bandwidth at block 228. During the initial sampling for preamble by the digital signal processor U3', the bandwidth has been broadened to permit rapid synchronization time. Being programmed with a wider bandwidth effectively serves to decrease the synchronization time of the digital signal processor U3' to the preamble data. When the digital signal processor U3' has been synchronized to the preamble at decision point 226, the bandwidth is then narrowed at point 228 to reduce the potential for noise interference and increase the integrity of the received information. The next process is for the digital signal processor U3' to decode the command CB of the ID FRAME GROUP information. This is followed by the decoding of the balance of the ID code of the receiving circuitry that is sent to the receiver or transceiver. If the control CPU U7' does not receive an ID match at decision point 232, it checks to see if the message being sent contains the batch command (command CB) at decision point 234 indicating that one or more messages to different ID code receivers or transceivers is being sent. If a batch command is detected at decision point 234, the control CPU U7' continues to monitor the message stream looking for an ID code match.

If an ID match has not occurred and a batch command CB has not been received, the control CPU U7' then initiates the orderly power down process at point 224 and continues the channel sampling sequence.

If the ID does not match and a batch command CB has been received, a third test is conducted to determine if either a message end of file command is present in the SHORTENED EOF FRAME GROUP of FIGS. 5C or D at decision point 236 indicating that no more messages are to be received within that preamble group or alternatively at decision point 238 that carrier has disappeared from the radio channel. If the answer is "no" at decision point 238, control CPU U7' then again initiates the orderly power down process at point 224.

If the ID matches that of the receiving circuitry of the receiver or transceiver, then the control processor U7' begins the decoding at point 240 of the Command CB and storage thereof. At block 242, the information of the serial information is decoded and stored in RAM U8'. The control processor U7' continually monitors for the end of file command EOF in the SHORTENED EOF FRAME GROUP of FIGS. 5C or FIG. 5D at decision point 244. If the end of file command EOF has been received at decision point 244, the control processor U7' then initiates the alerting sequence that is indicated by the end of file command. This may be a visual alert, an audible alert, or a mechanical alert (e.g. vibrator as indicated at block 246). Upon completion of the alert sequence, the control processor U7' again re-enters the orderly powerdown process of point 224 and continues channel sampling and scanning of the receiver's or transceiver's push buttons or serial port for activity.

If the end of file command EOF was not received, the control processor U7 then checks to determine if carrier is present at decision point 248. If carrier was not present, it indicates to the control processor U7' that faded information has occurred and the last end of file command EOF would not be received and then initiates the orderly power down process at point 224. If the end of file command EOF was not received and yet radio carrier remains present, it then continues the decoding and storage of the message material.

FIG. 20 illustrates a configuration of a two-way data transmitting system in accordance with the present invention. A protocol encoder/decoder network switch 602, which may be in accordance with FIG. 7, interfaces through the public switched telephone network PSTN via a telephone office 604 to a plurality of different types of information sources. The different types of possible information sources may be a PC 606, an E-mail source 608 and a data service 610. The aforementioned information sources are only exemplary of information which may be inputted to a two-way data transmitting system. The protocol encoder/decoder network switch 602 also is connected to a plurality of base stations 612 which are identified by the reference numerals "1"–"N" inside the rectangular boxes labelled "base station" to identify a variable number. Each base station 612 has an antenna 614 which functions both as a transmitting and receiving antenna. Carrier 616 is provided to the base stations which is modulated with an analog or digital subcarrier in accordance with FIGS. 6A 6B, 8 and 9. The subcarrier is modulated with the FRAME GROUPS of FIGS. 5A–C, FIG. 5D or modifications thereof. Two-way radio communications are broadcast on the modulated carrier between the base stations 612 and a plurality of mobile devices 618 each of which have a transmitting and receiving antenna 620. The two-way data transmitting system mobile devices 618 may be without limitation in practicing the invention, a mobile data transceiver A, portable PC, personal digital assistant (PDA) which may take the form of a hand-held computer, a wireless fax and another mobile data transceiver B which process the serial information stream as discussed above.

A two-way data transmitting system 600 in accordance with the invention has three basic call sequences which occur in providing mobile data service. The first sequence is a land-to-data mobile call in which the call originates from the wireline telephony network PSTN through the network switch 602 to a base station where it is radio broadcast to a mobile device 618. The second call sequence is a mobile device 618 originating a call to the wireline telephony network PSTN. The mobile device 618 originates the call which is transmitted via wireless broadcast 616 to a transceiving facility 612, 602 which is in turn connected to the wireline network. The third call sequence is a mobile device 620 making a call to another mobile device which is the equivalent of a cellular mobile to cellular mobile call in that both units are mobile or portable and the call from the originating mobile device is directed via wireless broadcast through the land station facility, processed by the protocol and encoder/decoder of the network switch 602 and is relayed back to the recipient mobile device via wireless broadcast. An example of this call sequence is from mobile A to the base station 1 through the protocol encoder/decoder of the network switch 602 back through the base station "N" to the mobile B. In each of these call sequences it should be understood that the explanation which refers to data devices A and B may be any of the devices described above as mobile devices.

With reference to FIG. 20, a land to mobile data message may originate from any number of devices. The data message may originate from the PC 606, the E-mail system 608 or the data service 610 that requires a message to be sent to a wireless destination. Such data services may be stock quotes, sports quotes, news services, map services, weather or traffic information and any other number of public or non-public services that need to be conveyed to an individual or multiple mobile data transceiver. The call sequence first begins on the left-hand side of FIG. 20 from any one of the data origination devices as described. For purposes of this example, the call originates from the E-mail service 608 to send a memo to the mobile A shown on the right-hand side of FIG. 20. The E-mail service 608 via the PSTN through the telephone offices 604 routes the call to the protocol encode/decoder of network switch 602 by dialing the corresponding telephone number of mobile A. Upon receipt of the call, the network switch 602 connects a modem to the telephone line to permit the E-mail message from the E-mail source 608 to be transmitted and received by the network switch 602. At this point it should be noted that the protocol encoder/decoder of network switch 602 functions to generate the serial information as described above which carries the message content originated from the E-mail source 608 as well as other protocol information including error correction code and frame identification information with the format of FIGS. 5A–C, FIG. 5D or modifications thereof. The network switch 602 looks up detailed information concerning the mobile A data transceiver. This information includes the A mobile's identification number, types of service that the mobile is registered to have, the transmission format and the particular base station or group of base stations that the A mobile currently resides on. Upon completion of this information look-up, the protocol encoder/decoder section of the network switch 602 selects an appropriate encoding module to perform encode of the subcarrier with the information formatted in accordance with FIGS. 5A–C, FIG. 5D or modifications thereof and relays the information via the "link" to base station "1". The "links" that are shown in FIG. 20 can be any one of a number of different communications media. It may be microwave, dedicated wireline, fiber optics or any other typical voice grade line. Control signals are sent by the network switch 602 to the base station "1" to turn on its transmitter 616 to begin the data transmission process which includes broadcast of the channel carrier 616 modulated with the analog or digital subcarrier which encodes the information formatted in accordance with FIGS. 5A–C or FIG. 5D as described above or modifications thereof. The mobile A provides some form of acknowledgment or response and may also be involved in interactive data communications. Interactive data communications could be an on-line communication between a PC 606 and the mobile A. Files may be transmitted from the PC 606 to the mobile A which are modified or which respond to the data by returning a transmission of the data via base station "1", the network switch 604 and through the telephone office 602 in the PSTN back to the originating PC 606.

A second sequence is a data mobile to land call sequence. With reference to FIG. 20, mobile A sends a data message to the land-based PC 606. The mobile A data transceiver enters the message and then initiates the transmission sequence. The mobile A, which is currently registered at the network switch 602, identifies and transmits the data message via the RF link to base station "1". Base station "1" receives the data message and forwards the message in real time to the network switch 602 when the mobile A initiates the calling sequence to transmit the data. The network switch 602 has been alerted and has received the mobile A's identification number. The network switch 602 then looks up in its subscriber file for data pertaining to the mobile A to determine what type of protocol encoding and decoding equipment to connect to the base station "1" port. The network switch 602 also looks up the types of service options to which the mobile A has subscribed. The protocol encoder/decoder network switch 602 receives the data message modulated in analog or digital form on the subcarrier to encode the information formatted in accordance with FIGS. 5A–C, FIG. 5D or modifications thereof from the mobile A data where it is decoded by receiving circuitry resident in the decoder which performs the functions of the receiving circuitry discussed above including with reference to FIG. 13. In this sequence, the mobile A has also transmitted the corresponding telephone number for the land-based call to the personal computer 606. The network switch 602 then dials the telephone number of the destination PC 606 through the telephone office 604 in the PSTN. A corresponding modem is connected to the PSTN link so that when the PC 606 answers, the data can be transmitted to the destination PC 606. Upon completion of the data transmission to the PC 606, the network switch 602 terminates the call. This explanation basically describes a one-way data message between the mobile A and the land-based PC 606.

There are other scenarios where the exchange of data may take place. In this case, two-way data transmissions occur during the mobile A and the PC 606 upon call set up. This permits real-time or interactive data transmission to occur between the mobile A and the PC 606. An example of this is when the mobile A accesses particular files in the Mobile A user's office PC 606 to either modify and/or retrieve data from the personal computer 606. The mobile A may be a full duplex or simplex mobile depending upon the type of transmitting infrastructure that is available for the wireless data service.

The third type of transmission is the data mobile to data mobile call sequence. With reference to FIG. 20, the mobile A initiates the data message call by alerting the network switch 602 by sending its identification code via the wireless link to base station "1" to the protocol encoder/decoder of the network switch 602. The network switch 602 then qualifies the mobile A's identification number and connects the necessary type of protocol encoder/decoder of the network switch 602 to the base station "1" port in order to receive the data message. The mobile A then enters mobile B's identification number (or telephone number) and begins the transmission of the data message. The network switch 602 looks at the mobile B's customer file to determine what radio channel and type of protocol decoder the mobile B transceiver has. In this case, mobile B is located on base station "N". Upon receipt of the data message from the mobile A, the network switch 602 temporarily stores the message in a buffer file of memory and then begins the signalling process to contact the mobile B. The mobile B's identification number is transmitted alerting the mobile B data that a message is about to be transmitted. The network switch 602 via base station "N" connects the necessary type of protocol encoder/decoder to format the information in accordance with FIGS. 5A–C, FIG. 5D or modifications thereof and modulates the analog or digital subcarrier and transmits the modulated subcarrier to the mobile B when the subcarrier modulates carrier 616. This example is essentially a one-way transmission of a data message from mobile A to mobile B.

There are variations of this call sequence such as an interactive data communications between mobile A and mobile B. A real-time interactive exchange of data may occur between mobile A and mobile B. Both mobile units then via real-time transmission exchange data between each other. This may be a form of interactive short text messages exchanging location or other information. In this configuration, both data mobile units remain actively transmitting or both transmitting on a corresponding base station with the network switch 602 acting as the encoder and decoder of serial information and buffering and forwarding the serial information between each unit. Another variation to this mobile communications sequence is for mobile A to send data to the wireless fax, PDA or a portable PC with a wireless link. Any number of data communications can be exchanged between each of the mobile devices 618 to any other type of mobile device. One type of transceiver which may be used in practicing the invention is described below in FIG. 21. The transceiver performs the functions of the transmitting and receiving circuitry described above in FIGS. 12 and 13.

Figure 21:
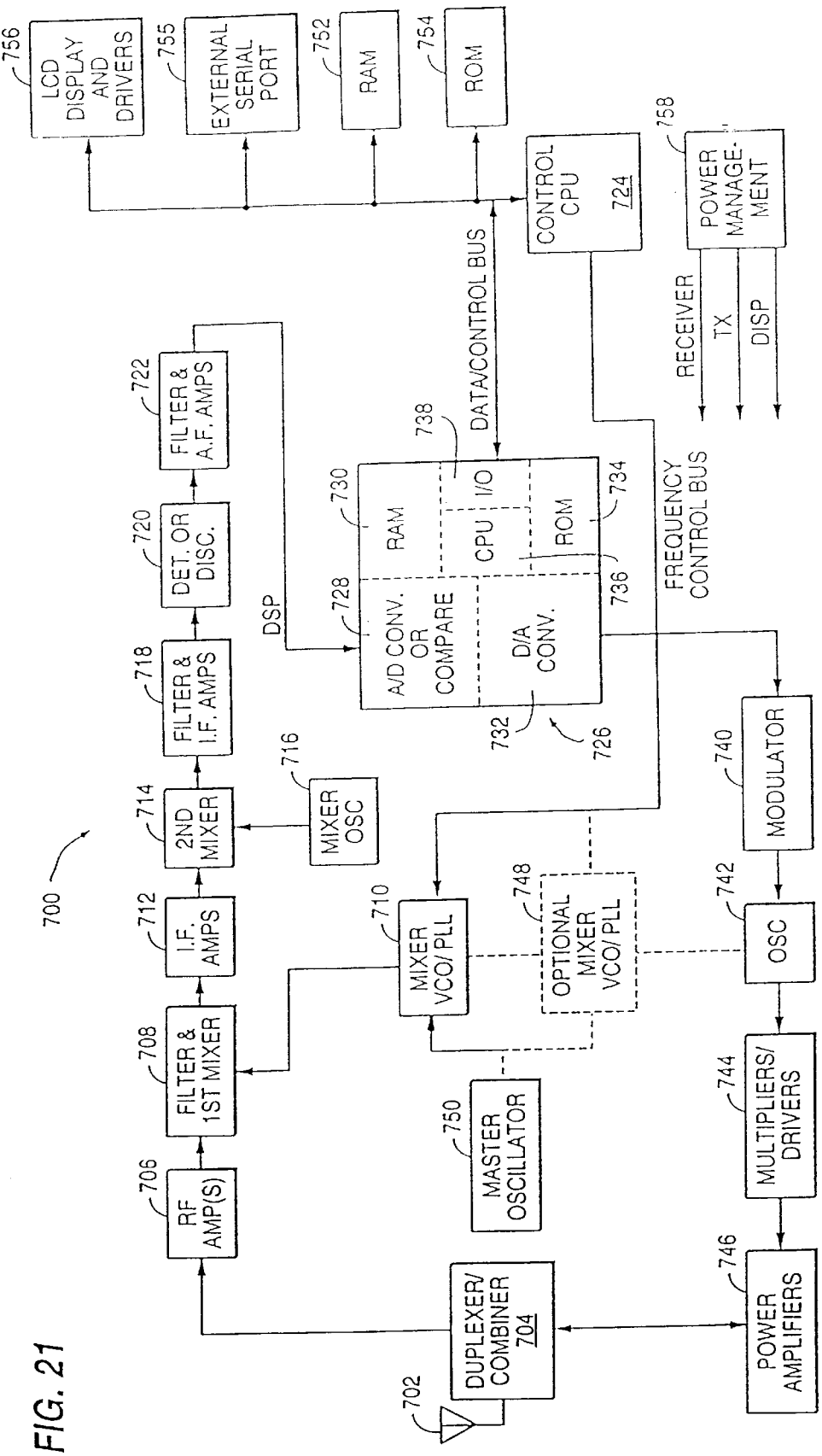
FIG. 21 is a block diagram of a transceiver in accordance with the present invention.

FIG. 21 illustrates a block diagram of a transceiver 700 in accordance with the present invention such as the mobile transceivers described above with reference to FIG. 20. The transceiver 700, as illustrated, is full duplex (being able to transmit and receive at the same time) as is typical in many wireless data transceivers. There are variations from duplex, such as simplex mode where the transceiver 700 transmits and receives on the same frequency or in a duplex "burst" mode where the transceiver only transmits for short burst type of transmissions to conserve battery power.

The transceiver is a dual conversion frequency synthesized device. The received signal is transmitted from antenna 702 through a duplexer/combine 704 which functions to couple the antenna to the radio receiver and provide isolation from the transmitter power amplifiers 746 to prevent desensitization of the receiver and to utilize a single antenna for both the transmission and reception of information. The RF amplifier 706 may contain one or more stages depending upon the operating frequency of the transceiver 700. The received signal then flows to a filter and first mixer 708 at which the signal is mixed following by intermediate filtering. The mixing uses the output signal from the mixer, voltage controlled oscillator and phase lock loop circuitry 710 to convert the received signal to the intermediate frequency. The IF frequency produced at the first mixer 708 may be any number of frequencies depending upon the operating frequency spread of the transceiver 700. Typical choices for the IF frequency at this point are 44, 21.4 or 10.7 MHz. After IF filtering, the signal is amplified by IF amps 712 which typically contain a plurality of stages. The signal, as amplified by the IF amps 712, proceeds to a second mixer 714 at which a signal from mixer oscillator 716 is mixed with the amplified IF signal to produce a lower IF frequency signal. The lower IF frequency signal progresses to a filter and IF amps 718 where further IF filtering and amplification occurs. The filtered and amplified signal proceeds to a detector or discriminator 720 where the IF signal is demodulated to an audio frequency signal which contains the analog or digital subcarrier modulated with the information formatted in accordance with FIGS. 5A–C, FIG. 5D or modifications thereof.

Depending upon the format of the transmission protocol (multiple phase, pulse width modulation or both types of modulation of the subcarrier) the detector or discriminator 720 may have numerous configurations that are well known in the state of the art. The illustrated receiver circuitry may have a standard FM discriminator with the recovered audio frequency signal being fed to a series of audio frequency amplifiers and filters 722. All of the above-referenced components represent a standard communications receiver known in the art. The operating frequency of the receiving part of the transceiver 700 is controlled by the mixer, voltage controlled oscillator and phase lock loop circuitry and is under direct control of the control processor 724. The control processor 724 in the transceiver 700 is responsible for numerous functions including the direct frequency control of both the receiver and transmitting circuitry to perform the functions as described below.

The receiving circuitry of the transceiver 700 includes the digital signal processor 726 and the control processor 724. The receiving circuitry performs the processing of the modulated subcarrier to convert the serial information modulated on the analog or digital subcarrier into binary information as described above having a format in accordance with FIGS. 5A–C, FIG. 5D or modifications thereof and, additionally, the processing of the serial information converted into binary information to correct for faded information and produce a reconstructed and resynchronized output as described below.

The digital signal processor 726 has an A to D converter or comparator 728 for digitizing signal levels, RAM 730 for storing information as described above in performing the functions of the digital signal processor U3' and control processor U7' of FIG. 13, a D to A converter 732 for converting digital information to analog, a ROM 734 for storing prestored programming, a CPU 736 for executing the necessary programming to perform the functions of the digital signal processor U3' and input/output 736. Furthermore, the digital signal processor 726 may perform the same functions as the digital signal processor U3' and the control processor 724 may perform the same functions as the signal processor U7' as described above with reference to FIG. 13.

The digital signal processor 726 also functions to perform the functions of the transmitting circuitry of FIG. 12. These functions include the functions of CPU U1 and digital control processor U47 of FIG. 12 to produce the encoded serial information stream modulated on an analog or digital subcarrier as described above.

The transmitter part of the transceiver 700 has a modulator 740, oscillator 742, multipliers/drivers 744 and power amplifiers 746, duplexer/combiner 704 and an antenna 702. The modulator 740 receives the modulated subcarrier in either analog or digital form, as described respectively above with reference to FIGS. 6A and 8 and FIGS. 6B and 9, and converts it to a dynamic range which modulates an oscillator 742 which is FM modulated by the output of the modulator 740 to produce a low power RF frequency modulated signal which is FM modulated with the subcarrier. Depending upon the operating configuration of the transceiver 700, a separate mixer, voltage controlled oscillator and phase lock loop 748 may exist. In a simplex configuration, the optional mixer, voltage controlled oscillator and phase lock loop 748 would not be used and the oscillator would derive this control from the mixer, voltage controlled oscillator and phase lock loop 710. Master oscillator 750 is a frequency reference for both the mixer, voltage controlled oscillator and phase lock circuits 710 and 748. The multipliers/drivers 744 multiply the frequency of the FM modulated RF signal produced by the oscillator 742 and step up the power to a level such as five watts. The output of the multipliers/drivers 744 is further amplified by power amplifiers 746. The output of the power amplifiers 746 is applied through the duplexer/combiner 704 to the antenna 702.

The digital signal processor 726 is the heart of the data encoding and decoding of information by the transceiver 700. As shown, the digital signal processor 726 has access to the data control buses of the control processor 724. The digital signal processor 726, in addition to the above-described functions, serves as a message management processor and to initially synchronize the clock to properly process the bits of the frames of the frame groups, resynchronize the clock and reconstruct one or more faded frames by processing the serial information as discussed below. The serially encoded information which is modulated on the subcarrier, detected and converted into binary, may be sent to the control processor 724 for storage in the RAM 752. The stored operating program resident in ROM 754 may provide the information necessary to permit the control processor 724 to perform its frequency control operations, and transmission of the information stored in the RAM 752, transmission of the information to an external serial port 755 and to display messages on a resident liquid crystal 756.

Depending upon the power requirements and portability of the transceiver, power management electronics 758 may also be controlled by the control processor 724. The power management electronics 758 contain control logic that permits the control processor 724 to shut down or control power to various portions of the transceiver. Typically, power to the transmitter and display will be off during periods of inactivity. The receiver power control will be systematically and periodically turned on to sample the received channel for the presence of data information. Only when received data is present will the various other areas of the transceiver be switched on as needed. This type of power management maximizes power conservation and permits the transceiver to be extremely light weight and portable in operation. The transceiver as described could be a trunk or under dash vehicle mount unit with a power output of ten watts or greater, a small hand-held PDA or notebook computer that may only transmit a few watts of power as required.

While the receiving circuitry of FIG. 13 includes the digital signal processor U3' and control processor U7', it should be understood that the functions of the digital signal processor U3' and control processor U7' of FIG. 13 can be solely performed by the digital signal processor 726 or the control processor 724. Furthermore, given the rapid increase in processing speed and processing capability of digital signal processors in low voltage, low power integrated circuits, the implementation of the discrete functions of the digital signal processor U3' and control processor U7' of FIG. 12 into a single processor, such as the digital signal processor 726, will become increasingly simpler and may be the preferred architecture for performing the processing functions of the digital signal processor U3' and control processor U7' instead of having a separate digital signal processor and control processor.

Figure 22:
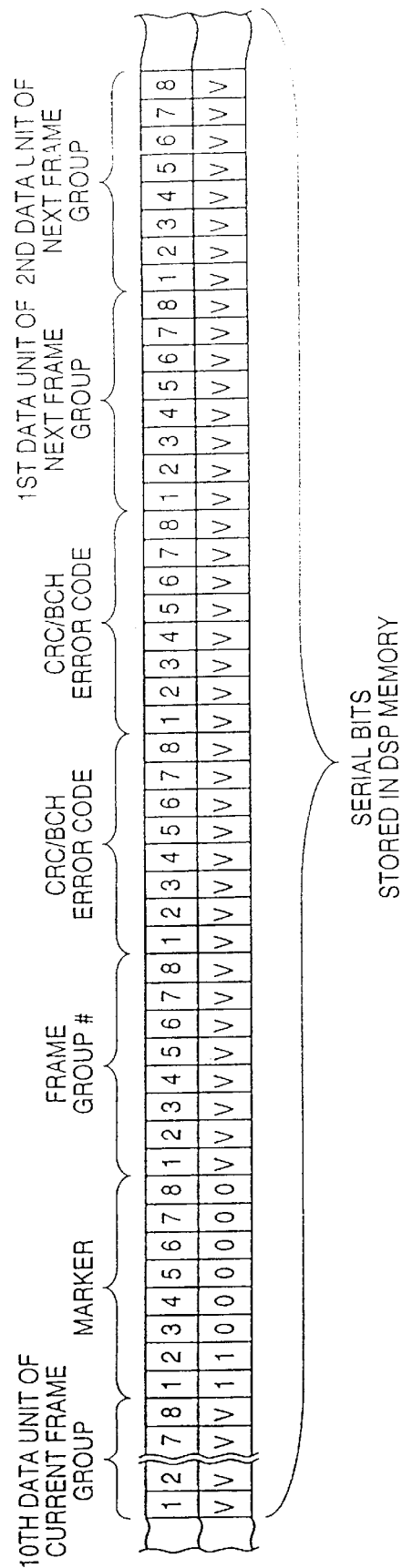
FIG. 22 illustrates a valid bit pattern of the DATA FRAME GROUP of FIG. 5B including the marker S" and FRAME GROUP #.

FIG. 22 illustrates a representation of the bits of the fourth frame of the DATA FRAME GROUP in accordance with FIG. 5B, including the synchronization marker S" and the FRAME GROUP # which are stored in memory of the receiving circuitry after detection of the transmitted carrier and demodulation of the subcarrier including the processing of FIG. 18. As explained below in FIGS. 26A–C, the bits of the error correction field are discarded when reconstruction or resynchronization followed by reconstruction is completed which leaves the decoded other bits for subsequent processing such as outputting of the data units or data bits. The data bits of FIG. 22 are all valid data bits which do not require reconstruction or resynchronization by the receiving circuitry as described below in conjunction with FIGS. 23–27. As is illustrated in FIG. 22, a broken vertical line in the left-hand portion of FIG. 22 indicates a break in the time base between bits 2 and 7 in the tenth data unit. The upper series of numbers in the horizontal row of boxes, as indicated above, identifies bit positions within the fourth frame. The lower boxes containing the legend "V", which are for illustration purposes only, identify that the data is valid which signifies that the frame has been processed with the error correction code and no data bits within the frame have been found to be invalid beyond the bit error correction capacity of the error correction code. It should be understood that the use of the identifying letter "V" is not actually stored in the memory associated with the digital signal processor. As explained above, the error correction code bits have a value which is a function of the bits of the data units contained in the frame. The actual value of the data bits and the functionally related error code has not been shown because it is not necessary for understanding the invention. The synchronization marker S", as explained above, which spans eight bits, contains a bit pattern which is representative of an invalid data unit. With a preferred embodiment of the present invention in which eight bit ASCII characters are encoded to transmit alphanumeric data, one of the so-called extended ASCII characters between a numerical eight bit value of 127 and 255 is chosen to represent the synchronization marker S" which does not represent valid data.

The synchronization marker S" provides a fixed position of a group of bits within each DATA FRAME GROUP which is used to resynchronize the clock of the at least one processor of the receiving circuitry in order to provide proper processing of groups of bits comprising a frame (e.g. forty five as explained with reference to FIGS. 5A–D) in synchronism with the timing of the corresponding bits of the frame as formatted and transmitted by the transmitter. The at least one digital signal processor of the receiving circuitry is programmed to detect the unique pattern of the synchronization marker S" which in FIG. 22 is 11000000. Other unique patterns could also be used. The data stored in the memory associated with the digital signal processor is shifted by the digital signal processor backwards and forwards by known techniques until the unique bit pattern of 11000000 representing the stored synchronization marker S" is located. Thereafter, because the synchronization marker S" marks a fixed position of a group of bits in a FRAME GROUP, the digital signal processor is resynchronized and the processing of bits within frames is locked onto the resynchronized clock timing produced by detecting the synchronization marker S". Loss of synchronism, as explained above and below, is determined by at least one data frame being detected and processed by the at least one processor of the receiving circuitry to determine that at least one invalid bit exists in a frame which cannot be corrected with the error correction code of the frame thus rendering the frame erroneous in accordance with the prior art. In summary, FIG. 22 illustrates an example of the stored valid data which occurs when the error correction code capability of a frame is not exceeded, i.e. all bits are valid in the DATA FRAME GROUP of FIG. 5B.

For example, if the clock timing of the receiving circuitry slipped three bit positions between FRAME GROUP #3 and FRAME GROUP #12 of FIG. 27 as explained below, the digital signal processor by performing shifting of stored bits in memory to locate the synchronization marker in FRAME GROUP #12 shifts the clock timing by three clock cycles. Once proper clock timing of the digital signal processor is resynchronized, groups of bits corresponding to the number of bits in a frame (e.g. forty five) may be fetched and tested to perform reconstruction in either a forward and backward direction between the detected synchronization marker S" and to and including the at least one frame that contains at least one erroneous uncorrectable bit marking the loss of synchronization to attempt to reconstruct data frames which had been rendered erroneous by the loss of synchronization as described below in conjunction with FIG. 27.

FIGS. 23–25 illustrate frames which contain at least one erroneous uncorrectable bit. As illustrated in FIGS. 23–25, like in FIG. 22, vertical wavy lines indicate time breaks between bit positions of a particular frame. The top horizontal row of numbers in FIGS. 23–25, like in FIG. 22, identify particular bit positions within the data units and within the error code of a frame within a DATA FRAME GROUP of a format of FIG. 5B. The bottom series of letters use a "V" to identify valid data, and an "E" to identify erroneous bits which cannot be corrected by the processing of the bits of the frame with error correction code. It should be understood that the use of the identifying letters "V" and "E" are only for illustrative purposes and are not actually representative of data stored in the memory associated with the digital signal processor which, of course, is bit values of one or zero. Again, like in FIG. 22, knowledge of the actual value of the data units and error correction code is not necessary to understand the examples of FIGS. 23–25 illustrating erroneous uncorrectable bit patterns comprised of bits identified by the letter "E". Typically, the BCH 45,24 error correction code has the ability to correct up to two bit errors per frame. With the prior art, the presence of erroneous uncorrectable bits results in erroneous information because there was no processing capability provided in the receiving circuitry receiving a wireless transmission of information to recover erroneous bits after the error correction capacity of the error correction code was exceeded as is indicated symbolically by the letter "E" in FIGS. 23–25 and 27.

The error recovery and reconstruction capability of the present invention is based upon the processing capability of the at least one processor within the receiving circuitry, which preferably is at least one digital signal processor, to detect erroneous bit patterns in the field of the error correction bits after processing of the frame with the error correction code. The erroneous bit patterns either contain a series of all zeros or all ones of a number exceeding the bit error correction capacity of the error correction code. That is, if the BCH error code bit error correction capacity is two bits, a pattern of at least three or more all zeros or ones would be the object of the pattern search. Once the error correction code has been processed in each frame and the computation result indicates that at least one erroneous bit is present, which signifies exceeding of the error correction capability of the error correction code contained in the frame, the processor searches the stored bits to look for the aforementioned erroneous bit pattern of all zeros or all ones located totally within the error correction bit field. Detection of these patterns and their position within the stored bits in memory by bit shifting or other known techniques after computation by the digital signal processor that at least one erroneous uncorrectable bit is present in a frame is used to determine in which bit positions the erroneous uncorrectable bits are present. If these bit patterns are found to be totally within the error correction code bit field, valid bits outside the bit field of the error correction code (data) are recovered and reconstructed as explained below in conjunction with FIG. 23 is successful with the error correction code bits being discarded. If the pattern of all zeros or all ones is not found to be totally within the error correction code bit field, the data bits cannot be recovered and reconstructed which requires error markers to be inserted for the data units as described below. It should be noted that the successful reconstruction of valid data from a frame which contains at least one erroneous uncorrectable bit resultant from processing the error correction code of the frame is performed in accordance with the present invention either during the existence of original synchronization produced by the ID FRAME GROUPS of FIGS. 5A and 5D or after resynchronization by locating the synchronization marker S".

The digital signal processor processes the stored bits of the data frames within the DATA FRAME GROUPS with the error correction code therein to determine if the plurality of bits of the data frames do not contain any erroneous uncorrectable bits which dictates that the data be stored as valid data and the error correction code be discarded. If at least one erroneous uncorrectable bit signified symbolically by the letter "E" in FIGS. 23–25 which cannot be corrected with the error correction code is located, the digital signal processor processes the stored bits of the frames which contain the at least one erroneous uncorrectable bit somewhere therein to determine if the frames contain only valid data bits in the data field signified by the erroneous bits (the aforementioned multibit pattern of zeros or ones) being totally in the error correction code field which is illustrated in FIG. 23 which renders the data bits valid and the error correction is discarded. As is illustrated in FIGS. 24–25, all of the data bits are not valid as symbolically identified by the letter "E" outside the error correction code bit field which renders the data bits of the frames of FIGS. 24 and 25 invalid and the data units are stored as error characters. In FIGS. 24–25, the pattern of erroneous uncorrectable data bits identified by the letter "E" is not totally contained in the error correction code bit field which makes it impossible for the digital signal processor to discriminate whether or not any of the data units contain valid data. It is not possible to determine reliably whether any of the eight bit data unit bit groups in the DATA FRAME GROUPS of FIGS. 24 and 25 are valid data when erroneous uncorrectable bits are not totally present within the error correction code, as, for example, being totally contained in the data units in FIG. 24 or spanning the error correction bit field and the data unit bit field as illustrated in FIG. 25.

The process of determining whether valid data can be reconstructed from data frames containing at least one erroneous uncorrectable bit by processing the error correction code of the frame is performed in situations where minor fades or transmission errors occur where synchronism is not lost and after resynchronizing is performed. In both instances reconstruction of valid data is possible which would have been lost with use of only the error correction capacity of the error correction code contained in each of the frames as processed in accordance with the prior art. As illustrated in FIG. 23, only the circumstance when the error correction code bit field is determined by the aforementioned pattern recognition capability of the digital signal processor to totally contain a successive pattern of all zeros or all ones, such at least three successive bits when the BCH code is capable of correcting for a two bit error, represents recoverable and reconstructible data.

After the reconstruction or resynchronization process followed by reconstruction is complete, there no longer is a need for processing the error correction code bits. Thereafter, the error correction code bits are discarded and only the bits of the data units are stored in memory for further processing to output useful data units.

Figure 26A:
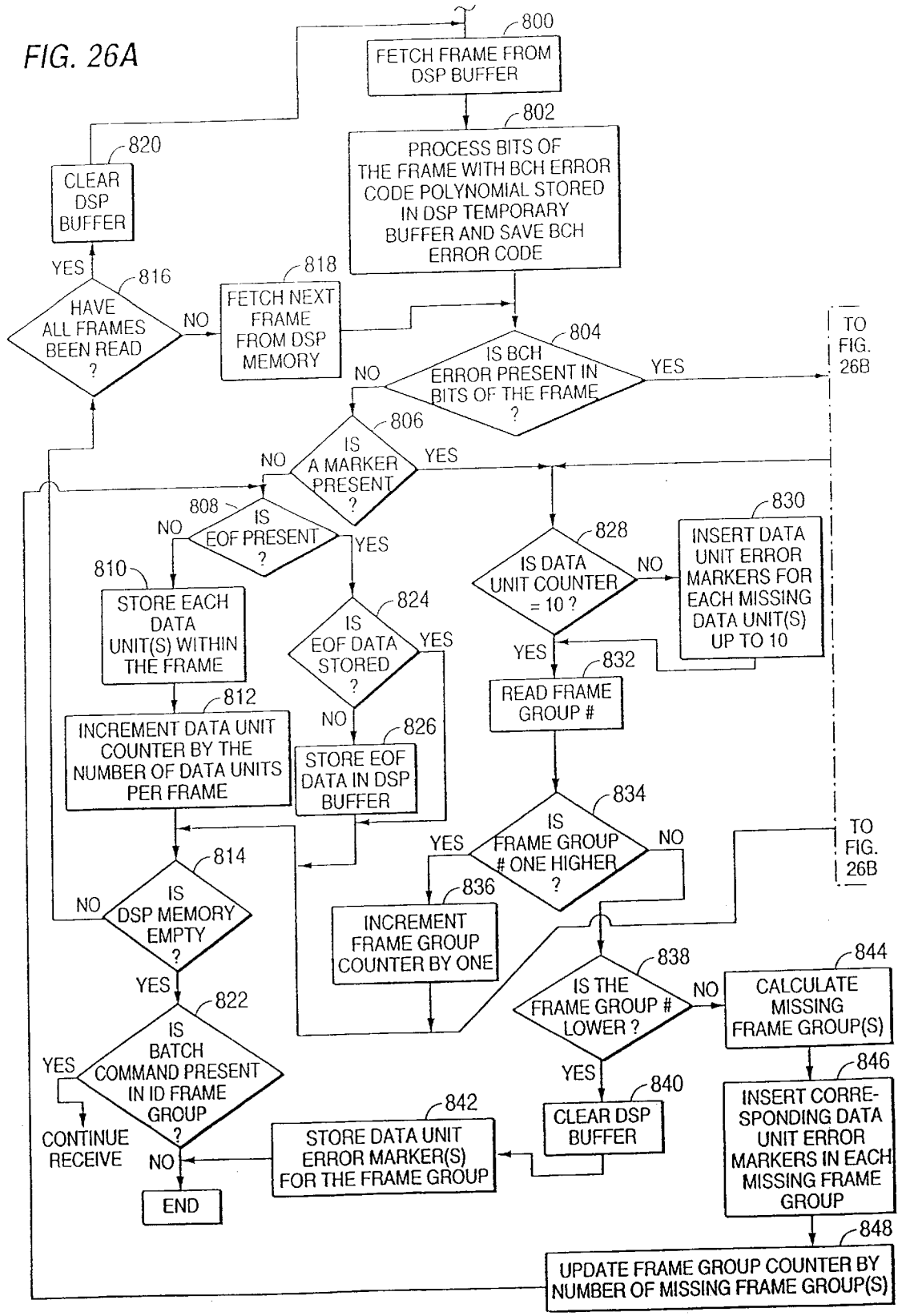
Figure 26C:
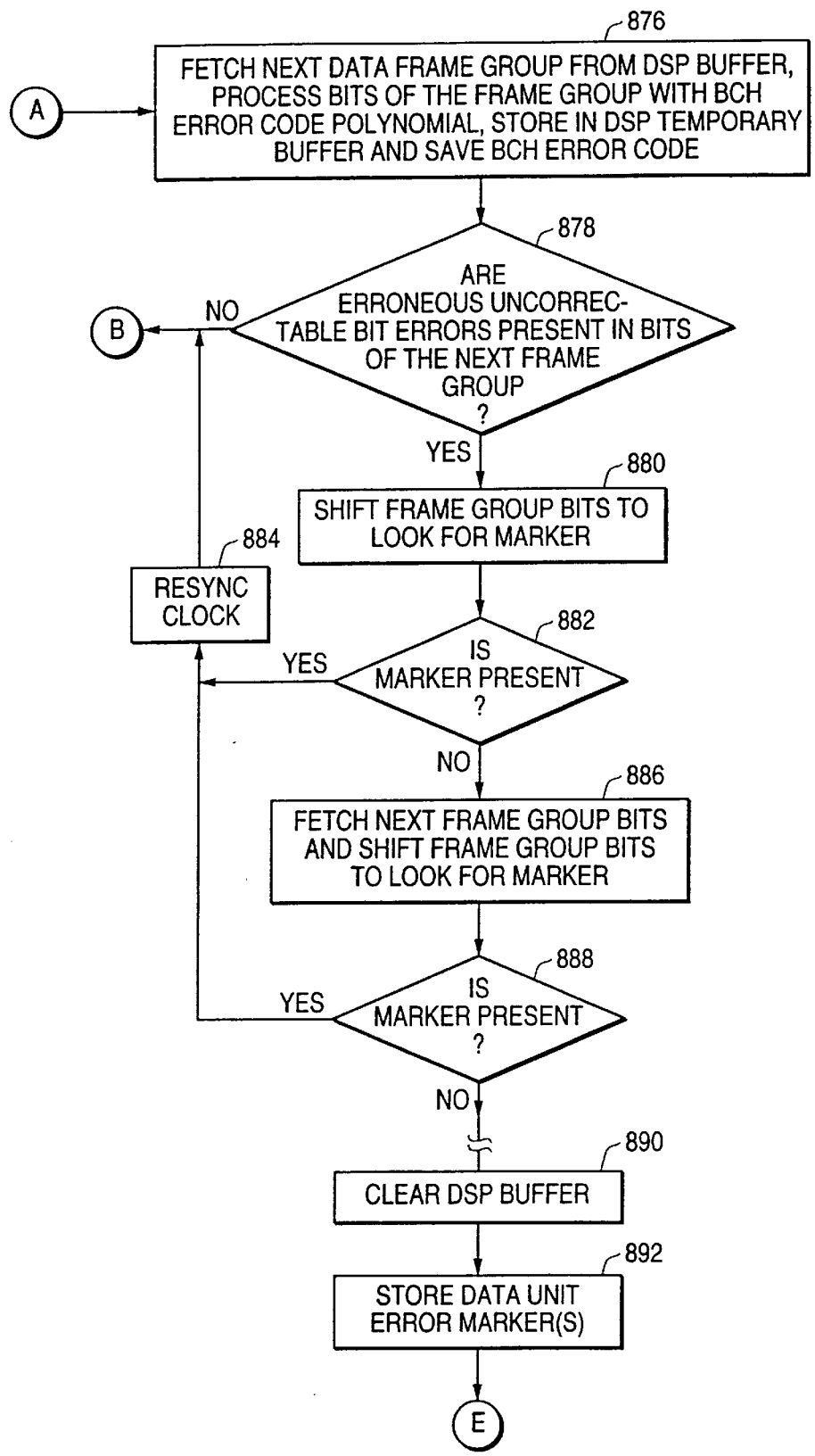

FIGS. 26A–26C illustrate the processing performed by the at least one digital signal processor of the receiving circuitry, such as the digital signal processor of the receiving circuitry of FIG. 13 of a transmission formatted in accordance with FIGS. 5A–C. Processing begins at point 800 where the digital signal processor fetches a frame of forty five bits from the associated memory. Processing proceeds to point 802 wherein the data bits of each data unit within the frame are processed with the BCH error code polynomial stored in the associated digital signal processor temporary buffer and the results, including the BCH error code, are saved in memory for subsequent processing as is explained below and as illustrated in, for example, FIGS. 23–25 and FIG. 27 explained below. Processing proceeds to decision point 804 where a determination is made if a bit error is present in the frame by processing the BCH code. Such errors do not necessarily, at this point, exceed the bit error correction capability of the BCH code. If the answer is "no" at decision point 804 that processing of the BCH code does not reveal an error in the frame, processing proceeds to decision point 806. At decision point 806, a determination is made of whether or not the synchronization marker S" as illustrated in FIGS. 5A and 5B is present. If the answer is "no", processing proceeds to decision point 808 where a determination is made if an EOF marker is present as illustrated in the SHORTENED EOF Frame Group of FIG. 5C. If the answer is "no" at decision point 808, processing proceeds to point 810 where each of the data units within the frame are stored. With reference to the organization of data bits illustrated in FIG. 5B, each of the three data units comprised of eight bits in each frame is stored in the memory associated with the digital signal processor. If the twenty four data bits within the frame do not define an integral number of data units, such as a fraction of a data unit or an integer plus a fraction of a data unit, those bits are stored within the memory. As has been explained above, the choice of how many bits comprise a data unit is made to optimize transmission and processing efficiency which, as stated in the examples described above, is based upon alphanumeric data being transmitted as defined by eight bit characters. Processing proceeds to point 812 where a data unit counter is incremented by the number of data units per frame which, in the example given above, would be an incrementing by three. Processing proceeds to decision point 814 where a determination is made of whether or not the digital signal processor associated memory is empty in that no frames of bits are stored therein. If the answer is "no" at decision point 814, processing proceeds to decision point 816 where a determination is made if all of the frames have been read from memory which comprise the transmission including the first DATA FRAME GROUP and ending with an SHORTENED EOF DATA FRAME GROUP. If the answer is "no" at decision point 816, processing proceeds to point 818 where a next frame stored in the associated digital signal processor memory is fetched. Thereafter, processing proceeds to decision point 804 as described above. If the answer is "yes" at decision point 816, processing proceeds to point 820 where the digital signal processor buffer section of memory is processed to clear the memory for processing for the next transmission of information. If the answer at decision point 814 is "yes", processing proceeds to decision point 822 where a determination is made if a batch command CB is present in the ID Frame Groups illustrated in FIG. 5A. If the answer is "yes" at decision point 822, reception continues as described above in accordance with the general processing performed by the receiving circuitry as described above. If the answer is "no" at decision point 822, processing ends. If the answer is "yes" at decision point 808, processing proceeds to decision point 824 where a determination is made if End Of File Data, as illustrated in FIG. 5C, is stored in the digital signal processor memory. If the answer is "yes" at decision point 824, processing proceeds to decision point 814 as described above. If the answer is "no" at decision point 824, processing proceeds to point 826 where the End Of File Data is stored in the digital signal processor buffer section of memory. If the answer is "yes" at decision point 806 that a synchronization marker S" is present in accordance with the FRAME GROUPS of FIGS. 5A or 5B, processing proceeds to decision point 828 where a determination is made is a data unit counter equal to ten. As is illustrated, the data unit counter is set to cycle between the number of data units contained in the frames of a DATA FRAME GROUP as illustrated in FIG. 5B. However, it should be understood that the data unit counter could alternatively be set to cycle between the number of frames in a data frame group with the full twenty four bits being considered a single data unit. If the answer is "no" at decision point 828, processing proceeds to point 830 where data unit error markers are inserted for each missing data unit up to ten. The purpose of the data unit error markers is to fill in missing data units contained in the frames of data which have not been stored when the data unit counter equals ten. The data unit error markers may be an encoded "*". If the data unit counter is determined to be equal to ten at decision point 828, or the processing has proceeded to point 830, as described above, processing proceeds to point 832 where the FRAME GROUP # of FIGS. 5A and 5B is read. Processing proceeds to decision point 834 where a determination is made if the FRAME GROUP # which has been read at point 832 is one unit higher than the previous FRAME GROUP #. If the answer is "yes" at decision point 834, processing proceeds to point 836 where the previously stored FRAME GROUP # is incremented by one to agree with the currently read FRAME GROUP. As is described below, the purpose of storing the FRAME GROUP # is to provide a basis to calculate the number of frames which are involved with a loss of synchronism between the determination of where synchronization is detected as being first lost by one or more successive frames being calculated to contain one or more erroneous uncorrectable bits and when a synchronization marker S" is first detected in a subsequently transmitted DATA FRAME GROUP so as to insure complete reconstruction processing after resynchronization is established by detecting the resynchronization marker S". Once the FRAME GROUP # of a FRAME GROUP containing frames which contain one or more erroneous uncorrectable bits is known, and the FRAME GROUP # of the subsequent DATA FRAME GROUP in which a synchronization marker is detected to perform resynchronization, the digital signal processor can calculate how many frames are contained between the detection of the loss of synchronization and the detection of the subsequently transmitted synchronization marker to complete reconstruction of these frames to recover as much valid data as possible by the subsequent processing revealing either the error correction code bit correction capacity of a frame is not exceeded or even if the error correction code bit capacity is exceeded, the erroneous bits are determined to be totally within the bit field of the error correction code. If the answer is "no" at decision point 834, the processing proceeds to decision point 838 where a decision is made whether the FRAME GROUP # is lower. If the answer is "yes" at decision point 838, processing proceeds to point 840 where the digital signal processor buffer is cleared as a consequence of the drop in detected FRAME GROUP # which is indicative of a fade which has a duration spanning the SHORTENED EOF FRAME GROUP in FIG. 5C into another transmission which must start with a lower sequence of FRAME GROUP #'s. Processing proceeds to point 842 where the remaining data units of the frames of the FRAME GROUP are filled with error markers because of the fault having spanned the previously detected FRAME GROUP # into a FRAME GROUP of another transmission. Those frames in the DATA FRAME GROUP which were detected prior to the subsequent detection of a lower FRAME GROUP # have error markers stored therein. Processing proceeds from point 842 to the end of processing because of the ending of the transmission without detection where the transmission end occurred by detecting the SHORTENED EOF FRAME GROUP of FIG. 5C. If the answer is "no" at decision point 838, processing proceeds to point 844 where a determination is made of how many FRAME GROUPS have been missed. This determination is made by comparing the number of FRAME GROUPS which are missing between the previously detected FRAME GROUP # and the currently detected FRAME GROUP #. For example, if the FRAME GROUP #'s differ by three, the number of FRAME GROUPS which have been missed is equal to three which is used at point 846 to fill in the data units with error markers in each missing FRAME GROUP. Processing proceeds to point 848 where the FRAME GROUP counter is updated by the number of missing FRAME GROUPS as calculated at point 844. Thereafter, processing continues to decision point 808 as described above. If the answer is "yes" at decision point 804 that a BCH error is present, then processing proceeds to decision point 850 where a determination is made if the BCH error exceeds the error correction capability (e.g. 2 bits) of the BCH code contained in a frame. If the answer is "no" at decision point 850, which is indicative of a correctable data error being present, processing proceeds to point 852 where each of the data units within a frame is corrected using the error correction code present in the detected frame. This correction process is the conventional process used by BCH or other error correction codes. Processing continues to decision point 854 where a determination is made if the data units contain a synchronization marker S" which is indicative of proper synchronization being present in either the ID or DATA GROUP frames of FIGS. 5A and 5B. If the answer is "yes" at decision point 854, processing proceeds back to decision point 828 as described above. If the answer is "no" at decision point 854, processing proceeds to point 856 where the bits of the frame are stored as valid data units. Processing proceeds to point 858 where the data unit counter is incremented by a number of data units in a frame which in the current example is equal to three. Processing proceeds back to decision point 814 as described above. If the decision is "yes" at decision point 850, which is a condition indicative of data reconstruction being required, processing proceeds to point 860 where the next frame is fetched from the digital signal processor buffer. The bits of the frame are processed as described above at point 802 with the BCH error code polynomial. The resultant processed bits are stored in the digital signal processor temporary buffer including the BCH error code being saved to provide a basis for data reconstruction both by analyzing with pattern recognition techniques, as described above, if the erroneous uncorrectable bits in a series of all zeros or all ones are totally contained within the BCH error correction code bits in a situation where synchronization is not lost as illustrated, for example, in FIG. 23 and further, in the situation, as described below in conjunction with FIG. 27, where synchronization is lost and is resynchronization of the clock of the receiving circuitry is achieved by detecting the synchronization marker S". Subsequent processing of the stored frames with the BCH error correction code being reprocessed after resynchronization of the receiving circuitry may yield additional valid data as illustrated, for example, in FIG. 23 as discussed above. Processing proceeds to decision point 862 where a determination is made if errors are present in the data bits of the fetched frame. If the answer is "no" at decision point 862, processing proceeds to point 864 where the data bits of all previous frames are fetched beginning with the frames where at least one erroneous uncorrectable bit was first detected and the position of erroneous uncorrectable bits within the frame is checked in the manner described above with respect to FIGS. 23–25 using pattern recognition in order to attempt to reconstruct valid data such as the example of FIG. 23 where each of the frames within the DATA FRAME GROUP are reconstructed as having valid data as a consequence of the erroneous uncorrectable bits in a series of zeros or ones being totally contained within the BCH error correction code bit field. Processing proceeds to decision point 866 where a determination is made whether the error correction code bits contain any erroneous bits. If the answer is "no" at decision point 866, processing proceeds to decision point 868 where a determination is made, are any erroneous uncorrectable bits within the data unit bits of the frame? If the answer is "yes" at decision point 868, processing proceeds to point 870 where error markers are placed for each of the faded data units of the frame as a consequence of there being at least one erroneous uncorrectable bit within the data bits of the frame which is indicative of invalid data. If the decision is "yes" at decision point 866, processing proceeds to point 872 where all of the bits of the data units are stored as valid data. Similarly, if the answer is "no" at decision point 868, processing proceeds to point 872. From point 872 processing proceeds to point 874 where the data unit counter is incremented by the number of data units in a frame which, in the present example, is equal to three. Processing proceeds from point 874 back to decision point 814 as described above. If the answer is "yes" at decision point 862, processing proceeds to point 876 where a group of bits equal to the number of bits in the next DATA FRAME GROUP are fetched from the digital buffer followed by the digital signal processor processing the bits of the FRAME GROUP with the BCH error code polynomial followed by storing in the digital signal processor temporary buffer the result of the processing including saving of the BCH error code. The processing proceeds to decision point 878 where a determination is made if there are any erroneous uncorrectable bits in the next FRAME GROUP bits which were fetched at point 876. If the answer is "no" at decision point 878, processing proceeds to point 864 as previously described as a result of the determination at decision point 876 that there are no errors present in any of the bits which is indicative of synchronization not being lost. As a result, at point 864 as previously described, the previous frames which have been identified as containing any erroneous uncorrectable bits are processed within the frames in accordance with the discussion at FIGS. 23–25 above to perform reconstruction to recover previously unrecoverable data by looking for frames without errors exceeding the bit error correction of the error correction code or when the bit error correction capacity is exceeded bit patterns indicative of the uncorrectable bit errors being present totally within the bit field of the error correction code are found. If the answer is "yes" at decision point 878, the fetched FRAME GROUP of bits which contains one or more erroneous uncorrectable bits is shifted by the digital signal processor to locate a synchronization marker S" as described above to achieve resynchronization. Processing proceeds to decision point 882 where a determination is made if the shifting of the bits to look for the synchronization marker S" at point 882 has been successful in determining the presence of a synchronization marker S". If the answer is "yes" at decision point 882, processing proceeds to point 884 where the resynchronization of the clock of the receiving circuitry is performed in accordance with known techniques by locating the synchronization marker S" with known techniques. Processing proceeds from point 884 to point 864 as described above. If the answer is "no" at decision point 882, processing proceeds to point 886 where the next FRAME GROUP bits which are equal to 180 bits when the format in accordance with FIGS. 5A–5C is used are fetched and the FRAME GROUP bits are shifted by the digital signal processor to look for the synchronization marker S". Processing proceeds to decision point 888 which is analogous to decision point 882. If the answer is "yes" at decision point 888 that a synchronization marker S" is present in the fetched next DATA FRAME GROUP, processing proceeds to point 884 where the resynchronization of the clock occurs as described above. If the answer is "no" at decision point 888, processing proceeds through a series of processings analogous to point 886 and decision point 888 to continue to look for a synchronization marker S". The number of repeated fetching steps of the next DATA FRAME GROUP bits and shifting of the DATA FRAME GROUP bits to look for the synchronization marker S" followed by the determination of whether a synchronization marker S" is present is chosen to consume a time of processing at least equal to the longest duration fade which is statistically likely to occur which studies have shown is somewhere between three and five hundred milliseconds. If the repeating of the fetching of the next DATA FRAME GROUP bits and shifting DATA FRAME GROUP bits to look for a synchronization marker S" followed by the determination is a synchronization marker S" present sequences through a time interval of 300 to 500 milliseconds, it is unlikely that a fade is present because fades of this duration are statistically improbable and the transmission is statistically likely to be over. Thereafter, processing proceeds to point 890 where the digital signal processor buffer is cleared which is indicative of the transmission of the frames being completed. Thereafter, processing proceeds to point 892 where data unit error markers are stored in each of the frames which have been detected to have at least one erroneous uncorrectable data bit. Thereafter processing proceeds to point 814 as described above.

If the frame format of FIG. 5D is used, the processing of FIGS. 26A–C would be simplified to eliminate processing of synchronization markers S" and the FRAME GROUP # because of the shortening of the total number of frames being contained in one ID FRAME GROUP. The resultant processing would involve the steps associated with reconstruction as discussed above.

Figure 27:
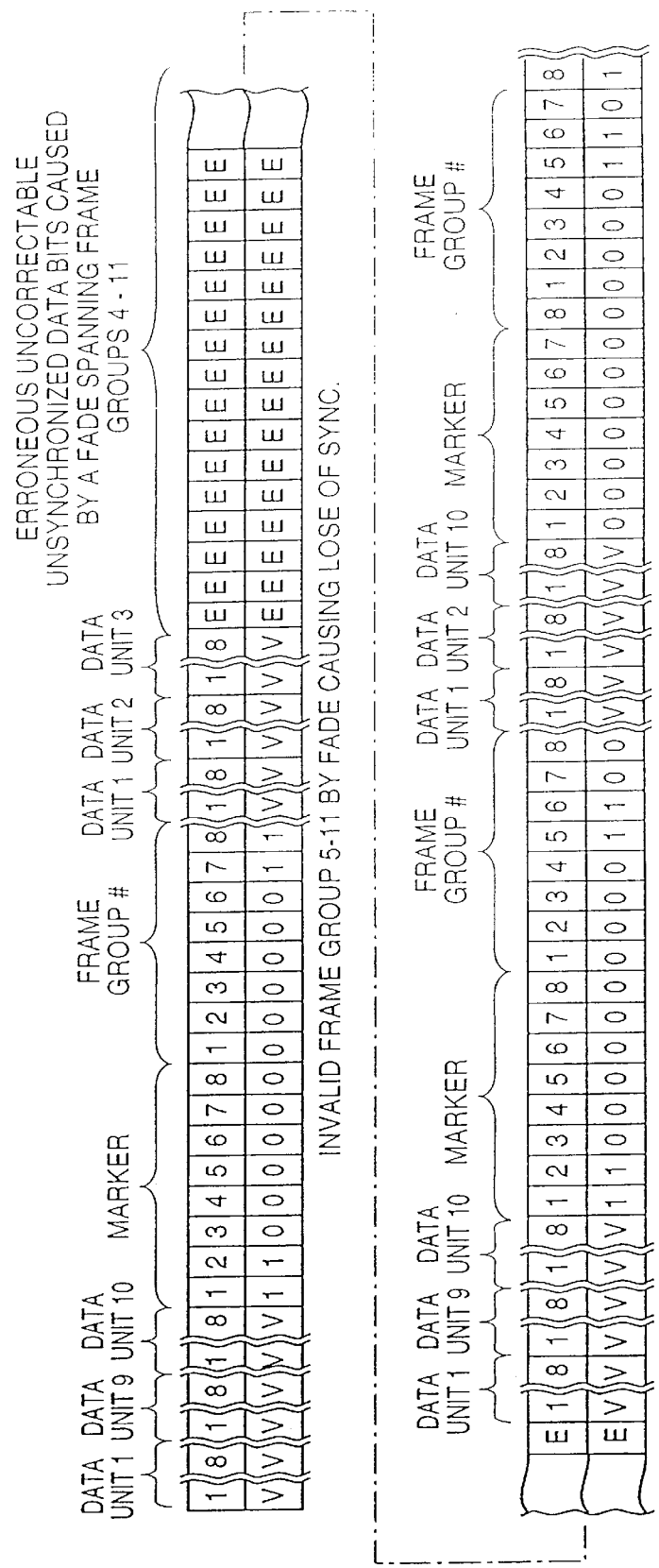
FIG. 27 illustrates the processing of detected stored frame groups to resynchronize the clock of the receiving circuitry in accordance with the present invention.

FIG. 27 illustrates an example of the processing which occurs when a loss of synchronization is detected followed by the subsequent detection of the synchronization marker S" which resynchronizes receiving circuitry of the clock. As illustrated, a plurality of frames are first detected and processed with the error correction code to identify erroneous uncorrectable bits, which are identified for illustration purposes by the letter "E" as used above in FIGS. 23–25. In accordance with the processing described above in FIGS. 26A–26C, after one or more successive frames are processed with the error correction code to determine the presence of at least one erroneous uncorrectable bit, which exceeds the bit error correction capacity of the error correction code as discussed above, the digital signal processor proceeds in accordance with the clock timing of the receiving circuitry requiring resynchronization. The detected bits of the frames beginning from FRAME GROUP #3 where the presence of the loss of synchronization is detected by the aforementioned detection of one or more frames having at least one erroneous uncorrectable bit which are stored in the memory associated with the digital signal processor are searched by shifting the stored bits in memory to look for the synchronization marker S". As illustrated, bits corresponding to where DATA FRAME GROUP #4 should be found contain successive erroneous uncorrectable bits followed by a total loss of detection of valid data, followed by a detection of a synchronization marker S" in DATA FRAME GROUP #12. As a result, the digital signal processor is able resynchronize its clock at FRAME GROUP #12 and determine that a total of eight DATA FRAME GROUPS have been lost during the fade of the wireless transmission below the detection capability of the receiving circuitry which requires reconstruction to try to identify and recover valid data as described above. After resynchronization is accomplished by detection of the synchronization marker S", groups of forty five bits, which are the number of bits contained in a frame of the example above, will be processed with the resynchronized proper clock timing which permits both forward or backward processing by the digital signal processor of each of the frames of data which are located beginning with the DATA FRAME GROUP in which synchronization was first detected as being lost and to and through the subsequent DATA FRAME GROUP in which the synchronization marker S" was detected reestablishing resynchronization. As a result, it may be possible to recover and reconstruct many of the frames of data which otherwise would have been lost because of the loss of synchronization which was not correctable with the prior art's sole reliance on error correction code. The recovery and reconstruction processing of the frames of data is in accordance with that described above with respect to frames 23–25 including storing as valid data units all frames which, when processed after resynchronization, do not contain any erroneous uncorrectable bits while discarding the bits of the error correction code and those frames which contain erroneous uncorrectable bits totally in the bit field of the error correction field as discussed above while discarding the bits of the error correction code. All frames which contain erroneous uncorrectable bits which are not totally in the bit field of the error correction code are stored as erroneous data units with the bits of the error correction code being discarded.

Furthermore, subsequent processing of frames after the detection of the synchronization marker S" in DATA FRAME GROUP #12 will be in accordance with the previously described procedure in which synchronization is present because of the resynchronization of the clock of the receiving circuitry. Each frame transmitted in time after the subsequently detected synchronization marker in DATA FRAME GROUP #12 is processed in accordance with normal procedures in which synchronization is present. Each frame is tested to determine if any erroneous uncorrectable bits are present, if no erroneous uncorrectable bits are present in a frame the data units of the frames are stored as valid and the bits of the error correction code are discarded, if erroneous uncorrectable bits are present and determined to be present only in the field of the BCH error bits within the frame by using the aforementioned pattern recognition of the frame bits, all of the data bits are stored as valid and the bits of the error correction code are discarded, and if erroneous uncorrectable bits are not totally contained in the bit field of the error correction code, the data units are stored as invalid data by storing error characters and the bits of the error code filed are discarded.

Thus, it is seen that the present invention provides four methodologies for improving reception reliability which are (1) reconstruction processing of frames containing erroneous uncorrectable bits present totally within the BCH error correction code bits of the frame, (2) resynchronization of the clock of the receiving circuitry, (3) reconstruction processing of the frames located beginning where the loss of synchronism is detected in one or more frames containing at least one erroneous uncorrectable data bit to the frames in the DATA FRAME GROUP where resynchronization is reestablished by detection of the synchronization marker S" and (4) normal processing of the frames transmitted after the detected synchronization marker S" including reconstruction of those frames determined to have at least one erroneous uncorrectable error and/or further resynchronization. The resynchronization of the clock provides correct timing for processing the groups of bits in a frame to again determine if the bits contain any erroneous uncorrectable data bits, if any erroneous uncorrectable data bits are present, are they totally present within the bits of the field of the BCH error correction code field within the frame and when the bits are totally with the bits of the field of the BCH error code the data bits are stored as reconstructed valid data bits while discarding the bits of the error correction code.

The at least one digital signal processor of the receiving circuitry functions to detect bits modulated on the subcarrier within the transmitted at least one identification frame within the ID Frame Group of FIG. 5A and the plurality of DATA FRAME GROUPS of FIG. 5B or the ID FRAME GROUP of FIG. 5D and causes storage of the detected bits within the at least one ID FRAME GROUP and the plurality of DATA FRAME GROUPS in the memory associated with the at least one processor. Thereafter, the at least one digital signal processor processes the stored bits of the at least one frame of at least one of the plurality of DATA FRAME GROUPS with the error correction code therein to determine when the stored bits of the at least one frame contain at least one uncorrectable erroneous bit, as illustrated in FIGS. 23–25 and 27 discussed above, which cannot be corrected with the error correction code therein. The at least one digital signal processor causes searching of the stored bits in the memory associated with the at least one digital signal processor which are transmitted after the stored bits of the at least one processed frame containing the at least one uncorrectable erroneous bit to detect a synchronization marker S" as described above in conjunction with FIG. 27 to resynchronize the clock of the receiving circuitry where determined to be necessary. Preferably, the at least one digital signal processor processes the stored bits of a plurality of frames of at least one of the plurality of DATA FRAME GROUPS with the error correction code therein as described above in conjunction with steps 850 and 876 to determine when the stored bits of the plurality of frames each contain at least one uncorrectable erroneous bit which cannot be corrected with the error correction code therein prior to searching the stored detected bits transmitted after the stored bits of the plurality of frames each containing the at least one uncorrectable erroneous bit to detect a synchronization marker S". The bits of the detected synchronization marker S" which are detected at decision points 882 and 888, as described above, resynchronize the receiving circuitry clock permitting reconstruction processing of the bits of frames in at least one DATA FRAME GROUP which contain a FRAME GROUP # address identifying a DATA FRAME GROUP transmitted before, within or after the data frame group containing the detected synchronization marker S" as indicated by the step 884 in FIG. 26C resynchronizing the clock and further in conjunction with point 864, decision point 866, point 868, point 870 and point 872 as described above in conjunction with FIG. 26B. As has been described above, the resynchronization of the clock at point 884 is performed by using conventional bit shifting procedures in memory or registers to locate the synchronization marker S" within the stored information transmitted after the detection of loss of synchronization by finding at least one frame having at least one erroneous uncorrectable bit.

Once resynchronization is established, which involves the changing of the clock timing of the receiving circuitry by one or more clock cycles which correspond to the number of bits which have been lost or gained during a fade by detecting the synchronization marker S", reconstruction of a number of frames which is determined from the DATA FRAME GROUP # associated with the DATA FRAME GROUP which contains the detected synchronization marker S" is performed. The digital signal processor calculates the number of frames requiring reconstruction beginning with the frames where the loss of synchronization was detected by at least one frame having at least one erroneous uncorrectable bit to the frames in the DATA FRAME GROUP containing the detected synchronization marker S" by using the difference in the FRAME GROUP #s of the DATA FRAME GROUPS containing the at least one frame containing at least one erroneous uncorrectable bit and the synchronization marker as indicated by step 884 in FIG. 26A. Thereafter, groups of bits equal to the number of bits in a frame, which are forty five bits as described above in the example of the protocol of the present invention in FIGS. 5A and B and FIG. 5D, are sequentially fetched and checked by processing the error code therein to determine if any erroneous uncorrectable bits are present. This process may be performed either in a forward or backward address direction from the at least one frame containing at least one erroneous uncorrectable bit to the detected synchronization marker S" which corresponds to the frame containing data unit four of FRAME GROUP #13 and the frame containing data unit one of FRAME GROUP #12 in FIG. 27. Thereafter, with resynchronization being established, the individual frames transmitted after FRAME GROUP #12 are processed with the error correction code and where necessary, the pattern recognition techniques of the digital signal processor are used to determine where the erroneous uncorrectable bits are present within each frame in the manner as discussed above with FIGS. 23–25 including resynchronization where synchronization is again lost by searching for another subsequently transmitted synchronization marker.

The protocol of the invention is applicable for all facets of one-way and two-way telecommunications. It, in essence, permits wireless serial transmission of all forms of digitalized information to move forward to send extremely high information transmission rates to a receiver or two-way transceiver with an improved reliability when compared to the prior art. This increases the reliability of one-way radio messaging to make it suitable for E-mail and information services as well as permits a much greater number of subscribers to exist on a radio paging channel. The protocol of the present invention with a 2400 Hz. subcarrier allows a ten to twenty times increase of data throughput in receiving circuitry utilizing the same radio transmitter infrastructure used, for example, with the POCSAG protocol. More importantly, this additional air time addresses the E-mail and information services with a higher degree of reliability achievable with prior art one-way protocols without necessitating the use for two-way radio channels. The protocol also permits two-way data services to experience dramatic gains in air time efficiency and a corresponding increase of subscribers per channel by eliminating some requests for retransmission of information caused by at least a part of a message being lost.

Having a higher message reception probability and a higher throughput capacity has a net effect of saving a data service company many millions of dollars by eliminating the necessity for additional radio spectrum. Regardless of the transmitting bandwidth or the data rates, the invention will produce a significant increase in system efficiency. An added advantage is that it can utilize current radio frequencies in the 150, 220, 450, 800 and 900 MHz transmitting bands and higher frequency bands to accommodate information and E-mail services. This is far less expensive than implementing such services at the proposed 1.2 and 2.4 GHz radio bands which will be auctioned in the future by the Federal Communications Commission. The E-mail and information services industries could be immediately addressed with the current infrastructure to accommodate wireless services.

While the invention has been described in terms of its preferred embodiments and methods of operation, it should be understood that numerous modifications may be made thereto without departing form the spirit and scope of the invention. For example, it should be understood that the invention is not limited with regard to the type of information which may be serially transmitted. Any type of data may be transmitted in practicing the invention which may be digitized and used to control the analog modulation of information as illustrated in FIG. 6A or the digital modulation of information as illustrated in FIG. 6B. The invention is not limited to any fixed architecture in the transmitting and receiving circuitry including the choice of the number and type of processors which are used. The number of memories and/or the allocation of how the at least one processor of the receiving circuitry stores bits of processed frames in memory may be varied in practicing the invention. Either a single or multiple memories may be used to store the processed bits of the frames which are processed by the at least one processor. Finally, it should be understood that the choice of and number of integrated circuits for implementing the transmitting circuitry and receiving circuitry, as illustrated in FIGS. 12 and 13, may be varied in practicing the invention depending upon the application of the present invention including cost and functional constraints of the application. It should be understood that the present invention may be modified from the above description thereof without departing from its spirit and scope. It is intended that all such modifications fall within the scope of the appended claims.

What is claimed is:

1. A method of transmission of information on a wirelessly transmitted waveform comprising:

modulating bits of information at selected parts of each cycle of a plurality of cycles of the waveform;

wirelessly transmitting the modulated waveform;

receiving the modulated waveform;

integrating selected parts within each cycle of the received modulated waveform to produce an integrated value representative of each selected part; and comparing the integrated values with at least one stored value to determine a value of the bits modulated on each cycle of the plurality of cycles.

2. A method in accordance with claim 1 wherein:

the waveform is analog.

3. A method in accordance with claim 2 wherein:

the waveform is a subcarrier.

4. A method in accordance with claim 1 wherein:

the bits are modulated on equally spaced constellations of each cycle of the waveform.

5. A method in accordance with claim 3 wherein:

the bits are modulated on equally spaced constellations of each cycle of the subcarrier.

6. A method in accordance with claim 1 wherein:

the waveform is pulse modulated.

7. A method in accordance with claim 6 wherein:

the pulse modulated waveform is a subcarrier.

8. A method in accordance with claim 6 wherein:

the waveform is pulse width modulated.

9. A method in accordance with claim 7 wherein:

the subcarrier is pulse width modulated.

* * * * *